(12) United States Patent
Nagata et al.

(10) Patent No.: US 7,515,194 B2
(45) Date of Patent: Apr. 7, 2009

(54) IMAGE PICKUP OPTICAL SYSTEM AND OPTICAL APPARATUS USING THE SAME

(75) Inventors: Tetsuo Nagata, Hachioji (JP); Tomoko Sato, Hachioji (JP); Akihiro Sakurai, Hino (JP); Tetsuya Ishii, Hachioji (JP); Takeshi Takahashi, Hachioji (JP); Kazuhiro Matsumoto, Hachioji (JP)

(73) Assignee: Olympus Corporation, Tokyo (JP)

(*) Notice: Subject to any disclaimer, the term of this patent is extended or adjusted under 35 U.S.C. 154(b) by 932 days.

(21) Appl. No.: 10/902,302

(22) Filed: Jul. 30, 2004

(65) Prior Publication Data
US 2005/0046952 A1 Mar. 3, 2005

(30) Foreign Application Priority Data
Jul. 31, 2003 (JP) ............................. 2003-284162
Jan. 15, 2004 (JP) ............................. 2004-007900

(51) Int. Cl.
G02B 13/16 (2006.01)
H04N 5/225 (2006.01)

(52) U.S. Cl. ...................... 348/335; 348/337; 348/338; 359/720; 359/726; 359/728; 359/831; 359/833; 359/856

(58) Field of Classification Search ........................ None
See application file for complete search history.

(56) References Cited

U.S. PATENT DOCUMENTS

| | | | | |
|---|---|---|---|---|
| 5,841,574 A | * | 11/1998 | Willey | 359/351 |
| 6,671,099 B2 | | 12/2003 | Nagata et al. | 359/629 |
| 2003/0137742 A1 | | 7/2003 | Akiyama et al. | 359/627 |

FOREIGN PATENT DOCUMENTS

| | | |
|---|---|---|
| JP | 2000-19401 | 1/2000 |
| JP | 2000-19402 | 1/2000 |
| JP | 2000-19403 | 1/2000 |
| JP | 2000-19404 | 1/2000 |
| JP | 2000-19405 | 1/2000 |
| JP | 2000-19406 | 1/2000 |
| JP | 2000-19407 | 1/2000 |
| JP | 2000-121-943 | 4/2000 |
| JP | 2000-111799 | 4/2000 |
| JP | 2000-111800 | 4/2000 |
| JP | 2002196243 A * | 7/2002 |
| JP | 2003-84200 | 3/2003 |

* cited by examiner

Primary Examiner—Nhan T. Tran
Assistant Examiner—Cynthia Calderon
(74) Attorney, Agent, or Firm—Kenyon & Kenyon LLP

(57) ABSTRACT

An image pickup optical system includes, in order from the object side, a front unit having at least one reflecting surface with power that is rotationally asymmetrical, an aperture stop, and a rear unit having at least one reflecting surface with power that is rotationally asymmetrical. In this case, F-numbers in two directions perpendicular to each other on a plane perpendicular to the optical axis are different. Decentration takes place in one of the two directions and the F-number in a direction perpendicular to a decentering direction is smaller than that in the decentering direction. When the F-number in the decentering direction is represented by FNY and the F-number in the direction perpendicular to the decentering direction is represented by FNX, the optical system satisfies the following condition:

$1.1 < FNY/FNX < 2.0$.

17 Claims, 32 Drawing Sheets

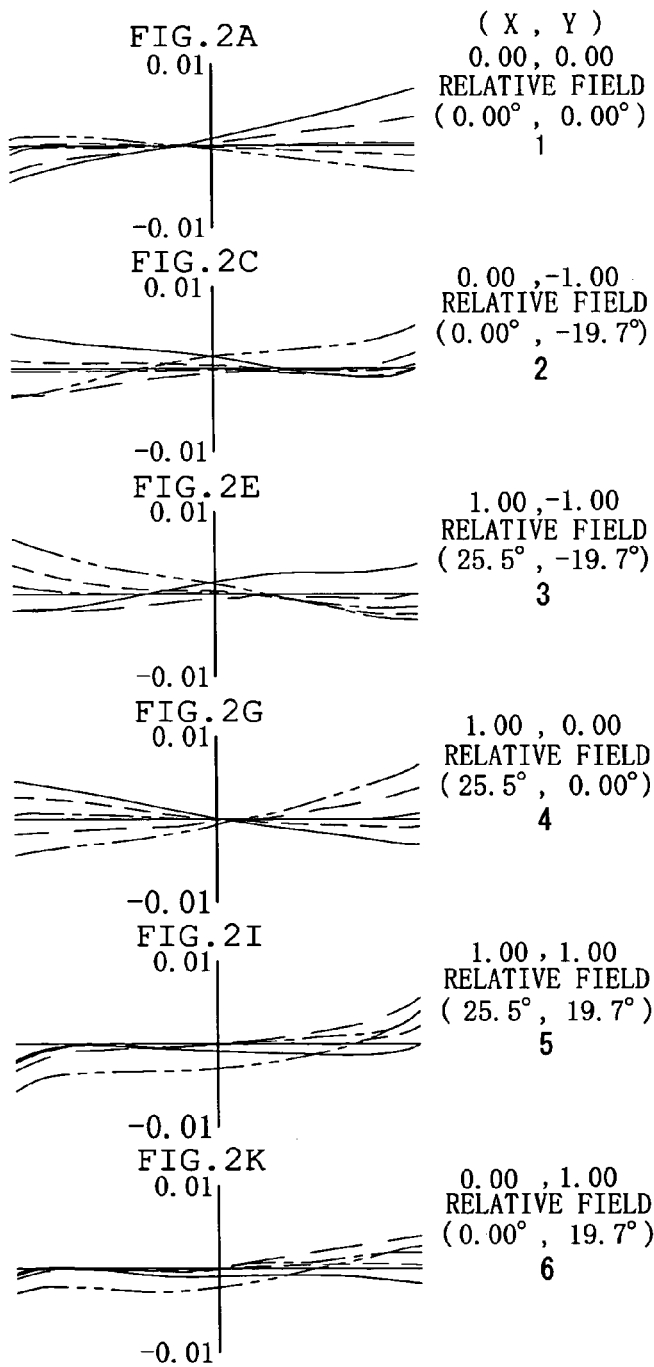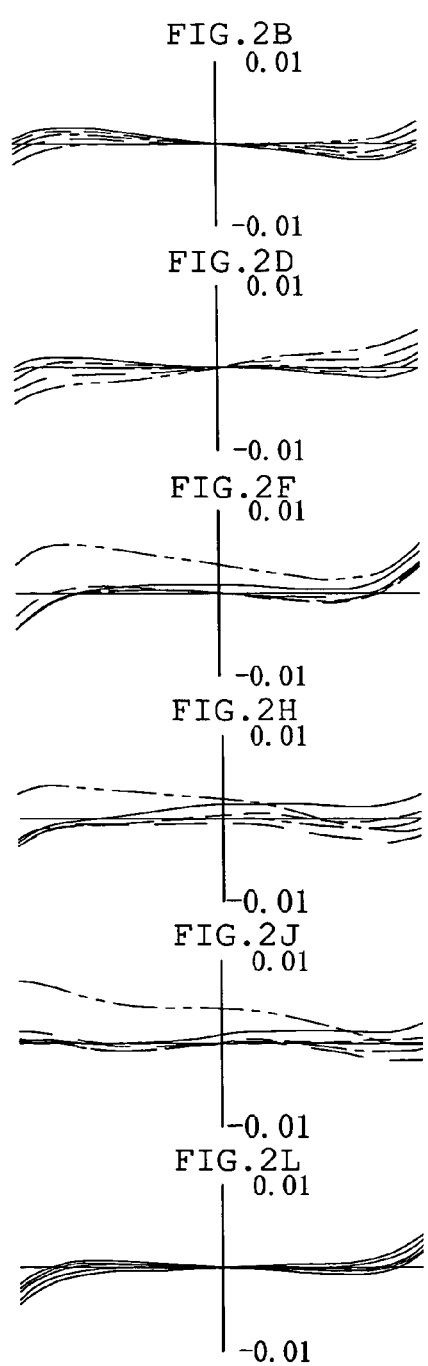

FIG.3A
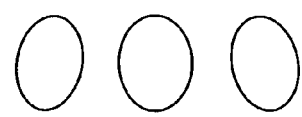
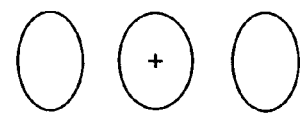
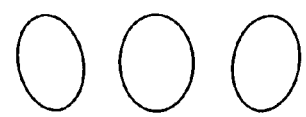
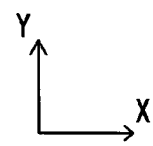
FIG.3B
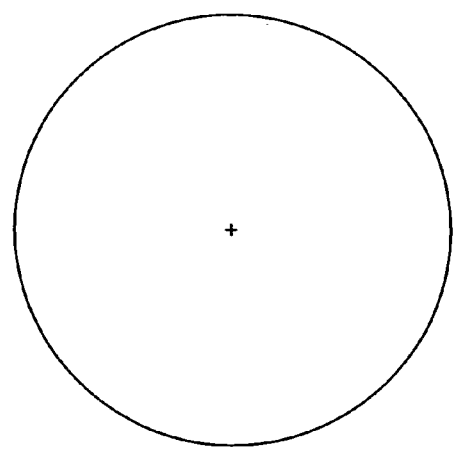
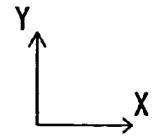

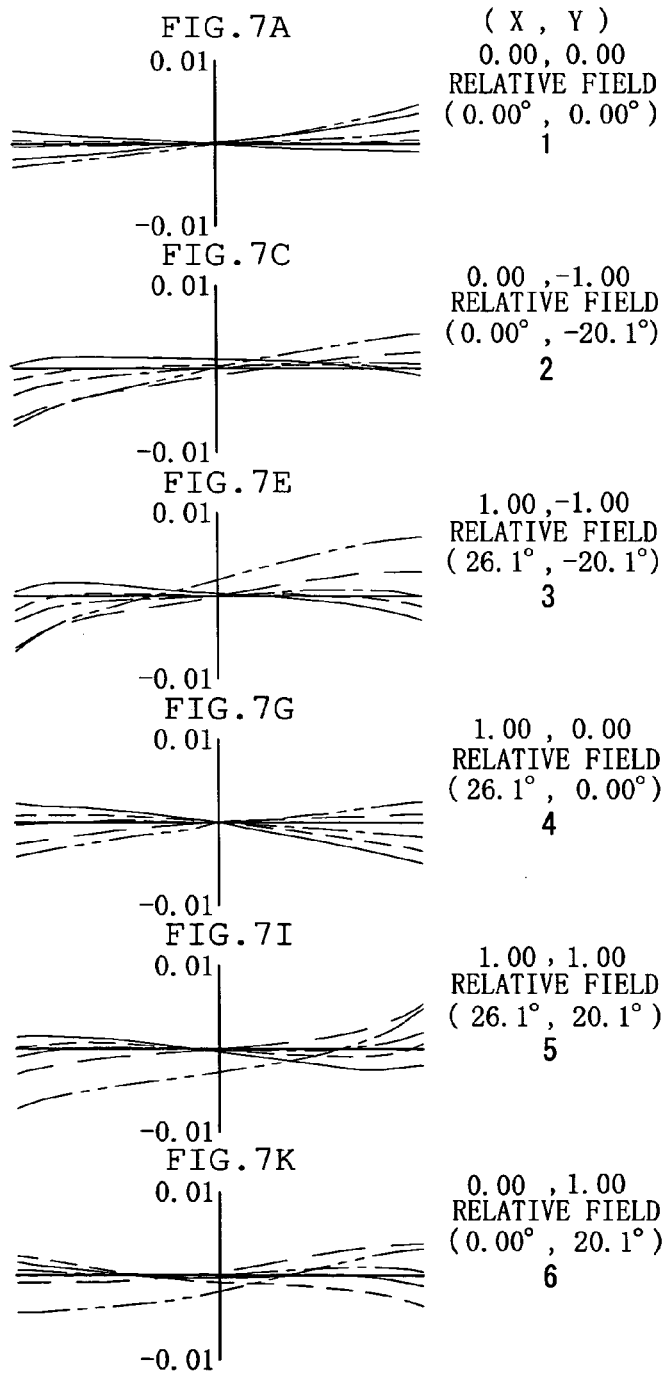
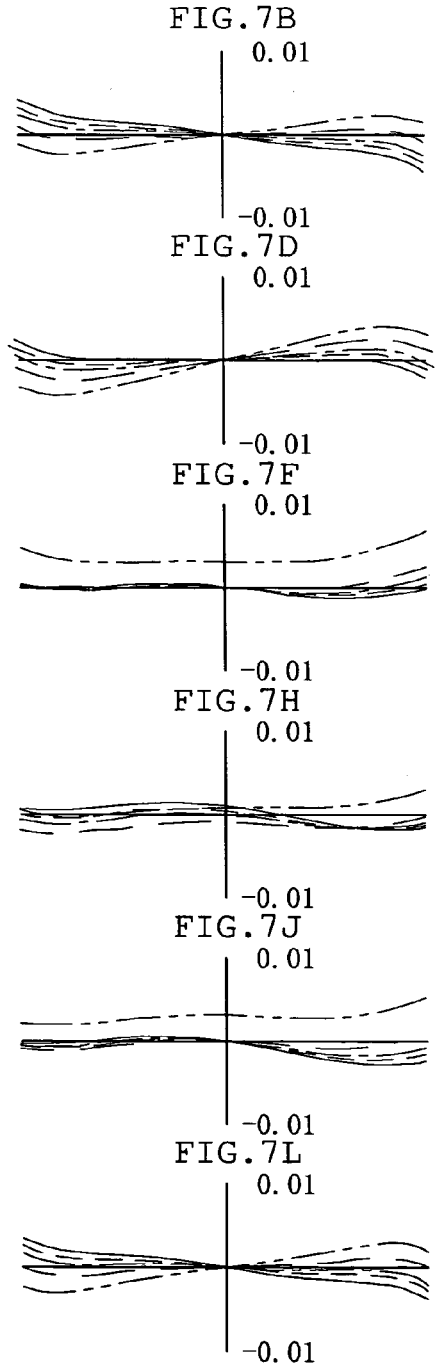
```
——————  656.27 nm
— — — —  587.56 nm
— · — · —  546.07 nm
— — — —  486.13 nm
— ·· — ··  435.84 nm
```

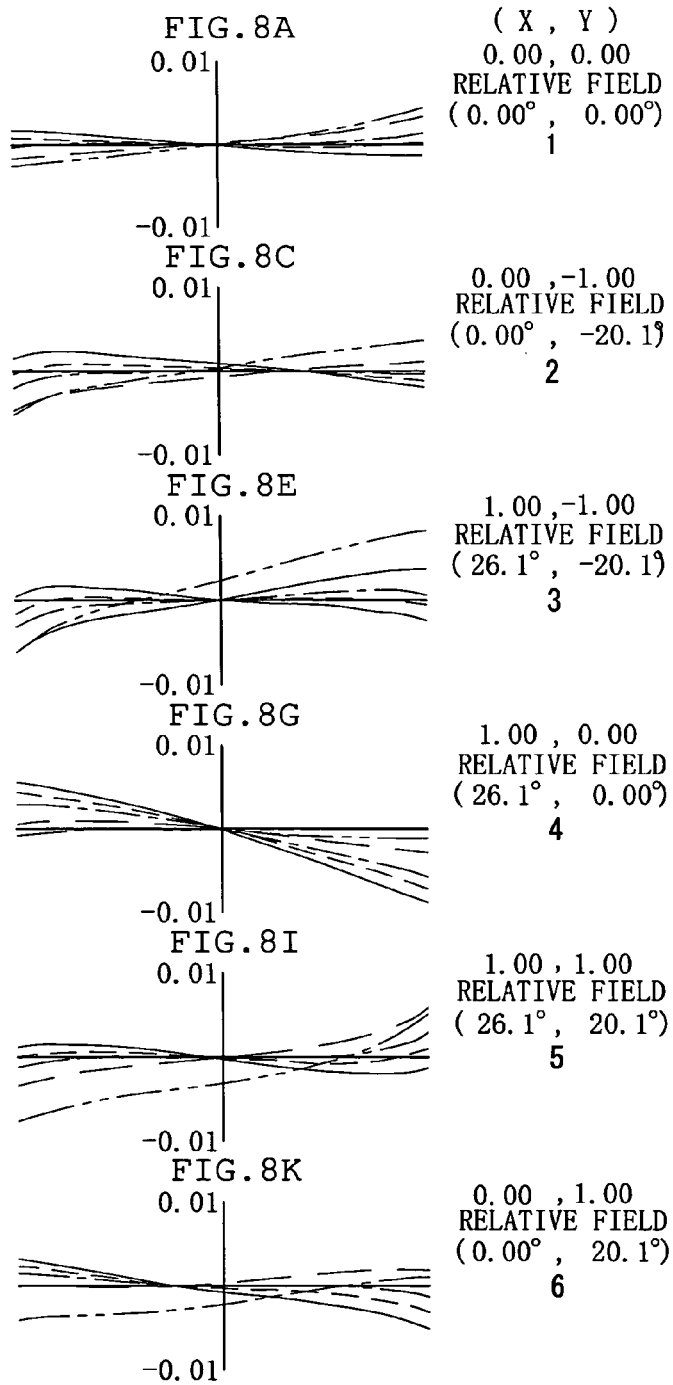
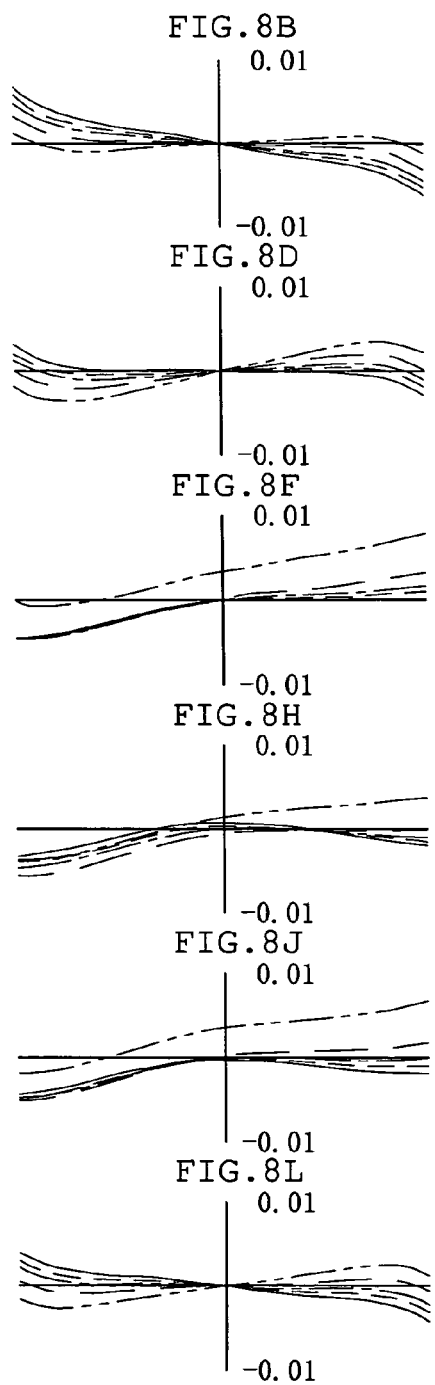

Y-FAN 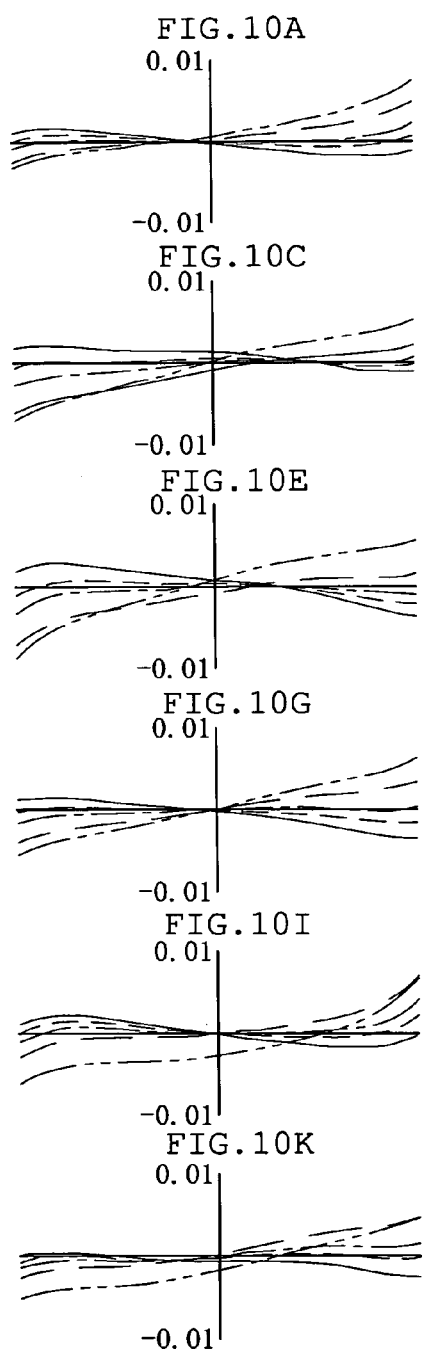 X-FAN 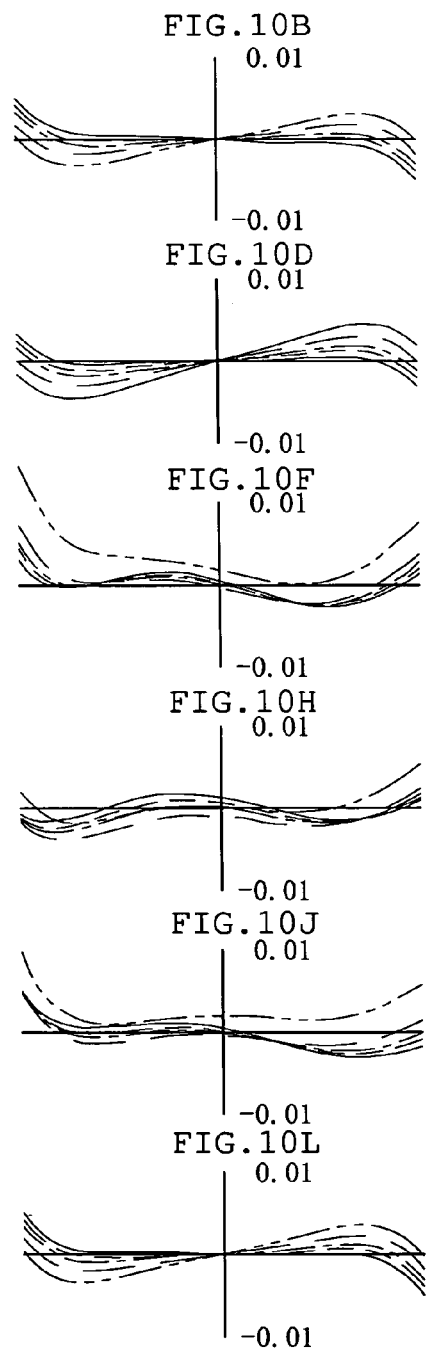

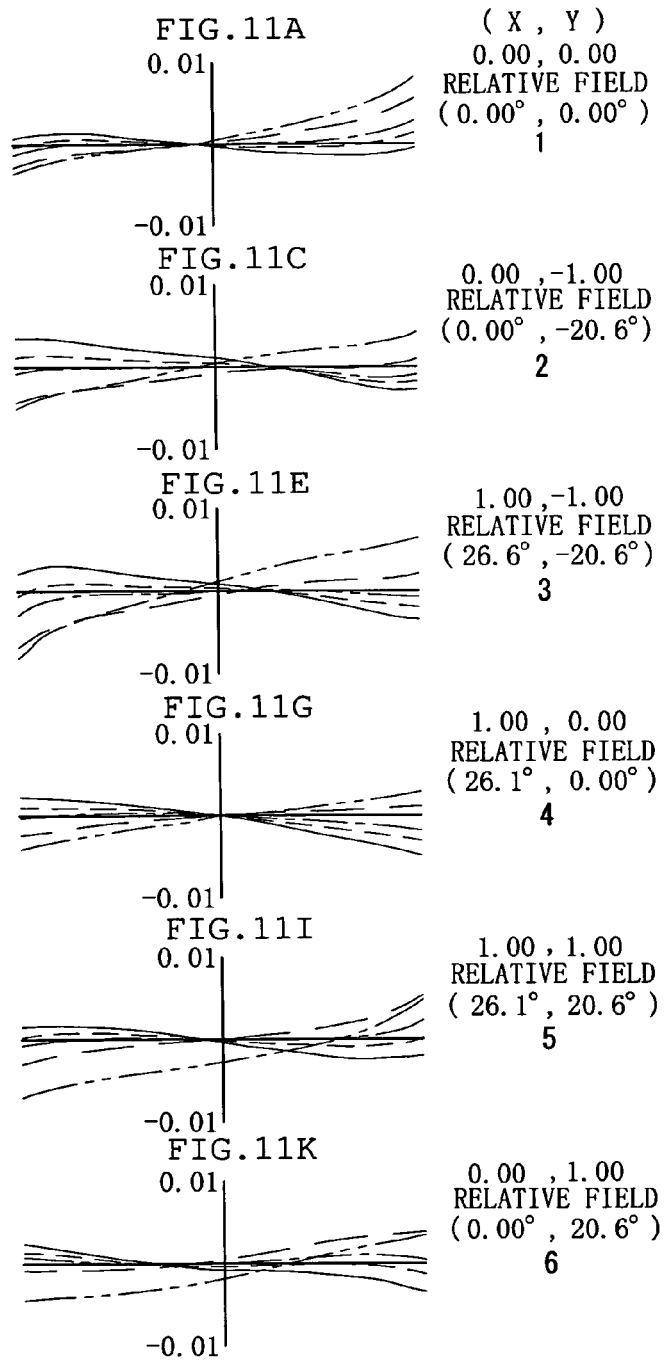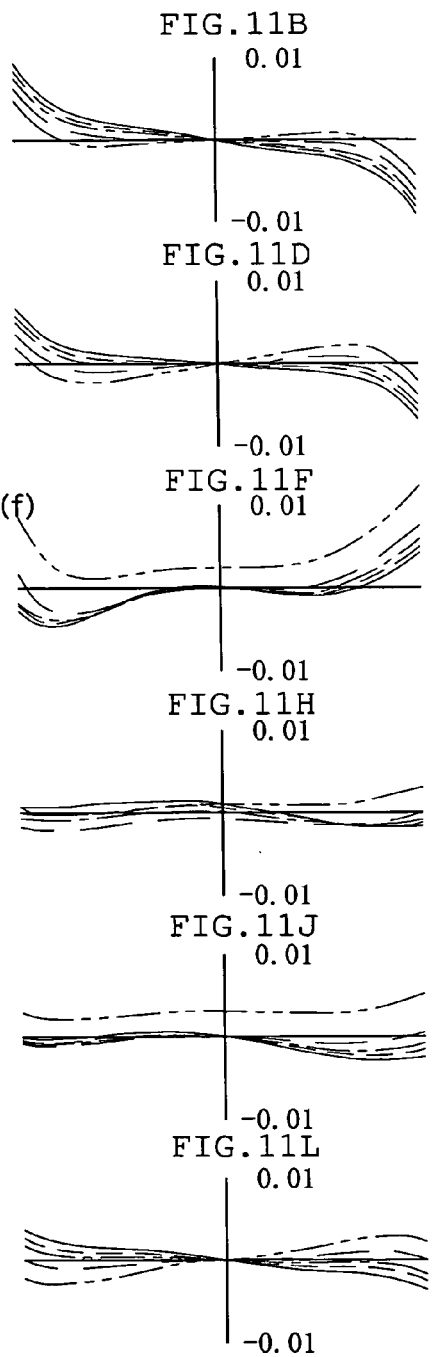

Y-FAN    X-FAN
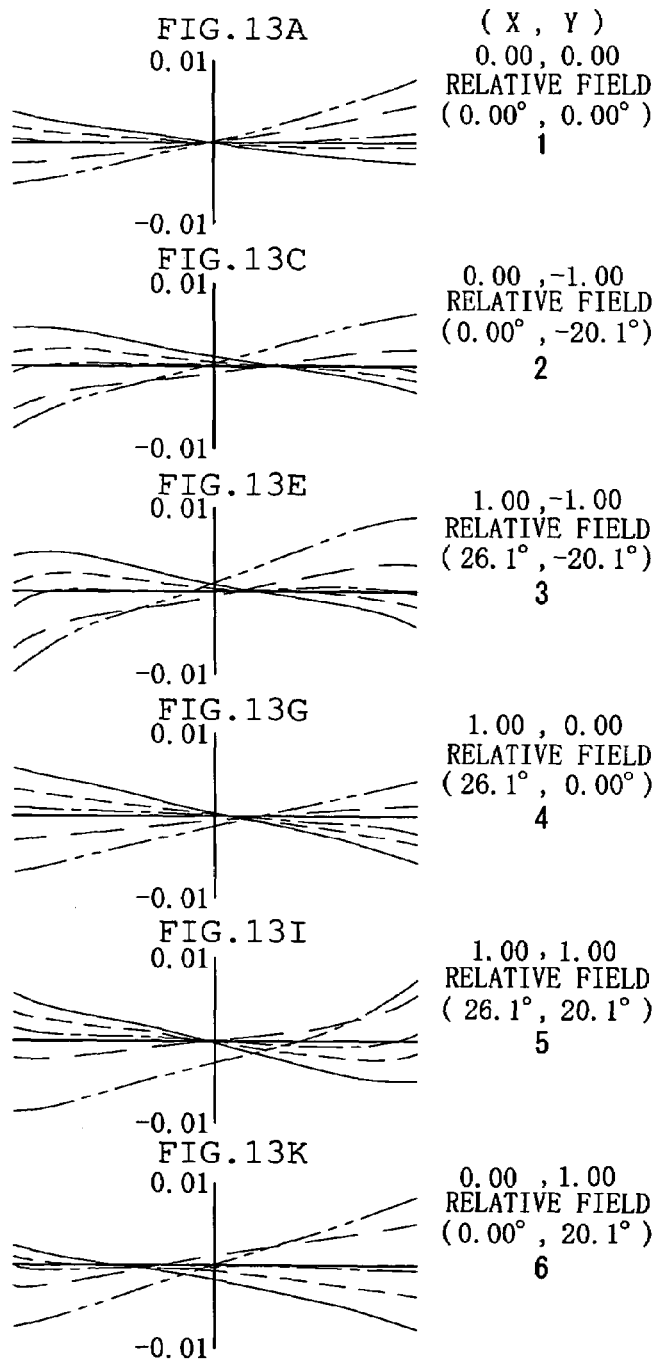
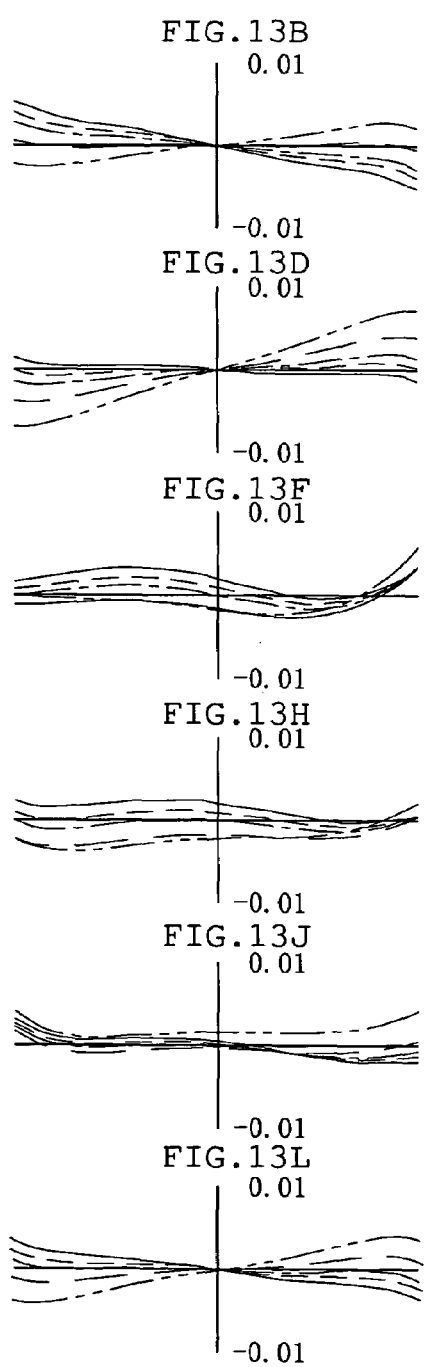
——————— 656.27 nm
— — — — — 587.56 nm
— · — · — · — 546.07 nm
— — — 486.13 nm
— · · — · · — 435.84 nm

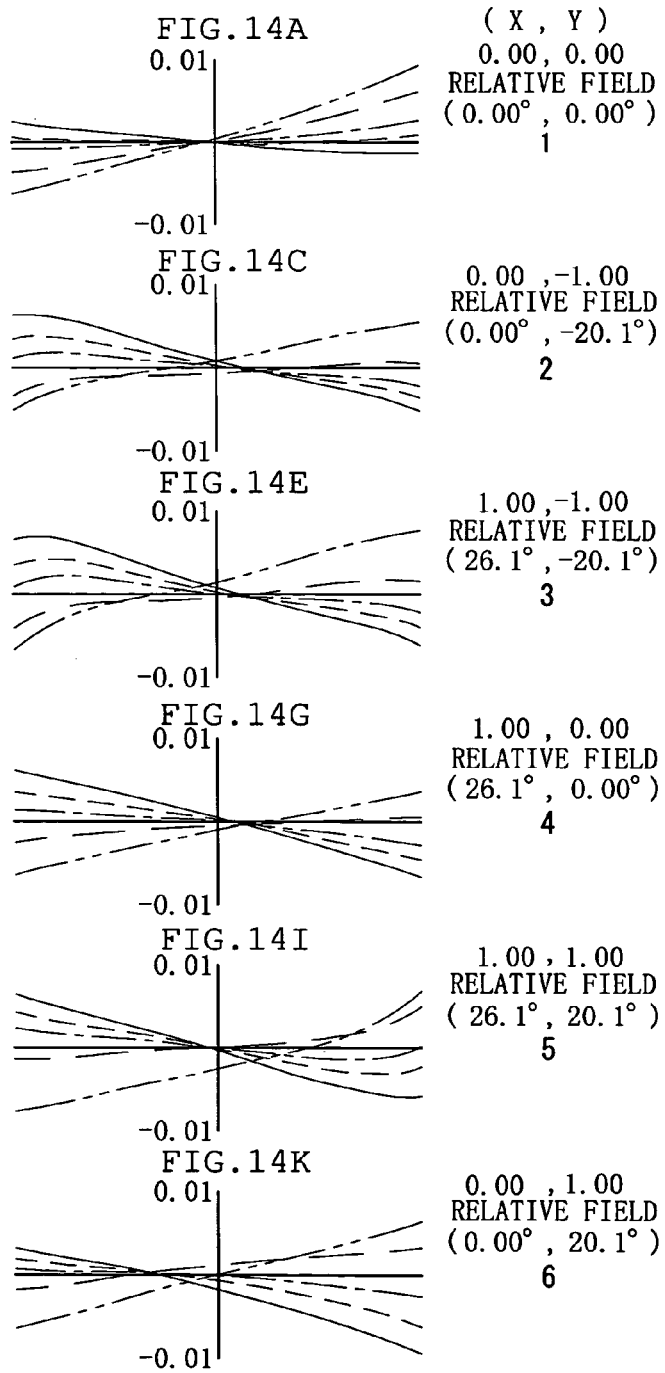
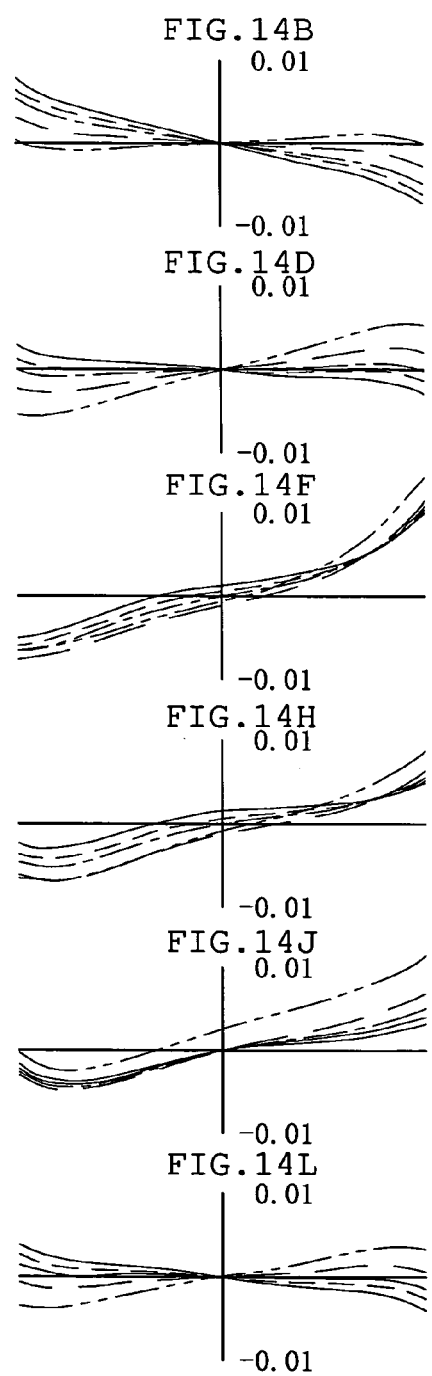

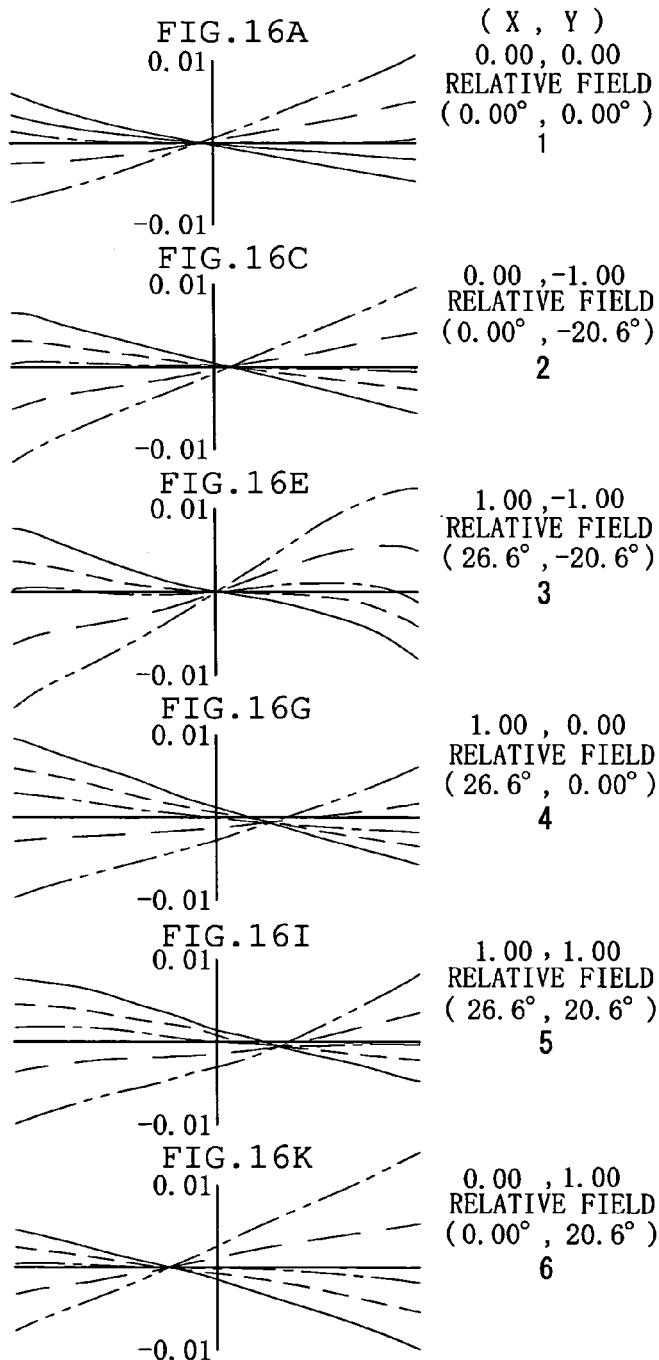
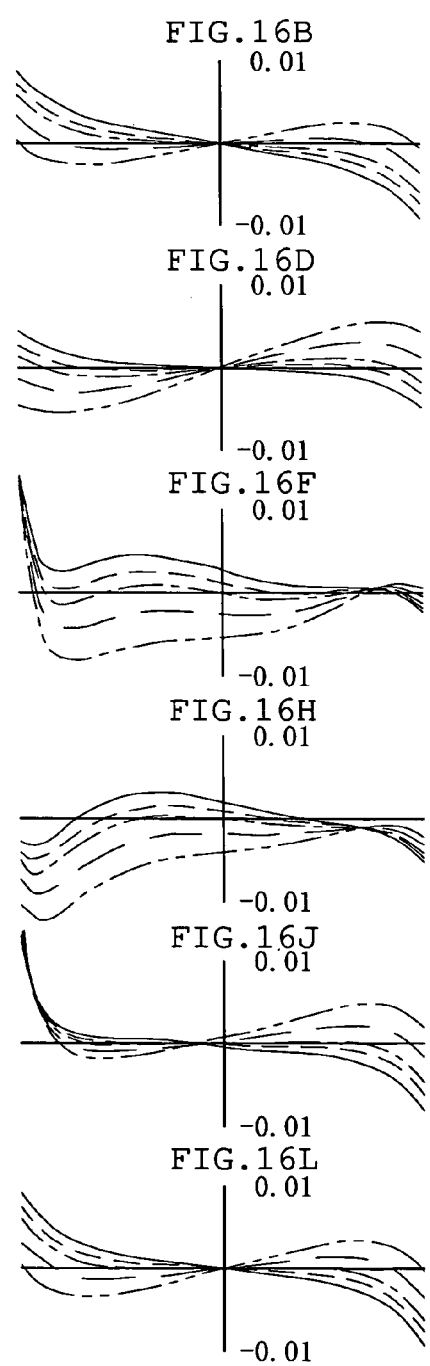
FIG.16A – FIG.16L
——————— 656.27 nm
— — — — — 587.56 nm
— · — · — 546.07 nm
— — — 486.13 nm
— ·· — ·· — 435.84 nm FIG.37A
FIG.37B
FIG.37C
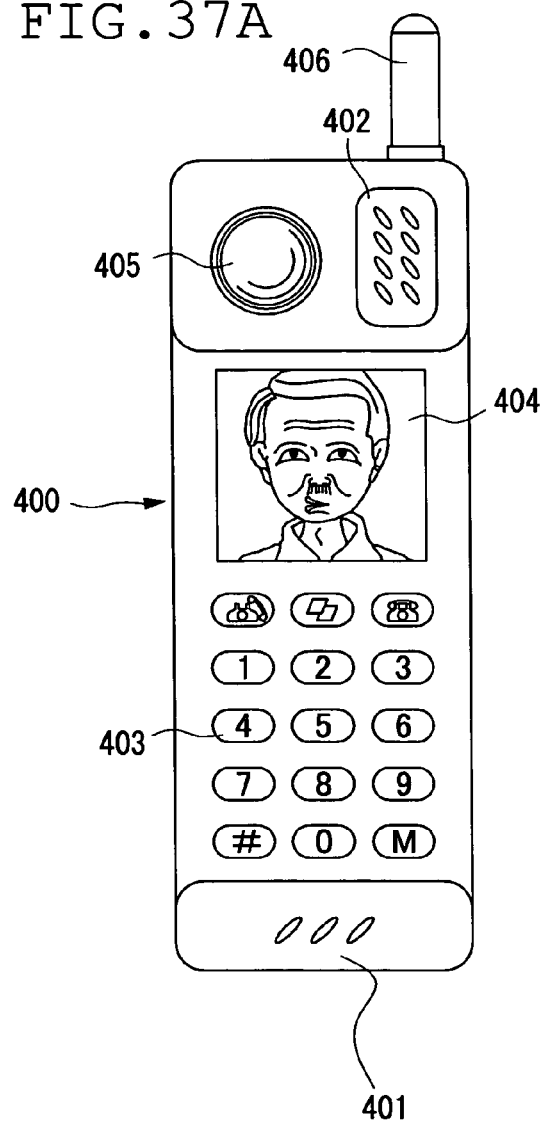
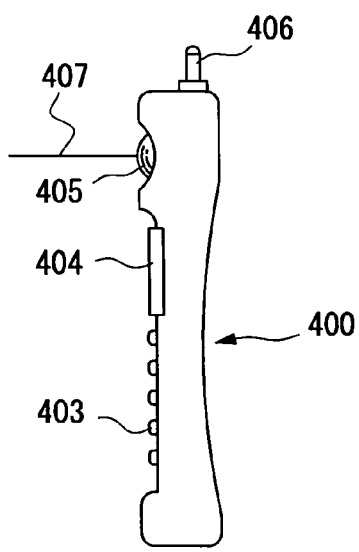
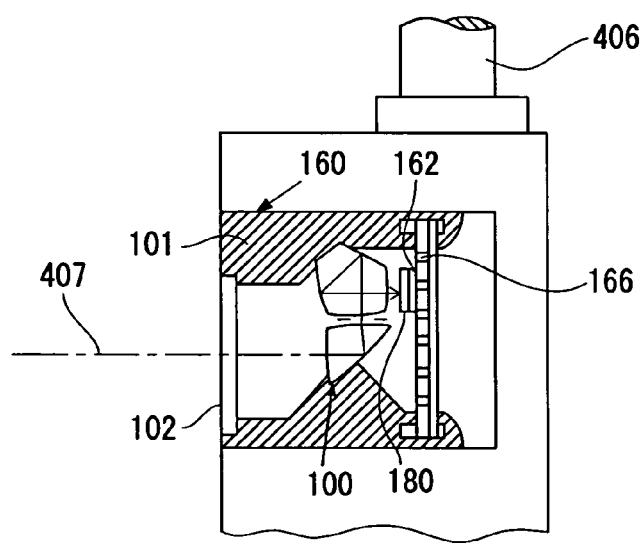

IMAGE PICKUP OPTICAL SYSTEM AND OPTICAL APPARATUS USING THE SAME

This application claims priority to Japanese Patent Application No. 2003-284162 filed 31 Jul. 2003 and Japanese Patent Application No. 2004-007900 filed 15 Jan. 2004, the contents of which are incorporated herein by reference in their entirety.

BACKGROUND OF THE INVENTION

1. Field of the Invention

This invention relates to an image pickup optical system and an optical apparatus using this optical system, and in particular, to a decentering optical system imparting power to a reflecting surface and an optical apparatus using this optical system. The optical apparatus refers, for example, to a video camera, a digital still camera, a film scanner, an endoscope, or a mobile phone.

2. Description of Related Art

Recently, in image-forming optical systems used in video cameras, digital cameras, film scanners, or endoscopes, compact, lightweight, and low-cost designs according to compactness of image sensors have been required in the optical systems themselves. In addition, with the advent in recent years of products incorporating electronic image pickup optical systems in mobile phones, PDAs, and notebook PCs, the need for further slim designs of the optical systems has been emphasized.

As a conventional optical system constructed for the purpose of the compact design, a prism optical system using a free-formed surface is proposed.

An optical system constructed for the purpose of the slim design is proposed.

In these optical systems, optical members constituting the optical systems for slim and compact designs are decentered. In each of the optical systems, the power of an optical member located on the object side of the pupil of the optical system varies with X and Y directions in a plane perpendicular to the optical axis, and the pupil located at the position of an aperture stop has an elliptical shape.

SUMMARY OF THE INVENTION

The image pickup optical system according to the present invention includes, in order from the object side, a front unit having at least one reflecting surface with power that is rotationally asymmetrical, an aperture stop, and a rear unit having at least one reflecting surface with power that is rotationally asymmetrical. In this case, F-numbers in two directions perpendicular to each other on a plane perpendicular to the optical axis are different.

In the image pickup optical system according to the present invention, decentration takes place in one of the two directions and the F-number in a direction perpendicular to a decentering direction is smaller than that in the decentering direction.

The optical apparatus according to the present invention uses the image pickup optical system mentioned above.

These and other features and advantages of the present invention will become apparent from the following detailed description of the preferred embodiments when taken in conjunction with the accompanying drawings.

BRIEF DESCRIPTION OF THE DRAWINGS

FIGS. 2A-2L are diagrams of transverse aberration characteristics of the optical system in the first embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the X direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIG. 3A is a view showing diagrammatically the shapes of light beams incident on the entrance surface of a first prism of the image pickup optical system of the present invention;

FIG. 3B is a view showing diagrammatically the shape of the light beams of FIG. 3A on an aperture stop;

FIGS. 7A-7L are diagrams of transverse aberration characteristics, in focusing at an infinite object point, of the optical system in the fourth embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the X direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIGS. 8A-8L are diagrams of transverse aberration characteristics, in focusing at a near point of 100 m, of the optical system in the fourth embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIGS. 10A-10L are diagrams of transverse aberration characteristics, in focusing at an infinite object point, of the optical system in the fifth embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the X direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIGS. 11A-11L are diagrams of transverse aberration characteristics, in focusing at a near point of 100 m, of the optical system in the fifth embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the X direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIGS. 13A-13L are diagrams of transverse aberration characteristics, in focusing at an infinite object point, of the optical system in the sixth embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the X direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIGS. 14A-14L are diagrams of transverse aberration characteristics, in focusing at a near point of 100 m, of the optical system in the fifth embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the X direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIGS. 16A-16L are diagrams of transverse aberration characteristics, in focusing at an infinite object point, of the optical system in the seventh embodiment showing states in the Y direction of a chief ray of light passing through the optical system in which an angle of view in the X direction is zero and the angle of view in the Y direction is zero, the X direction of the chief ray of light passing through the optical system in which the angle of view in the X direction is zero and the angle of view in the Y direction is zero, the Y direction of the chief ray of light passing through the optical system in which the angle of view in the X direction is zero and the angle of view in a negative Y direction is maximum, the X direction of the chief ray of light passing through the optical system in which the angle of view in the X direction is zero and the angle of view in the negative Y direction is maximum, the Y direction of the chief ray of light passing through the optical system in which the angle of view in a positive X direction is maximum and the angle of view in the negative Y direction is maximum, the X direction of the chief ray of light passing through the optical system in which the angle of view in the positive X direction is maximum and the angle of view in the negative Y direction is maximum, the Y direction of the chief ray of light passing through the optical system in which the angle of view in the positive X direction is maximum and the angle of view in the Y direction is zero, the X direction of the chief ray of light passing through the optical system in which the angle of view in the positive X direction is maximum and the angle of view in the Y direction is zero, the Y direction of the chief ray of light passing through the optical system in which the angle of view in the positive X direction is maximum and the angle of view in a positive Y direction is maximum, the X direction of the chief ray of light passing through the optical system in which the angle of view in the positive X direction is maximum and the angle of view in the positive Y direction is maximum, the Y direction of the chief ray of light passing through the optical system in which the angle of view in the X direction is zero and the angle of view in the positive Y direction is maximum, and the X direction of the chief ray of light passing through the optical system in which the angle of view in the X direction is zero and the angle of view in the positive Y direction is maximum, respectively;

FIG. 37A is a front view showing a mobile phone in which the optical system of the present invention is incorporated as the objective optical system;

FIG. 37B is a side view showing the mobile phone of FIG. 37A; and

FIG. 37C is a sectional view showing the photographing optical system of the mobile phone of FIG. 37A.

DETAILED DESCRIPTION OF THE PREFERRED EMBODIMENTS

Figure 1:
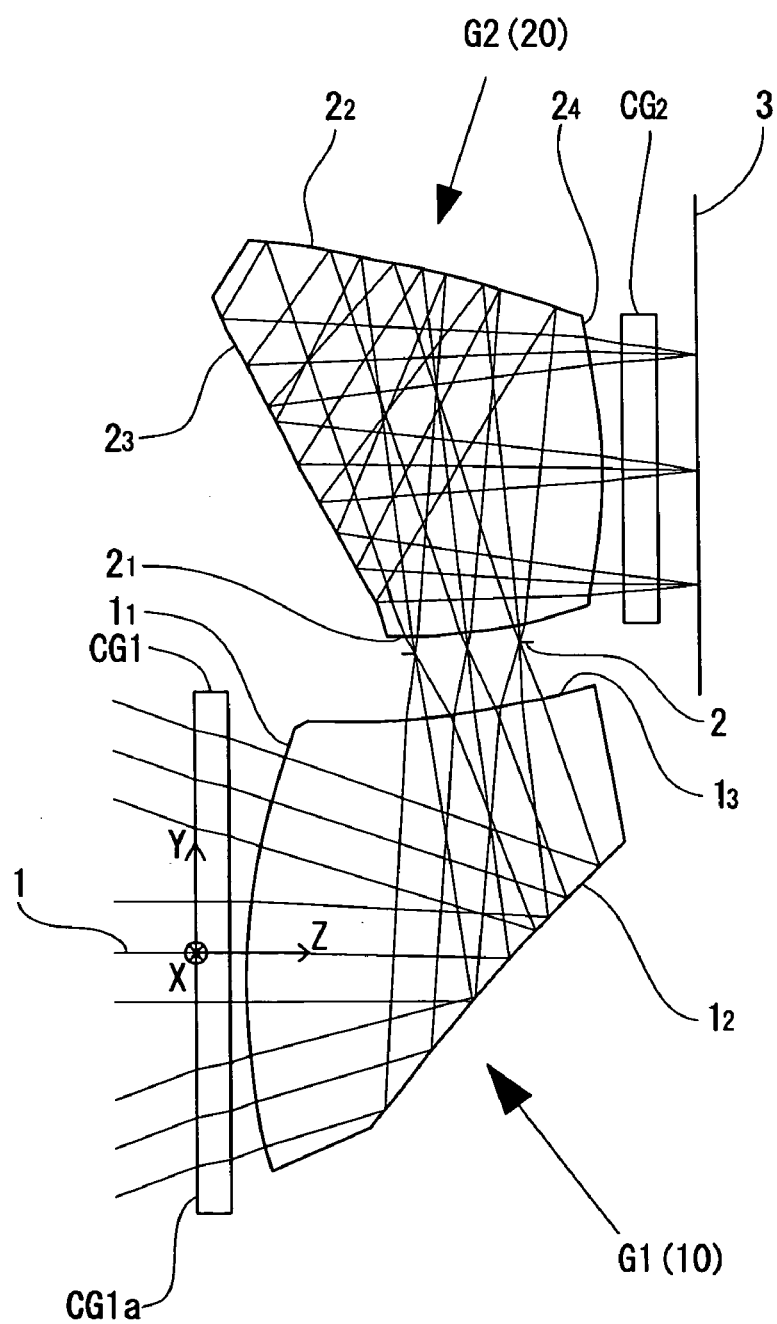
FIG. 1 is a sectional view showing schematically the image pickup optical system, developed along the optical axis, of a first embodiment in the present invention.

Before undertaking the description of the embodiments, the function and effect of the present invention will be explained.

The image pickup optical system of the present invention and the optical apparatus using this optical system are such that F-numbers in two directions are different. The two directions are perpendicular to each other on a plane perpendicular to the optical axis. Decentration takes place in one of the two directions and the F-number in a direction perpendicular to this decentering direction that the decentration takes place is made smaller than that in the decentering direction. By doing so, an elliptical ratio in the pupil shape of the optical system can be reduced. Specifically, the pupil can be changed from an ellipse to the shape similar to a circle.

Consequently, the shape of a stop member is also approximate to the circle. Thus, even though the fabrication error (the assembly error due to rotation on assembly) is produced, the deterioration of imaging performance can be suppressed. When each of the aperture stop and the pupil is circular, the shape remains unchanged even though optical members are shifted by rotation on assembly, and thus the deterioration of accuracy of the optical system caused by the assembly error can be suppressed.

The pupil of a conventional optical system has the major axis of the ellipse in the decentering direction. As an apparatus, therefore, the thickness in this direction is increased. In contrast to this, according to the present invention, the pupil is nearly circular and hence the thickness in the same direction can be made small (thin).

As such, when the optical system is constructed like the image pickup optical system of the present invention, this optical system, in contrast with a conventional decentering optical system, is capable of achieving further compact and slim designs while maintaining the quality of high accuracy.

Now, the F-number in the decentering direction is represented by FNY and the F-number in the direction perpendicular to the decentering direction is represented by FNX. In this case, the optical system is capable of achieving a further slim design while suppressing the production of astigmatism when satisfying the following condition:

$$1.1 < FNY/FNX < 2.0 \quad (1)$$

Beyond the upper limit of Condition (1), the ratio of brightness and the difference of depth of field are extremely increased and the blurring of an image becomes pronounced. This is unfavorable because astigmatism appears to be produced. Below the lower limit of Condition (1), a further slim design cannot be achieved.

It is further desirable to satisfy the following condition:

$$1.1 < FNY/FNX < 1.7 \qquad (1\text{-}2)$$

It is more desirable to satisfy the following condition:

$$1.2 < FNY/FNX < 1.5 \qquad (1\text{-}3)$$

The image pickup optical system is constructed with prisms so as to include, in order from the object side, a front unit having an entrance surface, at least one reflecting surface with power that is rotationally asymmetrical, and an exit surface; an aperture stop; and a rear unit having an entrance surface, at least one reflecting surface with power that is rotationally asymmetrical, and an exit surface. It is good practice that decentration takes place in one of two directions perpendicular to each other on a plane perpendicular to the optical axis and the F-number in a direction perpendicular to this decentering direction that the decentration takes place is made smaller than that in the decentering direction.

In the image pickup optical system of the present invention, when the focal length of the front unit is denoted by fix and the focal length of the rear unit is denoted by fly, it is desirable to satisfy the following condition:

$$-0.5 < fly/flx < 0.7 \qquad (2)$$

Beyond the upper limit of Condition (2), power ratios in the X direction and the Y direction are similar to each other, and thus axial coma cannot be particularly corrected. Below the lower limit of Condition (2), the asymmetrical property of the optical system becomes strong, and unless the asymmetrical property of the rear unit is strengthened, the whole balance ceases to be maintained. When the asymmetrical property of the rear unit is strengthened, accuracy is liable to deteriorate due to the assembly error.

It is further desirable to satisfy the following condition:

$$-0.3 < fly/flx < 0.7 \qquad (2\text{-}2)$$

It is more desirable to satisfy the following condition:

$$-0.2 < fly/flx < 0.6 \qquad (2\text{-}3)$$

The image pickup optical system includes a prism having a reflecting surface with power that is rotationally asymmetrical and an image sensor. In this case, the following function and effect are brought about.

In accordance with a temperature change, the volume, surface profile, and reflective index of the prism are also changed. Due to this change, the spot size on the imaging surface is varied. At this time, in order to perform good photography without increasing the influence of the temperature change on imaging performance, it is desirable that spacing between pixels constituting the image sensor satisfies the following condition:

$$1.2 \ \mu m < P < 3.6 \ \mu m \qquad (3)$$

where P is an average pixel-to-pixel spacing of the image sensor.

Beyond the upper limit of Condition (3), the prism becomes bulky, regardless of the number of pixels. This is unfavorable. Below the lower limit of Condition (3), the prism becomes liable to undergo the influence of the temperature change.

It is further desirable to satisfy the following condition:

$$1.6 \ \mu m < P < 3.3 \ \mu m \qquad (3\text{-}2)$$

It is more desirable to satisfy the following condition:

$$2.0 \ \mu m < P < 3.0 \ \mu m \qquad (3\text{-}3)$$

The phenomenon, mentioned above, that the spot size on the imaging surface is varied in accordance with the temperature change becomes prominent as the brightness of the optical system is increased. Therefore, in order to perform good photography without increasing the influence of the temperature change on imaging performance, it is desirable that the spacing between the pixels constituting the image sensor and the brightness of the optical system satisfy the following condition:

$$4 \ \mu m < P \cdot Fnoy < 25 \ \mu m \qquad (4)$$

where Fnoy is the maximum F-number in the entire optical system.

Beyond the upper limit of Condition (4), the optical system, which is too dark, becomes liable to undergo the influence of a camera shake or causes a noise. Even though the optical system is bright, the prism becomes bulky, regardless of the number of pixels. This is unfavorable. Below the lower limit of Condition (4), the prism becomes liable to undergo the influence of the temperature change.

It is further desirable to satisfy the following condition:

$$5 \ \mu m < P \cdot Fnoy < 15 \ \mu m \qquad (4\text{-}2)$$

It is more desirable to satisfy the following condition:

$$7 \ \mu m < P \cdot Fnoy < 10 \ \mu m \qquad (4\text{-}3)$$

Further, in accordance with a humidity change, water molecules enter and leave the prism. By this phenomenon, the refractive index is changed from the surface of the prism toward the center. Consequently, index distribution is temporarily produced inside the prism to degrade optical performance. When time is passed, the index distribution becomes uniform and the performance is improved. Here, in the case where the prism is relatively small, time when the index distribution is produced is short, while where the prism is large, the time becomes long, that is, time when the performance is degraded becomes long.

The optical system of the present invention is a telecentric optical system, and thus there is a relative relationship between the size of the image sensor and that of the prism. Therefore, in order to obtain good imaging performance with little influence of the humidity change, it is desirable that the size of the image sensor satisfies the following conditions:

$$1.0 \ mm < Dx < 4.0 \ mm \qquad (5)$$

$$1.3 \ mm < Dy < 5.3 \ mm \qquad (6)$$

where Dx is a length in the x direction of an effective pixel area of the image sensor and Dy is a length in the y direction (the decentering direction) of the effective pixel area of the image sensor.

Beyond the upper limit of each of Conditions (5) and (6), the prism becomes too bulky and the degradation of performance in moisture absorption becomes pronounced. Below the lower limit of each of Conditions (5) and (6), the difference between difficulty and ease in molding of the prism becomes remarked and the manufacturing cost is raised.

It is further desirable to satisfy the following conditions:

$$1.5 \ mm < Dx < 3.7 \ mm \qquad (5\text{-}2)$$

$$2.0 \ mm < Dy < 4.9 \ mm \qquad (6\text{-}2)$$

It is more desirable to satisfy the following conditions:

$$2.5 \text{ mm} < Dx < 2.9 \text{ mm} \quad (5\text{-}3)$$

$$3.3 \text{ mm} < Dy < 3.8 \text{ mm} \quad (6\text{-}3)$$

The image sensor has wiring and supporting members for transmitting signals around the effective area for image formation. Consequently, even though the optical system is small, the diameter of the optical module is not reduced when the entire image sensor is large. The optical system of the present invention thus provides at least one reflecting surface with power that is rotationally asymmetrical to bend the optical path. As a result, the wiring of the image sensor is provided in the decentering direction, and thereby an extremely compact optical module can be achieved.

It is therefore desirable to satisfy the following conditions:

$$0.35 < Dx/Bx < 0.95 \quad (7)$$

$$0.12 < Dy/By < 0.50 \quad (8)$$

where Bx is the maximum outside diameter of the prism unit in the x direction and By is the maximum outside diameter of the prism unit in the y direction (the decentering direction).

Beyond the upper limit of each of Conditions (7) and (8), it becomes difficult to arrange members surrounding the image sensor within the range of the diameter of the prism. Below the lower limit of each of Conditions (7) and (8), the prism becomes much larger than the effective pixel area and a compact design cannot be achieved.

It is further desirable to satisfy the following conditions:

$$0.45 < Dx/Bx < 0.92 \quad (7\text{-}2)$$

$$0.17 < Dy/By < 0.45 \quad (8\text{-}2)$$

It is more desirable to satisfy the following conditions:

$$0.55 < Dx/Bx < 0.90 \quad (7\text{-}3)$$

$$0.22 < Dy/By < 0.37 \quad (8\text{-}3)$$

The image pickup optical system of the present invention includes, in order from the object side, a first prism having at least one reflecting surface with power that is rotationally asymmetrical, an aperture stop, a second prism having at least one reflecting surface with power that is rotationally asymmetrical, and an image sensor. In this case, the following function and effect are brought about.

When a reflecting surface and a refracting surface are closely arranged in order to execute a compact design, stray light is liable to be produced by total reflection at the refracting surface. Moreover, in order to eliminate the stray light, space for applying graining processing is lost. Thus, in order to execute the compact design and minimize the production of the stray light, it is desirable to satisfy the following condition:

$$0.19 < h1/(h2 \cdot Fnox) < 0.52 \quad (9)$$

where h1 is the length of a part from a plane including the image sensor from the optical plane of the first prism farthest from the plane, h2 is the length of a part from the plane including the image sensor to the optical plane of the second prism farthest from the plane, and Fnox is the minimum F-number in the entire optical system.

Beyond the upper limit of Condition (9), the entrance surface of the first prism becomes too far from the plane including the image sensor, and hence a ray responsible for the stray light is liable to be incident on the optical system, producing the stray light. Below the lower limit of Condition (9), the entrance surface of the first prism approaches the plane including the image sensor, and thus the second prism becomes too small, with the result that total reflection is liable to occur and the stray light is produced.

It is further desirable to satisfy the following condition:

$$0.26 < h1/(h2 \cdot Fnox) < 0.46 \quad (9\text{-}2)$$

It is more desirable to satisfy the following condition:

$$0.37 < h1/(h2 \cdot Fnox) < 0.40 \quad (9\text{-}3)$$

In the image pickup optical system of the present invention, the power of the whole of the second prism is made positive and the position of the principal point of the entire optical system is approached to the image plane. Whereby, the back focal distance is ensured and the optical system is downsized. In addition, the reflecting surface nearest the image sensor in the second prism also has positive power, for the same reason, in a direction perpendicular to the decentering direction. On the other hand, in a direction parallel to the decentering direction, it is desirable that the reflecting surface nearest the image sensor in the second prism has negative power or very low positive power. This is because the effective diameter in the decentering direction can be decreased so that the size of the second prism is reduced. It is thus desirable to satisfy the following conditions:

$$0.02 < \phi x/\Phi x < 1.95 \quad (10)$$

$$-1.62 < \phi y/\Phi y < 0.30 \quad (11)$$

where φx is a power in the x direction of the reflecting surface nearest the image sensor in the second prism, φy is a power in the y direction (the decentering direction) of the reflecting surface nearest the image sensor in the second prism, Φx is a power in the x direction of the entire optical system, and Φy is a power in the y direction (the decentering direction) of the entire optical system.

Beyond the upper limit of each of Conditions (10) and (11), the effective diameter of the reflecting surface nearest the image sensor in the second prism is increased, and hence the second prism becomes bulky. Below the lower limit of each of Conditions (10) and (11), the position of the principal point is shifted form the image plane, and therefore it becomes difficult to ensure the back focal distance.

It is further desirable to satisfy the following conditions:

$$0.22 < \phi x/\Phi x < 1.30 \quad (10\text{-}2)$$

$$-1.10 < \phi y/\Phi y < 0.20 \quad (11\text{-}2)$$

It is more desirable to satisfy the following conditions:

$$0.52 < \phi x/\Phi x < 0.65 \quad (10\text{-}3)$$

$$-0.54 < \phi y/\Phi y < 0.10 \quad (11\text{-}3)$$

For example, in the case where the image sensor, such as a CCD or C-MOS, is used, when an off-axis light beam emerging from the image optical system is incident on the image plane at an appreciably large angle, a phenomenon that brightness at the middle of the image is different from that on the periphery of the image, that is, the so-called shading, is produced. On the other hand, when the light beam is rendered incident on the image plane at a smaller angle, the above problem is lessened, but the optical system shows an enlarging tendency.

In the image sensor such as a CCD or C-MOS, since the contour of the aperture of each pixel is rectangular, grazing incidence shows the asymmetrical property. Thus, in order to uniform the brightness of the image, it is desirable that the direction of the short side of the image sensor is different from that of the long side. For this purpose, it is desirable to satisfy the following conditions:

$$-10.0° < \theta x < 11.0° \quad (12)$$

$$0.5° < \theta x - \theta y < 23.0° \quad (13)$$

where θx is the angle of incidence of a chief ray on the image sensor in the x direction (the direction of the short side of the image sensor) and θy is the angle of incidence of the chief ray on the image sensor in the y direction.

Below the lower limit of each of Conditions (12) and (13), the angle of incidence on the CCD becomes so large that brightness on the periphery of the image is impaired.

Beyond the upper limit of each of Conditions (12) and (13), the overall length is extremely increased. Outside of the limits of Conditions (12) and (13), nonuniformity is caused to brightness such that an attenuation factor is different with respect to the long and short sides of the image sensor.

It is further desirable to satisfy the following conditions:

$$-8.0° < \theta x < 9.0° \quad (12\text{-}2)$$

$$0.6° < \theta x - \theta y < 18.0° \quad (13\text{-}2)$$

It is more desirable to satisfy the following conditions:

$$-5.0° < \theta x < 7.0° \quad (12\text{-}3)$$

$$0.7° < \theta x - \theta y < 13.0° \quad (13\text{-}3)$$

In the image pickup optical system of the present invention, it is desirable that the aperture stop is circular. By doing so, the manufacturing error of a stop member is easily suppressed. In the assembly, since the shape of the pupil does not affect the accuracy of assembly in the direction of rotation of the optical members and the stop, the adjustment of accuracy in the direction of rotation becomes unnecessary and the assembly is facilitated.

According to the present invention, it is possible to provide the image pickup optical system of high performance which, in contrast with the conventional optical system having compact and slim designs, is capable of achieving further compact and slim designs and keeps the influence of the temperature change of the prism, which is a component, on the spot diameter to a minimum, and the optical apparatus using this optical system.

As the optical apparatus using the image pickup optical system of the present invention, a digital camera, a projector, an endoscope, or a mobile phone is applicable.

Also, it is desirable that the reflecting surface with power that is rotationally asymmetrical, used in the present invention is configured into the shape of a face-symmetrical free-formed surface that is only one symmetrical surface. Here, the configuration of the free-formed surface used in the present invention is defined, for example, by Equation (a) of U.S. Pat. No. 6,124,989, and the Z axis of this equation is the axis of the free-formed surface. The power and focal length of the decentering optical system are defined, for example, in accordance with FIG. 15 of U.S. Pat. No. 6,124,989.

The embodiments of the present invention will be explained below with reference to the drawings.

In the constitutive parameters of individual embodiments, as shown in FIG. 1, an axial chief ray 1 in forward ray tracing is defined as a light ray that emanates from the center of an object, passes perpendicularly through the center of a stop 2 of the optical system, and reaches the center of an image plane 3a. The point of intersection of a first surface located at the most object-side position of the optical system (a surface CG1a of a cover glass CG1 in FIG. 1) with the axial chief ray 1 is taken as the origin of the decentering optical surface of the decentering optical system. A direction followed along the axial chief ray 1 is taken as the Z axis; the direction of the first surface 1 from the object as a positive Z axis; a plane in which the optical axis is bent as a Y-Z plane; a direction that passes through the origin and is perpendicular to the Y-Z plane as the X axis; a direction followed from the surface of the page of FIG. 1 to the back surface as a positive X axis; and an axis constituting the right-handed coordinate system, together with the X and Y axes, as the Y axis.

In each of the first to third embodiments to be described later, the decentration of each surface takes place in the Y-Z plane, and only one symmetrical surface of each rotationally asymmetrical free-formed surface is set as the Y-Z plane.

A decentered surface gives the amount of decentration from the center of the origin of the optical system to the vertex of this surface (the directions of the X, Y, and Z axes are denoted by X, Y, and Z, respectively) and inclination angles (denoted by α, β, and γ (°)) of the center axis of the decentered surface, with the X, Y, and Z axes as centers. (In the free-formed surface, the Z axis of Equation (a) of reference cited, described later, is used). In this case, the positive of each of the angles α and β means a counterclockwise rotation with respect to the positive direction of the axis, and the positive of the angle γ means a clockwise rotation with respect to the positive direction of the Z axis. The procedure of rotation of the center axis of the surface relative to the angles α, β, and γ is as follows: The center axis of the surface and its XYZ coordinate system are first rotated counterclockwise by the angle α around the X axis. The center axis of the rotated surface is then rotated counterclockwise by the angle β around the Y axis of a new coordinate system and the coordinate system rotated once is also rotated counterclockwise by the angle β around the Y axis. Subsequently, the center axis of the surface rotated twice is rotated clockwise by the angle γ around the Z axis of a new coordinate system.

In optical function surfaces constituting the optical systems of individual embodiments, when a specific surface and subsequent surfaces constitute a coaxial optical system, a face-to-face spacing is provided and the refractive index and Abbe's number of a medium are given in accordance with the common practice.

First Embodiment

FIG. 1 shows the image pickup optical system, developed along the optical axis, of the first embodiment in the present invention. FIGS. 2A-2L show transverse aberration characteristics of the optical system in the first embodiment. FIG. 3A shows the shapes of light beams incident on the entrance surface of a first prism of the image pickup optical system of the present invention. FIG. 3B shows the shape of the light beams on an aperture stop in FIG. 3A.

The image pickup optical system of the first embodiment includes, in order from the object side, a cover glass plate CG1, a front unit G1, an aperture stop 2, a rear unit G2, and a cover glass plate CG2. In FIG. 1, reference numeral 3 represents an imaging surface. Each of the cover glass plates CG1 and CG2 is configured like a plane-parallel plate.

The front unit G1 is constructed with a prism 10 having an entrance surface $1_1$, a reflecting surface $1_2$, and an exit surface $1_3$. The rear unit G2 is constructed with a prism 20 having an entrance surface $2_1$, a reflecting surface $2_2$, a reflecting surface $2_3$, and an exit surface $2_4$.

Each of the entrance surface $1_1$, the reflecting surface $1_2$, the exit surface $1_3$, the entrance surface $2_1$, the reflecting surface $2_2$, the reflecting surface $2_3$, and the exit surface $2_4$ is configured into the shape of a free-formed surface with power that is rotationally asymmetrical, and is decentered in the Y direction. The aperture stop 2 is such that its aperture is circular.

The image pickup optical system of the first embodiment is constructed so that the F-number in the X direction is smaller than that in the Y direction.

The free-formed surface used in the first embodiment is the one defined, for example, by Equation (a) of U.S. Pat. No. 6,124,989, and the Z axis of this equation is the axis of the free-formed surface. This also holds for individual embodiments described later.

According to the image pickup optical system of the first embodiment constructed as mentioned above, individual light beams passing through the cover-glass plate CG1 and incident on the entrance surface $1_1$ of the prism of the front unit G1, in elliptical shapes such as those shown in FIG. 3A, assume the shape of a circle on the aperture stop 2 as shown in FIG. 3B.

Subsequently, numerical data of optical members constituting the image pickup optical system of the first embodiment are shown below. In the numerical data, "FSS" indicates the free-formed surface and "REF" indicates the reflecting surface. The refractive index and the Abbe's number refer to the d line. These are also used in the numerical data of the embodiments to be described later.

Numerical Data 1

Size of imaging surface: 4.48 mm (X direction)×3.36 mm (Y direction)

Photographic angle of view: Horizontal angle of view (X direction) 51.0°Vertical angle of view (Y direction) 39.3°

Diameter of entrance pupil: Elliptic shape of X direction 1.99 mm and Y direction 1.48 mm Aperture stop: Circle with a diameter of 1.54 mm

| Face number | Radius of curvature | Face spacing | Decentration | Refractive index | Abbe's number | Reflecting surface |
|---|---|---|---|---|---|---|
| Object surface | ∞ | ∞ | | | | |
| 1 | ∞ | 0.00 | | 1.4950 | 65.0 | |
| 2 | ∞ | 0.00 | Decentration (1) | | | |
| 3 | FSS [1] | 0.00 | Decentration (2) | 1.6069 | 27.0 | |
| 4 | FSS [2] | 0.00 | Decentration (3) | 1.6069 | 27.0 | REF |
| 5 | FSS [3] | 0.00 | Decentration (4) | | | |
| 6 | Stop surface | 0.00 | Decentration (5) | | | |
| 7 | FSS [4] | 0.00 | Decentration (6) | 1.5091 | 56.2 | |
| 8 | FSS [5] | 0.00 | Decentration (7) | 1.5091 | 56.2 | REF |
| 9 | FSS [6] | 0.00 | Decentration (8) | 1.5091 | 56.2 | REF |
| 10 | FSS [7] | 0.00 | Decentration (9) | | | |
| 11 | ∞ | 0.00 | Decentration (10) | 1.5163 | 64.1 | |
| 12 | ∞ | 0.00 | Decentration (11) | | | |
| Image plane | ∞ | 0.00 | Decentration (12) | | | |

FSS [1]

$C4 = 3.4680 \times 10^{-2}$       $C6 = 5.1485 \times 10^{-2}$       $C8 = -1.4081 \times 10^{-3}$
$C10 = -5.1472 \times 10^{-4}$     $C11 = 1.8078 \times 10^{-4}$      $C13 = 3.4463 \times 10^{-4}$
$C15 = -2.0185 \times 10^{-4}$     $C17 = 1.2992 \times 10^{-5}$      $C19 = 1.7257 \times 10^{-5}$
$C21 = 4.3856 \times 10^{-6}$      $C22 = 2.3982 \times 10^{-6}$      $C24 = 4.3375 \times 10^{-6}$
$C26 = -4.6872 \times 10^{-6}$     $C28 = -5.1139 \times 10^{-7}$

FSS [2]

$C4 = -2.5129 \times 10^{-3}$      $C6 = 1.5256 \times 10^{-2}$       $C8 = -1.0080 \times 10^{-3}$
$C10 = 1.0732 \times 10^{-3}$      $C11 = 2.9666 \times 10^{-5}$      $C13 = -3.2614 \times 10^{-4}$
$C15 = -6.5430 \times 10^{-5}$     $C17 = 2.1955 \times 10^{-5}$      $C19 = -3.9044 \times 10^{-5}$
$C21 = -3.0601 \times 10^{-5}$     $C22 = -3.0410 \times 10^{-7}$     $C24 = 4.8235 \times 10^{-6}$
$C26 = -2.6507 \times 10^{-6}$     $C28 = -2.8048 \times 10^{-6}$

FSS [3]

$C3 = -4.7769 \times 10^{-2}$      $C4 = 5.4512 \times 10^{-2}$       $C6 = 3.8915 \times 10^{-2}$
$C8 = -2.9262 \times 10^{-3}$      $C10 = 6.1450 \times 10^{-3}$      $C11 = 5.0904 \times 10^{-4}$
$C13 = 1.1362 \times 10^{-2}$      $C15 = 6.4673 \times 10^{-4}$      $C17 = 4.4550 \times 10^{-4}$
$C19 = -1.2918 \times 10^{-3}$     $C21 = -8.0008 \times 10^{-4}$     $C22 = -6.6803 \times 10^{-5}$
$C24 = 4.4659 \times 10^{-4}$      $C26 = -2.1402 \times 10^{-4}$     $C28 = -7.3274 \times 10^{-5}$

FSS [4]

$C3 = 2.7031 \times 10^{-3}$       $C4 = -8.6219 \times 10^{-2}$      $C6 = 6.2598 \times 10^{-2}$
$C8 = 7.8028 \times 10^{-3}$       $C10 = 6.6722 \times 10^{-4}$      $C11 = -2.6096 \times 10^{-4}$
$C13 = 6.2936 \times 10^{-3}$      $C15 = -3.9848 \times 10^{-4}$     $C17 = 8.9105 \times 10^{-5}$
$C19 = -8.5638 \times 10^{-4}$     $C21 = -4.3613 \times 10^{-4}$     $C22 = -1.2310 \times 10^{-3}$
$C24 = 8.6338 \times 10^{-4}$      $C26 = -4.2380 \times 10^{-4}$     $C28 = 1.4998 \times 10^{-4}$

FSS [5]

$C4 = 2.8775 \times 10^{-2}$       $C6 = 2.4982 \times 10^{-2}$       $C8 = 1.4210 \times 10^{-3}$
$C10 = -1.9615 \times 10^{-4}$     $C11 = -2.2015 \times 10^{-5}$     $C13 = 3.0027 \times 10^{-4}$
$C15 = 7.2102 \times 10^{-5}$      $C17 = -4.4039 \times 10^{-6}$     $C19 = 1.0024 \times 10^{-6}$
$C21 = -2.9125 \times 10^{-5}$     $C22 = -9.3152 \times 10^{-7}$     $C24 = -3.7779 \times 10^{-6}$
$C26 = -7.0364 \times 10^{-6}$     $C28 = -2.0070 \times 10^{-6}$ -continued

FSS [6]

| | | |
|---|---|---|
| C4 = 2.1021 × 10$^{-2}$ | C6 = 4.8223 × 10$^{-3}$ | C8 = 4.5565 × 10$^{-4}$ |
| C10 = −5.9938 × 10$^{-4}$ | C11 = 2.6333 × 10$^{-5}$ | C13 = −4.1976 × 10$^{-4}$ |
| C15 = −1.2801 × 10$^{-4}$ | C17 = 2.4625 × 10$^{-6}$ | C19 = 3.1297 × 10$^{-5}$ |
| C21 = −2.4613 × 10$^{-5}$ | C22 = 7.3763 × 10$^{-7}$ | C24 = 6.0600 × 10$^{-6}$ |
| C26 = 9.6707 × 10$^{-6}$ | C28 = 6.2242 × 10$^{-6}$ | |

FSS[7]

| | | |
|---|---|---|
| C4 = −5.5650 × 10$^{-2}$ | C6 = −6.9338 × 10$^{-2}$ | C8 = 8.1177 × 10$^{-3}$ |
| C10 = −1.0109 × 10$^{-3}$ | C11 = 1.0414 × 10$^{-3}$ | C13 = 4.4437 × 10$^{-3}$ |
| C15 = 1.9271 × 10$^{-3}$ | C17 = −1.2022 × 10$^{-4}$ | C19 = 4.7616 × 10$^{-4}$ |
| C21 = −5.0570 × 10$^{-5}$ | C22 = −1.2132 × 10$^{-5}$ | C24 = −1.1792 × 10$^{-4}$ |
| C26 = −6.1558 × 10$^{-5}$ | C28 = 2.7323 × 10$^{-4}$ | |

Decentration [1]

| | | |
|---|---|---|
| X = 0.00 | Y = 0.00 | Z = 0.50 |
| α = 0.00 | β = 0.00 | γ = 0.00 |

Decentration [2]

| | | |
|---|---|---|
| X = 0.00 | Y = 0.00 | Z = 0.75 |
| α = −3.19 | β = 0.00 | γ = 0.00 |

Decentration [3]

| | | |
|---|---|---|
| X = 0.00 | Y = −0.08 | Z = 4.60 |
| α = −41.79 | β = 0.00 | γ = 0.00 |

Decentration [4]

| | | |
|---|---|---|
| X = 0.00 | Y = 3.54 | Z = 4.11 |
| α = 96.59 | β = 0.00 | γ = 0.00 |

Decentration [5]

| | | |
|---|---|---|
| X = 0.00 | Y = 4.49 | Z = 4.01 |
| α = 96.59 | β = 0.00 | γ = 0.00 |

Decentration [6]

| | | |
|---|---|---|
| X = 0.00 | Y = 4.68 | Z = 3.98 |
| α = 96.59 | β = 0.00 | γ = 0.00 |

Decentration [7]

| | | |
|---|---|---|
| X = 0.00 | Y = 10.00 | Z = 3.37 |
| α = −103.09 | β = 0.00 | γ = 0.00 |

Decentration [8]

| | | |
|---|---|---|
| X = 0.00 | Y = 7.16 | Z = 1.55 |
| α = 28.31 | β = 0.00 | γ = 0.00 |

Decentration [9]

| | | |
|---|---|---|
| X = 0.00 | Y = 7.11 | Z = 5.96 |
| α = 0.37 | β = 0.00 | γ = 0.00 |

Decentration [10]

| | | |
|---|---|---|
| X = 0.00 | Y = 7.08 | Z = 6.26 |
| α = 0.00 | β = 0.00 | γ = 0.00 |

Decentration [11]

| | | |
|---|---|---|
| X = 0.00 | Y = 7.08 | Z = 6.76 |
| α = 0.00 | β = 0.00 | γ = 0.00 |

Decentration [12]

| | | |
|---|---|---|
| X = 0.00 | Y = 7.08 | Z = 7.35 |
| α = 0.00 | β = 0.00 | γ = 0.00 |

Second Embodiment

Figure 4:
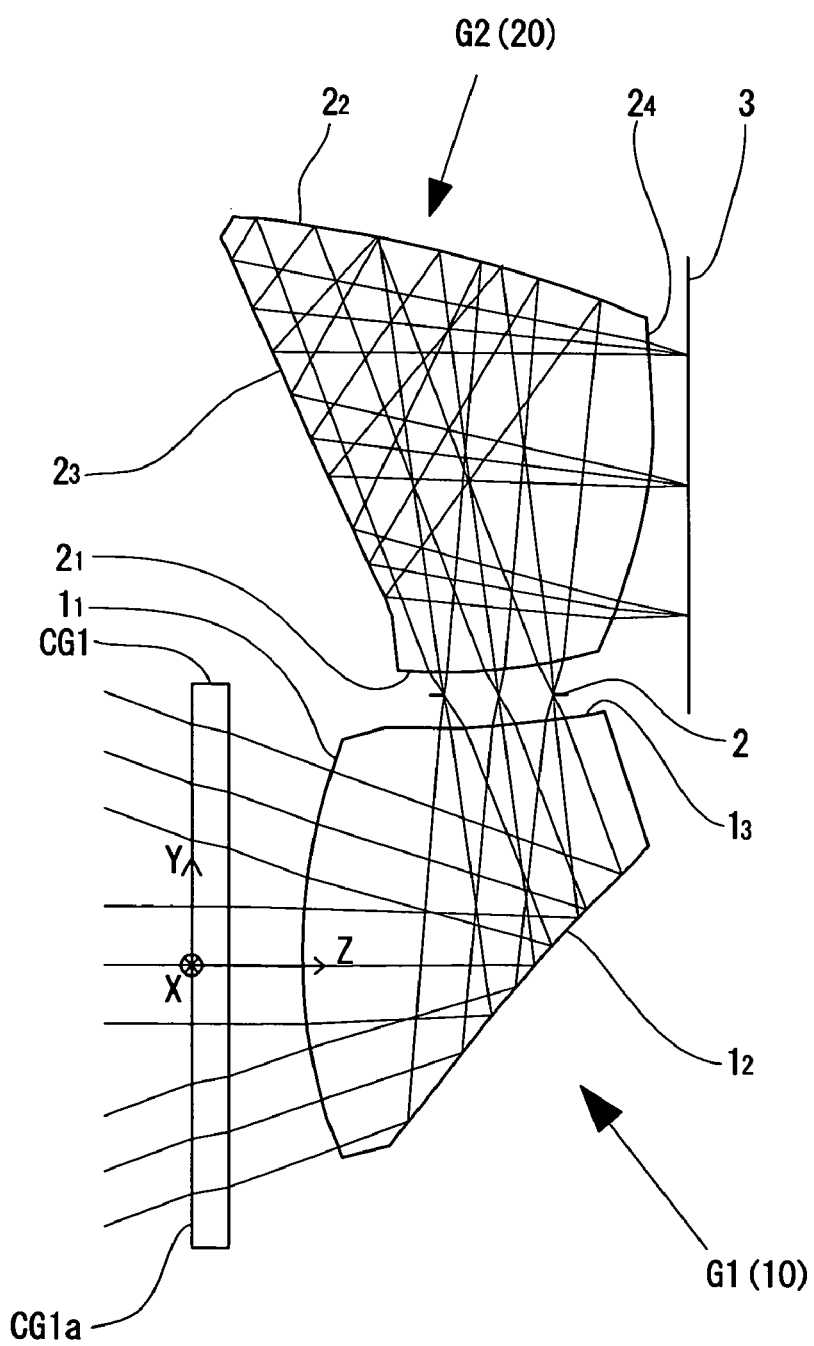
FIG. 4 is a sectional view showing schematically the image pickup optical system, developed along the optical axis, of a second embodiment in the present invention.

FIG. 4 shows the image pickup optical system, developed along the optical axis, of the second embodiment in the present invention.

The image pickup optical system of the second embodiment includes, in order from the object side, the cover glass plate CG1, the front unit G1, the aperture stop 2, and the rear unit G2. In this figure, again reference numeral 3 represents an imaging surface.

The cover glass plate CG1 is configured like a plane-parallel plate. The cover glass plate CG1 has the function of cutting off IR light in such a way that, for example, its surface is coated with a film for cutting off IR light.

The front unit G1 is constructed with the prism 10 having the entrance surface $1_1$, the reflecting surface $1_2$, and the exit surface $1_3$. The rear unit G2 is constructed with the prism 20 having the entrance surface $2_1$, the reflecting surface $2_2$, the reflecting surface $2_3$, and the exit surface $2_4$.

Each of the entrance surface $1_1$, the reflecting surface $1_2$, the exit surface $1_3$, the entrance surface $2_1$, the reflecting surface $2_2$, the reflecting surface $2_3$, and the exit surface $2_4$ is configured into the shape of a free-formed surface with power that is rotationally asymmetrical, and is decentered in the Y direction. The aperture stop 2 is such that its aperture is circular.

The image pickup optical system of the second embodiment is constructed so that the F-number in the X direction is smaller than that in the Y direction.

According to the image pickup optical system of the second embodiment constructed as mentioned above, individual light beams passing through the cover glass plate CG1 and incident on the entrance surface $1_1$ of the prism of the front unit G1, in elliptical shapes such as those shown in FIG. 3A, assume the shape of a circle on the aperture stop 2 as shown in FIG. 3B.

Subsequently, numerical data of optical members constituting the image pickup optical system of the second embodiment are shown below.

Numerical Data 2

Size of imaging surface: 4.48 mm (X direction)×3.36 mm (Y direction)

Photographic angle of view: Horizontal angle of view (X direction) 51.0°Vertical angle of view (Y direction) 39.3°

Diameter of entrance pupil: Elliptic shape of X direction 1.875 mm and Y direction 1.50 mm Aperture stop: Circle with a diameter of 1.44 mm

| Face number | Radius of curvature | Face spacing | Decentration | Refractive index | Abbe's number | Reflecting surface |
|---|---|---|---|---|---|---|
| Object surface | ∞ | ∞ | | | | |
| 1 | ∞ | 0.00 | | 1.4950 | 65.0 | |
| 2 | ∞ | 0.00 | Decentration (1) | | | |
| 3 | FSS [1] | 0.00 | Decentration (2) | 1.5753 | 33.5 | |
| 4 | FSS [2] | 0.00 | Decentration (3) | 1.5753 | 33.5 | REF |
| 5 | FSS [3] | 0.00 | Decentration (4) | | | |
| 6 | Stop surface | 0.00 | Decentration (5) | | | |
| 7 | FSS [4] | 0.00 | Decentration (6) | 1.5254 | 55.8 | |
| 8 | FSS [5] | 0.00 | Decentration (7) | 1.5254 | 55.8 | REF |
| 9 | FSS [6] | 0.00 | Decentration (8) | 1.5254 | 55.8 | REF |
| 10 | FSS [7] | 0.00 | Decentration (9) | | | |
| Image plane | ∞ | 0.00 | Decentration (10) | | | |

FSS [1]

$C4 = 3.4355 \times 10^{-2}$  $C6 = 6.9006 \times 10^{-2}$  $C8 = -1.6647 \times 10^{-3}$
$C10 = -9.5905 \times 10^{-4}$  $C11 = 3.4899 \times 10^{-4}$  $C13 = 4.6329 \times 10^{-4}$
$C15 = 2.4423 \times 10^{-4}$  $C17 = 1.2997 \times 10^{-6}$  $C19 = 4.2350 \times 10^{-5}$
$C21 = 1.1697 \times 10^{-7}$

FSS [2]

$C4 = -6.2934 \times 10^{-3}$  $C6 = 1.6149 \times 10^{-2}$  $C8 = -1.5190 \times 10^{-3}$
$C10 = 9.0080 \times 10^{-4}$  $C11 = 6.5049 \times 10^{-5}$  $C13 = -4.8527 \times 10^{-4}$
$C15 = 4.5741 \times 10^{-7}$  $C17 = 2.8611 \times 10^{-5}$  $C19 = -6.0600 \times 10^{-5}$
$C21 = -1.4921 \times 10^{-6}$

FSS [3]

$C4 = 2.5390 \times 10^{-2}$  $C6 = 4.2532 \times 10^{-2}$  $C8 = -2.8008 \times 10^{-3}$
$C10 = 6.1484 \times 10^{-3}$  $C11 = -4.3925 \times 10^{-3}$  $C13 = 1.8932 \times 10^{-2}$
$C15 = -1.0012 \times 10^{-4}$

FSS [4]

$C4 = -1.1067 \times 10^{-1}$  $C6 = 6.6993 \times 10^{-2}$  $C8 = 5.8855 \times 10^{-3}$
$C10 = 2.5677 \times 10^{-3}$  $C11 = -7.2179 \times 10^{-3}$  $C13 = 1.4657 \times 10^{-2}$
$C15 = -9.9668 \times 10^{-4}$

FSS [5]

$C4 = 2.9945 \times 10^{-2}$  $C6 = 2.8616 \times 10^{-2}$  $C8 = 3.9790 \times 10^{-4}$
$C10 = 3.0676 \times 10^{-5}$  $C11 = 5.4263 \times 10^{-5}$  $C13 = 2.7278 \times 10^{-4}$
$C15 = 9.3669 \times 10^{-5}$  $C17 = 5.8459 \times 10^{-6}$  $C19 = 9.2474 \times 10^{-7}$
$C21 = -8.1659 \times 10^{-6}$

FSS [6]

$C4 = 2.5046 \times 10^{-2}$  $C6 = 2.8882 \times 10^{-3}$  $C8 = -1.0081 \times 10^{-3}$
$C10 = 1.8226 \times 10^{-5}$  $C11 = 3.7867 \times 10^{-5}$  $C13 = -1.8733 \times 10^{-4}$
$C15 = -1.9180 \times 10^{-4}$  $C17 = 1.0036 \times 10^{-6}$  $C19 = 1.6523 \times 10^{-5}$
$C21 = 1.6730 \times 10^{-5}$

FSS [7]

$C4 = 1.6177 \times 10^{-2}$  $C6 = -9.5172 \times 10^{-2}$  $C8 = 5.1221 \times 10^{-3}$
$C10 = -3.3968 \times 10^{-3}$  $C11 = 8.8131 \times 10^{-4}$  $C13 = 1.0236 \times 10^{-2}$
$C15 = 5.8424 \times 10^{-3}$  $C17 = 8.1349 \times 10^{-4}$  $C19 = 2.7593 \times 10^{-3}$
$C21 = 1.1962 \times 10^{-3}$ Decentration [1]

$X = 0.00$  $Y = 0.00$  $Z = 0.50$
$\alpha = 0.00$  $\beta = 0.00$  $\gamma = 0.00$ -continued

Decentration [2]
| | | |
|---|---|---|
| X = 0.00 | Y = −0.00 | Z = 1.47 |
| α = 1.34 | β = 0.00 | γ = 0.00 |

Decentration [3]
| | | |
|---|---|---|
| X = 0.00 | Y = 0.03 | Z = 4.51 |
| α = −41.07 | β = 0.00 | γ = 0.00 |

Decentration [4]
| | | |
|---|---|---|
| X = 0.00 | Y = 3.17 | Z = 4.11 |
| α = 95.64 | β = 0.00 | γ = 0.00 |

Decentration [5]
| | | |
|---|---|---|
| X = 0.00 | Y = 3.57 | Z = 4.05 |
| α = 90.72 | β = 0.00 | γ = 0.00 |

Decentration [6]
| | | |
|---|---|---|
| X = 0.00 | Y = 3.90 | Z = 4.00 |
| α = 95.88 | β = 0.00 | γ = 0.00 |

Decentration [7]
| | | |
|---|---|---|
| X = 0.00 | Y = 9.43 | Z = 3.27 |
| α = −103.38 | β = 0.00 | γ = 0.00 |

Decentration [8]
| | | |
|---|---|---|
| X = 0.00 | Y = 6.94 | Z = 1.58 |
| α = 24.48 | β = 0.00 | γ = 0.00 |

Decentration [9]
| | | |
|---|---|---|
| X = 0.00 | Y = 6.41 | Z = 6.00 |
| α = −6.91 | β = 0.00 | γ = 0.00 |

Decentration [10]
| | | |
|---|---|---|
| X = 0.00 | Y = 6.35 | Z = 6.50 |
| α = 0.00 | β = 0.00 | γ = 0.00 |

Third Embodiment

Figure 5:
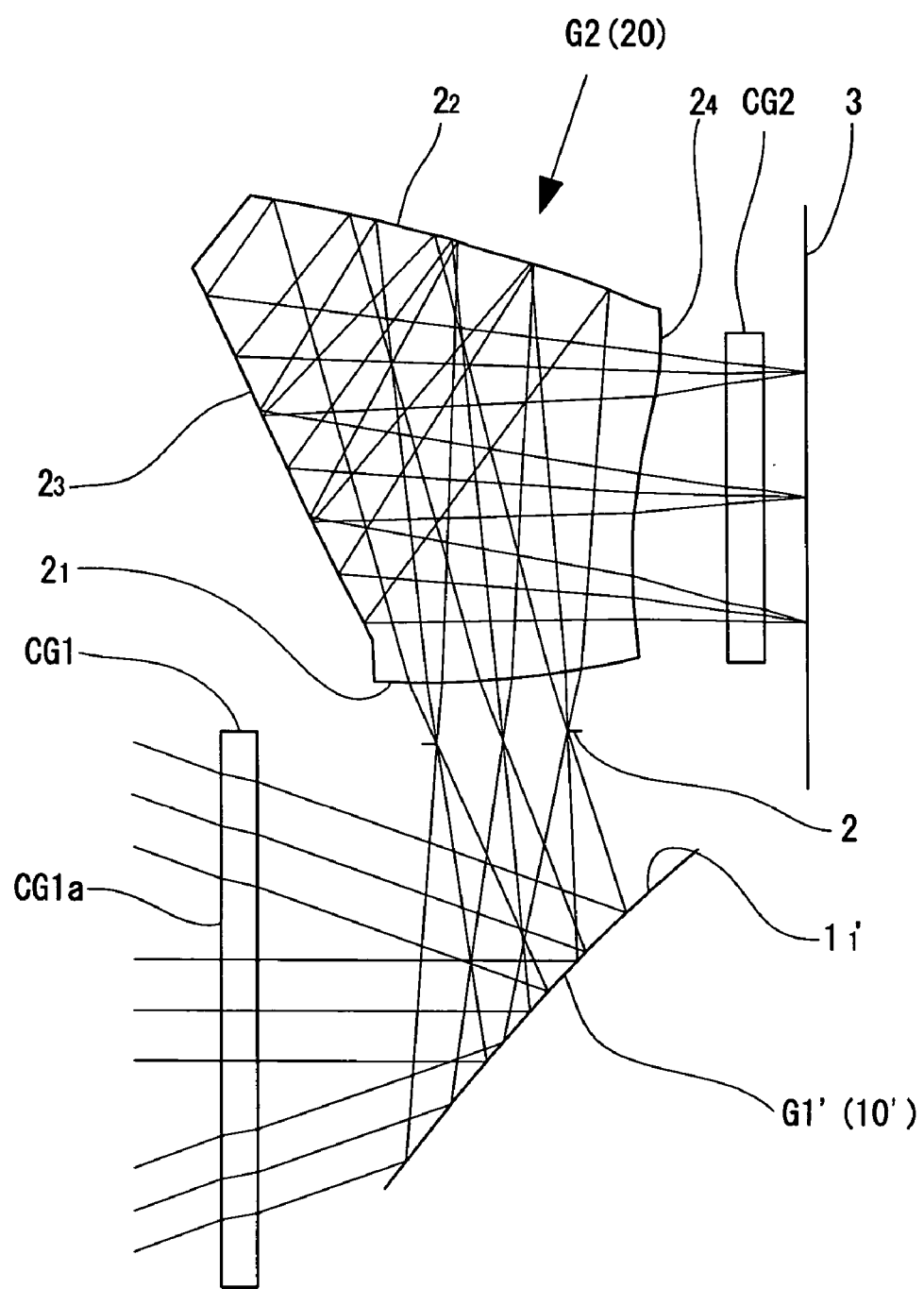
FIG. 5 is a sectional view showing schematically the image pickup optical system, developed along the optical axis, of a third embodiment in the present invention.

FIG. 5 shows the image pickup optical system, developed along the optical axis, of the third embodiment in the present invention.

The image pickup optical system of the third embodiment includes, in order from the object side, the cover glass plate CG1, a front unit G1', the aperture stop 2, the rear unit G2, and the cover glass plate CG2. In this figure, again reference numeral 3 represents an imaging surface. Each of the cover glass plates CG1 and CG2 is configured like a plane-parallel plate.

The front unit G1' is constructed with a mirror 10' having a reflecting surface $1_1$'. The rear unit G2 is constructed with the prism 20 having the entrance surface $2_1$, the reflecting surface $2_2$, the reflecting surface $2_3$, and the exit surface $2_4$.

Each of the reflecting surface $1_1$', the entrance surface $2_1$, the reflecting surface $2_2$, the reflecting surface $2_3$, and the exit surface $2_4$ is configured into the shape of a free-formed surface with power that is rotationally asymmetrical, and is decentered in the Y direction. The aperture stop 2 is such that its aperture is circular.

The image pickup optical system of the third embodiment is constructed so that the F-number in the X direction is smaller than that in the Y direction.

Other features of the arrangement, function, and effect of the third embodiment are almost the same as in the first embodiment.

Subsequently, numerical data of optical members constituting the image pickup optical system of the third embodiment are shown below.

Numerical Data 3

Size of imaging surface: 4.48 mm (X direction)×3.36 mm (Y direction)

Photographic angle of view: Horizontal angle of view (X direction) 51.0° Vertical angle of view (Y direction) 39.3°

Diameter of entrance pupil: Elliptic shape of X direction 1.874 mm and Y direction 1.38 mm Aperture stop: Circle with a diameter of 1.80 mm

| Face number | Radius of curvature | Face spacing | Decentration | Refractive index | Abbe's number | Reflecting surface |
|---|---|---|---|---|---|---|
| Object surface | ∞ | ∞ | | | | |
| 1 | ∞ | 0.00 | | 1.4950 | 65.0 | |
| 2 | ∞ | 0.00 | Decentration (1) | | | |
| 3 | FSS [1] | 0.00 | Decentration (2) | | | REF |
| 4 | Stop surface | 0.00 | Decentration (3) | | | |
| 5 | FSS [2] | 0.00 | Decentration (4) | 1.5091 | 56.2 | |
| 6 | FSS [3] | 0.00 | Decentration (5) | 1.5091 | 56.2 | REF |
| 7 | FSS [4] | 0.00 | Decentration (6) | 1.5091 | 56.2 | REF |

-continued

| 8 | FSS [5] | 0.00 | Decentration (7) | | |
| 9 | ∞ | 0.00 | Decentration (8) | 1.5163 | 64.1 |
| 10 | ∞ | 0.00 | Decentration (9) | | |
| Image plane | ∞ | 0.00 | Decentration (10) | | |

FSS [1]

C4 = −3.4019 × 10$^{-3}$     C6 = 1.5199 × 10$^{-2}$     C8 = −8.6134 × 10$^{-4}$
C10 = 4.4870 × 10$^{-4}$     C11 = −7.5896 × 10$^{-5}$    C13 = −1.7503 × 10$^{-4}$
C15 = 2.1805 × 10$^{-4}$     C17 = −2.0443 × 10$^{-5}$    C19 = −1.7062 × 10$^{-5}$
C21 = 2.1009 × 10$^{-5}$

FSS [2]

C4 = −9.3351 × 10$^{-2}$     C6 = 3.7079 × 10$^{-2}$     C8 = 1.0135 × 10$^{-2}$
C10 = 1.0483 × 10$^{-3}$     C11 = −1.5275 × 10$^{-3}$    C13 = −3.1194 × 10$^{-3}$
C15 = 1.0323 × 10$^{-3}$

FSS [3]

C4 = 2.4193 × 10$^{-2}$      C6 = 2.0387 × 10$^{-2}$     C8 = 1.3754 × 10$^{-3}$
C10 = 1.1123 × 10$^{-4}$     C11 = −1.2184 × 10$^{-5}$    C13 = 3.6095 × 10$^{-4}$
C15 = −5.9683 × 10$^{-5}$    C17 = 8.6795 × 10$^{-7}$     C19 = 4.2268 × 10$^{-6}$
C21 = −3.3515 × 10$^{-6}$

FSS [4]

C4 = 1.9692 × 10$^{-2}$      C6 = 5.9797 × 10$^{-3}$     C8 = 5.6500 × 10$^{-4}$
C10 = −6.0461 × 10$^{-4}$    C11 = 3.1477 × 10$^{-5}$     C13 = −2.4492 × 10$^{-4}$
C15 = 1.7712 × 10$^{-5}$     C17 = 4.9624 × 10$^{-6}$     C19 = −1.1691 × 10$^{-5}$
C21 = −8.5947 × 10$^{-8}$

FSS [5]

C4 = 3.0508 × 10$^{-2}$      C6 = 6.3482 × 10$^{-2}$     C8 = 1.3524 × 10$^{-3}$
C10 = −1.4040 × 10$^{-2}$    C11 = −1.1431 × 10$^{-3}$    C13 = 6.6454 × 10$^{-3}$
C15 = −4.9308 × 10$^{-3}$

Decentration [1]

X = 0.00     Y = 0.00     Z = 0.50
α = 0.00     β = 0.00     γ = 0.00

Decentration [2]

X = 0.00      Y = 0.00     Z = 4.24
α = −42.13    β = 0.00     γ = 0.00

Decentration [3]

X = 0.00      Y = 3.73     Z = 3.86
α = 95.75     β = 0.00     γ = 0.00

Decentration [4]

X = 0.00      Y = 4.52     Z = 3.78
α = 94.86     β = 0.00     γ = 0.00

Decentration [5]

X = 0.00       Y = 10.55    Z = 3.21
α = −105.21    β = 0.00     γ = 0.00

Decentration [6]

X = 0.00      Y = 7.41     Z = 0.93
α = 25.20     β = 0.00     γ = 0.00

Decentration [7]

X = 0.00      Y = 7.09     Z = 5.69
α = −8.04     β = 0.00     γ = 0.00

Decentration [8]

X = 0.00     Y = 7.04     Z = 6.91
α = 0.00     β = 0.00     γ = 0.00

Decentration [9]

X = 0.00     Y = 7.04     Z = 7.41
α = 0.00     β = 0.00     γ = 0.00

Decentration [10]

X = 0.00     Y = 7.04     Z = 8.00
α = 0.00     β = 0.00     γ = 0.00

Fourth Embodiment

Figure 6:
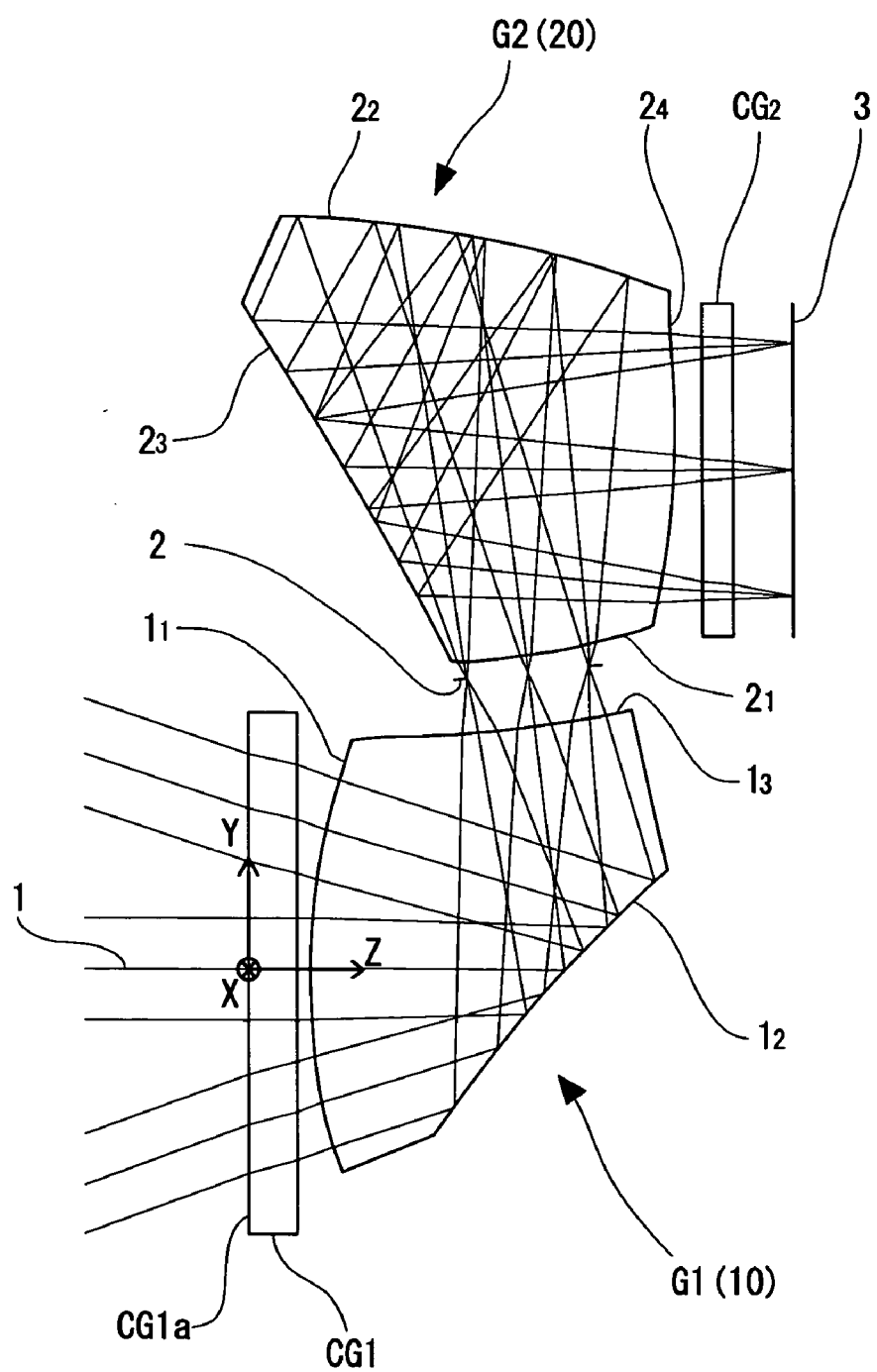
FIG. 6 is a sectional view showing schematically the image pickup optical system, developed along the optical axis, of a fourth embodiment in the present invention.

FIG. 6 shows the image pickup optical system, developed along the optical axis, of the fourth embodiment in the present invention. FIGS. 7A-7L show transverse aberration characteristics, in focusing at an infinite object point, of the optical system in the fourth embodiment. FIGS. 8A-8L show transverse aberration characteristics, in focusing at a near point of 100 m, of the optical system in the fourth embodiment.

The image pickup optical system of the fourth embodiment includes, in order from the object side, the cover glass plate CG1, the front unit G1, the aperture stop 2, the rear unit G2, and the cover glass plate CG2. In FIG. 6, again reference numeral 3 represents an imaging surface. Each of the cover glass plates CG1 and CG2 is configured like a plane-parallel plate. Also, instead of the cover glass plate CG1, a filter may be used.

The front unit G1 is constructed with the first prism 10 having the entrance surface $1_1$, the reflecting surface $1_2$, and the exit surface $1_3$. The rear unit G2 is constructed with the second prism 20 having the entrance surface $2_1$, the reflecting surface $2_2$, the reflecting surface $2_3$, and the exit surface $2_4$.

Each of the entrance surface $1_1$, the reflecting surface $1_2$, the exit surface $1_3$, the entrance surface $2_1$, the reflecting surface $2_2$, the reflecting surface $2_3$, and the exit surface $2_4$ is configured into the shape of a free-formed surface with power that is rotationally asymmetrical, and is decentered in the Y direction. The aperture stop 2 is such that its aperture is circular.

The image pickup optical system of the fourth embodiment is constructed so that the F-number in the X direction is smaller than that in the Y direction.

Other features of the arrangement, function, and effect of the fourth embodiment are almost the same as in the first embodiment.

Subsequently, numerical data of optical members constituting the image pickup optical system of the fourth embodiment are shown below.

Numerical Data 4
Total horizontal angle of view: 52.1°
Total vertical angle of view: 40.3°
Focal length: 3.68 mm
F-number (x): 2.29
F-number (y): 3.35

| Face number | Radius of curvature | Face spacing | Decentration | Refractive index | Abbe's number |
|---|---|---|---|---|---|
| Object surface | ∞ | ∞ | | | |
| 1 | ∞ | 0.00 | Decentration (1) | 1.4950 | 65.0 |
| 2 | ∞ | 0.00 | Decentration (2) | | |
| 3 | FFS [1] | 0.00 | Decentration (3) | 1.6069 | 27.0 |
| 4 | FFS [2] | 0.00 | Decentration (4) | 1.6069 | 27.0 |
| 5 | FFS [3] | 0.00 | Decentration (5) | | |
| 6 | Stop surface | 0.00 | Decentration (6) | | |
| 7 | FFS [4] | 0.00 | Decentration (7) | 1.5256 | 56.4 |
| 8 | FFS [5] | 0.00 | Decentration (8) | 1.5256 | 56.4 |
| 9 | FFS [6] | 0.00 | Decentration (9) | 1.5256 | 56.4 |
| 10 | FFS [7] | D10 | Decentration (10) | | |
| 11 | ∞ | 0.30 | | 1.5163 | 64.1 |
| 12 | ∞ | 0.63 | | | |
| Image plane | ∞ | 0.00 | | | |

| D10 | |
|---|---|
| Focusing at infinite object point: | 0.31 |
| Focusing at a near point of 100 m: | 0.45 |

FFS [1]

$C4 = 4.1709 \times 10^{-2}$  $C6 = 6.5908 \times 10^{-2}$  $C8 = -1.0688 \times 10^{-4}$
$C10 = -1.1246 \times 10^{-3}$  $C11 = 6.6599 \times 10^{-4}$  $C13 = 1.6298 \times 10^{-3}$
$C15 = 7.4708 \times 10^{-4}$  $C17 = -2.9507 \times 10^{-5}$  $C19 = 9.7169 \times 10^{-5}$
$C21 = -1.7566 \times 10^{-4}$  $C22 = -2.5840 \times 10^{-6}$  $C24 = 5.7315 \times 10^{-5}$
$C26 = -3.4271 \times 10^{-5}$  $C28 = 3.0860 \times 10^{-5}$

FFS [2]

$C4 = -3.9587 \times 10^{-3}$  $C6 = 2.7654 \times 10^{-2}$  $C8 = -1.0723 \times 10^{-3}$
$C10 = 1.9555 \times 10^{-3}$  $C11 = 7.7516 \times 10^{-5}$  $C13 = -1.7029 \times 10^{-4}$
$C15 = 3.4007 \times 10^{-4}$  $C17 = -3.4680 \times 10^{-5}$  $C19 = 1.0476 \times 10^{-4}$
$C21 = 4.8180 \times 10^{-6}$  $C22 = -6.2801 \times 10^{-6}$  $C24 = -4.7571 \times 10^{-7}$
$C26 = 1.6082 \times 10^{-5}$  $C28 = -8.1118 \times 10^{-6}$

FFS [3]

$C3 = -3.3425 \times 10^{-2}$  $C4 = -7.8403 \times 10^{-2}$  $C6 = -4.0695 \times 10^{-2}$
$C8 = -8.8984 \times 10^{-3}$  $C10 = 6.2496 \times 10^{-3}$  $C11 = -1.5720 \times 10^{-3}$
$C13 = -2.7166 \times 10^{-2}$  $C15 = 1.4357 \times 10^{-3}$  $C17 = -6.5515 \times 10^{-4}$
$C19 = 3.6911 \times 10^{-4}$  $C21 = -2.1928 \times 10^{-4}$  $C22 = 1.8341 \times 10^{-3}$
$C24 = -3.0393 \times 10^{-3}$  $C26 = 2.0951 \times 10^{-3}$  $C28 = -6.7649 \times 10^{-4}$

FFS [4]

$C3 = -2.8391 \times 10^{-2}$  $C4 = 1.2123 \times 10^{-1}$  $C6 = -8.3113 \times 10^{-2}$
$C8 = 7.8309 \times 10^{-3}$  $C10 = 2.1910 \times 10^{-3}$  $C11 = 6.5905 \times 10^{-3}$
$C13 = -1.7892 \times 10^{-2}$  $C15 = 1.5127 \times 10^{-3}$  $C17 = -6.7547 \times 10^{-4}$
$C19 = 4.3224 \times 10^{-4}$  $C21 = -8.3463 \times 10^{-5}$  $C22 = -2.3991 \times 10^{-4}$
$C24 = -8.1334 \times 10^{-3}$  $C26 = 7.9144 \times 10^{-4}$  $C28 = -4.9662 \times 10^{-4}$ -continued

FFS [5]

$C4 = 3.8550 \times 10^{-2}$   $C6 = 4.1924 \times 10^{-2}$   $C8 = 1.7538 \times 10^{-3}$
$C10 = -3.9045 \times 10^{-4}$   $C11 = 8.7475 \times 10^{-5}$   $C13 = 6.4778 \times 10^{-4}$
$C15 = 1.7386 \times 10^{-4}$   $C17 = -1.0376 \times 10^{-5}$   $C19 = -1.6202 \times 10^{-6}$
$C21 = -1.7314 \times 10^{-5}$   $C22 = -2.3351 \times 10^{-7}$   $C24 = 1.1257 \times 10^{-5}$
$C26 = -9.6773 \times 10^{-6}$   $C28 = -9.8518 \times 10^{-6}$

FFS [6]

$C4 = -2.4098 \times 10^{-2}$   $C6 = 1.1095 \times 10^{-2}$   $C8 = 2.5243 \times 10^{-4}$
$C10 = 8.0683 \times 10^{-5}$   $C11 = -1.0086 \times 10^{-4}$   $C13 = 8.3763 \times 10^{-4}$
$C15 = 3.5919 \times 10^{-4}$   $C17 = -6.6515 \times 10^{-5}$   $C19 = 5.2149 \times 10^{-5}$
$C21 = 6.6212 \times 10^{-5}$   $C22 = 4.1040 \times 10^{-7}$   $C24 = 4.0895 \times 10^{-6}$
$C26 = -6.4842 \times 10^{-6}$   $C28 = -9.8152 \times 10^{-6}$

FFS [7]

$C3 = 4.8640 \times 10^{-2}$   $C4 = 3.7051 \times 10^{-2}$   $C6 = 6.3083 \times 10^{-2}$
$C8 = 1.4429 \times 10^{-3}$   $C10 = 2.1610 \times 10^{-4}$   $C11 = -8.4235 \times 10^{-3}$
$C13 = -8.8574 \times 10^{-3}$   $C15 = -4.6112 \times 10^{-3}$   $C17 = -4.4861 \times 10^{-4}$
$C19 = 5.3081 \times 10^{-4}$   $C21 = 1.1103 \times 10^{-3}$   $C22 = 4.3529 \times 10^{-4}$
$C24 = 5.0879 \times 10^{-4}$   $C26 = 1.0880 \times 10^{-3}$   $C28 = -1.2467 \times 10^{-4}$ Decentration [1]

$X = 0.00$   $Y = 0.00$   $Z = 0.00$
$\alpha = 0.00$   $\beta = 0.00$   $\gamma = 0.00$ Decentration [2]

$X = 0.00$   $Y = 0.00$   $Z = 0.50$
$\alpha = 0.00$   $\beta = 0.00$   $\gamma = 0.00$ Decentration [3]

$X = 0.00$   $Y = -0.00$   $Z = 0.64$
$\alpha = -0.95$   $\beta = 0.00$   $\gamma = 0.00$ Decentration [4]

$X = 0.00$   $Y = -0.02$   $Z = 3.34$
$\alpha = -41.75$   $\beta = 0.00$   $\gamma = 0.00$ Decentration [5]

$X = 0.00$   $Y = 2.63$   $Z = 3.02$
$\alpha = -83.86$   $\beta = 0.00$   $\gamma = 0.00$ Decentration [6]

$X = 0.00$   $Y = 3.21$   $Z = 2.96$
$\alpha = -83.86$   $\beta = 0.00$   $\gamma = 0.00$ Decentration [7]

$X = 0.00$   $Y = 3.39$   $Z = 2.94$
$\alpha = -83.86$   $\beta = 0.00$   $\gamma = 0.00$ Decentration [8]

$X = 0.00$   $Y = 7.89$   $Z = 2.41$
$\alpha = -101.29$   $\beta = 0.00$   $\gamma = 0.00$ Decentration [9]

$X = 0.00$   $Y = 5.44$   $Z = 1.03$
$\alpha = -150.09$   $\beta = 0.00$   $\gamma = 0.00$ Decentration [10]

Figure 9:
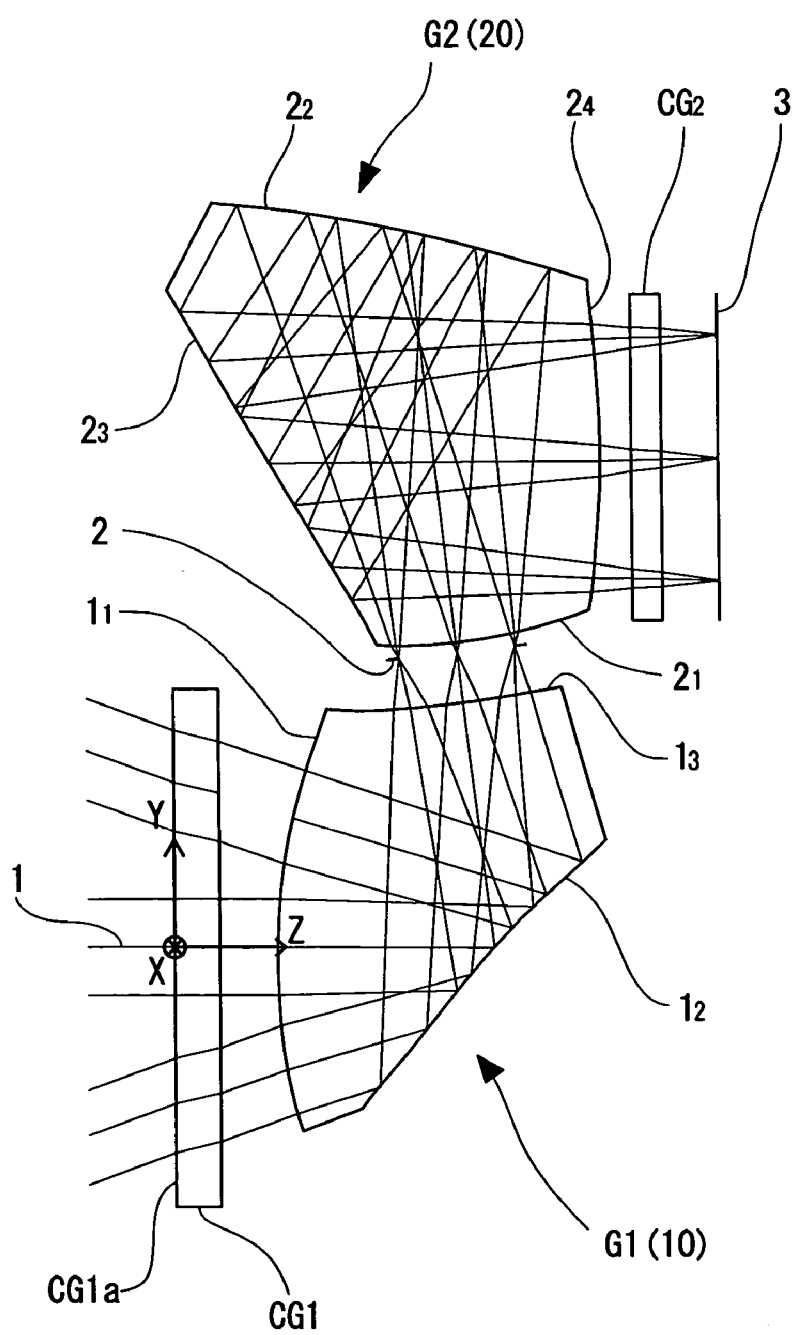
FIG. 9 is a sectional view showing schematically the image pickup optical system, developed along the optical axis, of a fifth embodiment in the present invention.

$X = 0.00$   $Y = 5.38$   $Z = 4.48$
$\alpha = -180.00$   $\beta = 0.00$   $\gamma = 0.00$ Fifth Embodiment FIG. 9 shows the image pickup optical system, developed along the optical axis, of the fifth embodiment in the present invention. FIGS. 10A-10L show transverse aberration characteristics, in focusing at an infinite object point, of the optical system in the fifth embodiment. FIGS. 11A-11L show transverse aberration characteristics, in focusing at a near point of 100 m, of the optical system in the fifth embodiment.

The fundamental arrangement of the image pickup optical system in the fifth embodiment is essentially the same as in the fourth embodiment.

Other features of the arrangement, function, and effect of the fifth embodiment are almost the same as in the first embodiment.

Subsequently, numerical data of optical members constituting the image pickup optical system of the fifth embodiment are shown below.

Numerical Data 5

Total horizontal angle of view: 53.1°
Total vertical angle of view: 41.1°
Focal length: 3.60 mm
F-number (x): 2.32
F-number (y): 3.33

| Face number | Radius of curvature | Face spacing | Decentration | Refractive index | Abbe's number |
|---|---|---|---|---|---|
| Object surface | ∞ | ∞ | | | |
| 1 | ∞ | 0.00 | Decentration (1) | 1.4950 | 65.0 |
| 2 | ∞ | 0.00 | Decentration (2) | | |
| 3 | FFS [1] | 0.00 | Decentration (3) | 1.6069 | 27.0 |
| 4 | FFS [2] | 0.00 | Decentration (4) | 1.6069 | 27.0 |
| 5 | FFS [3] | 0.00 | Decentration (5) | | |
| 6 | Stop surface | 0.00 | Decentration (6) | | |
| 7 | FFS [4] | 0.00 | Decentration (7) | 1.5256 | 56.4 |
| 8 | FFS [5] | 0.00 | Decentration (8) | 1.5256 | 56.4 |
| 9 | FFS [6] | 0.00 | Decentration (9) | 1.5256 | 56.4 |
| 10 | FFS [7] | D10 | Decentration (10) | | |
| 11 | ∞ | 0.30 | | 1.5163 | 64.1 |
| 12 | ∞ | 0.63 | | | |
| Image plane | ∞ | 0.00 | | | |

D10

| | |
|---|---|
| Focusing at infinite object point: | 0.35 |
| Focusing at a near point of 100 m: | 0.49 |

FFS [1]

$C_4 = 3.8146 \times 10^{-2}$   $C_6 = 7.0327 \times 10^{-2}$   $C_8 = -2.3379 \times 10^{-3}$
$C_{10} = -2.1866 \times 10^{-3}$   $C_{11} = 8.2077 \times 10^{-4}$   $C_{13} = 1.9776 \times 10^{-3}$
$C_{15} = 3.8823 \times 10^{-4}$   $C_{17} = 8.1761 \times 10^{-5}$   $C_{19} = -2.5319 \times 10^{-6}$
$C_{21} = -6.6384 \times 10^{-5}$   $C_{22} = -1.6852 \times 10^{-5}$   $C_{24} = 5.4776 \times 10^{-5}$
$C_{26} = -1.7350 \times 10^{-5}$   $C_{28} = 1.2713 \times 10^{-5}$

FFS [2]

$C_4 = -3.4777 \times 10^{-3}$   $C_6 = 2.7607 \times 10^{-2}$   $C_8 = -1.9750 \times 10^{-3}$
$C_{10} = 2.1459 \times 10^{-3}$   $C_{11} = 7.0172 \times 10^{-5}$   $C_{13} = -4.7579 \times 10^{-4}$
$C_{15} = -8.7394 \times 10^{-6}$   $C_{17} = 1.3306 \times 10^{-4}$   $C_{19} = -7.4639 \times 10^{-5}$
$C_{21} = -5.2189 \times 10^{-5}$   $C_{22} = -6.8238 \times 10^{-7}$   $C_{24} = 3.0061 \times 10^{-5}$
$C_{26} = -1.4124 \times 10^{-5}$   $C_{28} = -8.8127 \times 10^{-6}$

FFS [3]

$C_3 = -2.3496 \times 10^{-2}$   $C_4 = 6.5011 \times 10^{-2}$   $C_6 = 3.9086 \times 10^{-2}$
$C_8 = -1.7772 \times 10^{-3}$   $C_{10} = 1.2822 \times 10^{-2}$   $C_{11} = -3.2140 \times 10^{-3}$
$C_{13} = 4.1631 \times 10^{-2}$   $C_{15} = 1.3025 \times 10^{-3}$   $C_{17} = 6.4121 \times 10^{-3}$
$C_{19} = -4.4174 \times 10^{-3}$   $C_{21} = -9.1827 \times 10^{-4}$   $C_{22} = -4.6805 \times 10^{-3}$
$C_{24} = 7.2297 \times 10^{-3}$   $C_{26} = -1.8259 \times 10^{-3}$   $C_{28} = 2.2407 \times 10^{-4}$

FFS [4]

$C_3 = 6.4148 \times 10^{-4}$   $C_4 = -1.4331 \times 10^{-1}$   $C_6 = 9.5488 \times 10^{-2}$
$C_8 = 2.3481 \times 10^{-2}$   $C_{10} = 4.2176 \times 10^{-3}$   $C_{11} = -1.5076 \times 10^{-2}$
$C_{13} = 3.2706 \times 10^{-2}$   $C_{15} = -1.7340 \times 10^{-3}$   $C_{17} = 6.4019 \times 10^{-3}$
$C_{19} = -4.6840 \times 10^{-3}$   $C_{21} = -3.8193 \times 10^{-4}$   $C_{22} = -2.1026 \times 10^{-4}$
$C_{24} = 1.1371 \times 10^{-2}$   $C_{26} = -1.7086 \times 10^{-3}$   $C_{28} = 1.1775 \times 10^{-3}$

FFS [5]

$C_4 = 3.8317 \times 10^{-2}$   $C_6 = 3.2015 \times 10^{-2}$   $C_8 = 2.7664 \times 10^{-3}$
$C_{10} = 1.5183 \times 10^{-4}$   $C_{11} = 9.0193 \times 10^{-5}$   $C_{13} = 4.2060 \times 10^{-4}$
$C_{15} = 1.6101 \times 10^{-4}$   $C_{17} = 3.0384 \times 10^{-5}$   $C_{19} = -9.1913 \times 10^{-6}$
$C_{21} = -2.1737 \times 10^{-5}$   $C_{22} = -2.3635 \times 10^{-6}$   $C_{24} = 1.6457 \times 10^{-5}$
$C_{26} = -2.5010 \times 10^{-5}$   $C_{28} = -1.0151 \times 10^{-5}$

FFS [6]

$C_4 = 2.4313 \times 10^{-2}$   $C_6 = 4.1385 \times 10^{-3}$   $C_8 = 1.4275 \times 10^{-3}$
$C_{10} = -2.6311 \times 10^{-4}$   $C_{11} = 1.7694 \times 10^{-4}$   $C_{13} = -5.9872 \times 10^{-4}$
$C_{15} = -3.5332 \times 10^{-4}$   $C_{17} = -1.8107 \times 10^{-5}$   $C_{19} = 3.8705 \times 10^{-5}$
$C_{21} = 4.3397 \times 10^{-5}$   $C_{22} = -7.1531 \times 10^{-7}$   $C_{24} = -1.6813 \times 10^{-5}$
$C_{26} = -4.1677 \times 10^{-6}$   $C_{28} = -1.7592 \times 10^{-6}$

FFS [7]

$C_4 = 3.6652 \times 10^{-2}$   $C_6 = 4.7583 \times 10^{-2}$   $C_8 = 9.9572 \times 10^{-3}$
$C_{10} = -5.4494 \times 10^{-3}$   $C_{11} = -1.3005 \times 10^{-2}$   $C_{13} = -5.7962 \times 10^{-3}$
$C_{15} = -3.6521 \times 10^{-3}$   $C_{17} = 3.7012 \times 10^{-5}$   $C_{19} = 8.9483 \times 10^{-5}$
$C_{21} = 1.4815 \times 10^{-3}$   $C_{22} = 6.8140 \times 10^{-4}$   $C_{24} = 3.6670 \times 10^{-4}$
$C_{26} = 1.5744 \times 10^{-3}$   $C_{28} = 3.8563 \times 10^{-5}$

Decentration [1]

$X = 0.00$   $Y = 0.00$   $Z = 0.00$
$\alpha = 0.00$   $\beta = 0.00$   $\gamma = 0.00$ -continued

|  | Decentration [2] |  |
|---|---|---|
| X = 0.00 | Y = 0.00 | Z = 0.50 |
| α = 0.00 | β = 0.00 | γ = 0.00 |
|  | Decentration [3] |  |
| X = 0.00 | Y = 0.00 | Z = 1.10 |
| α = −1.64 | β = 0.00 | γ = 0.00 |
|  | Decentration [4] |  |
| X = 0.00 | Y = −0.03 | Z = 3.46 |
| α = −41.92 | β = 0.00 | γ = 0.00 |
|  | Decentration [5] |  |
| X = 0.00 | Y = 2.72 | Z = 3.13 |
| α = 96.28 | β = 0.00 | γ = 0.00 |
|  | Decentration [6] |  |
| X = 0.00 | Y = 3.29 | Z = 3.07 |
| α = 96.28 | β = 0.00 | γ = 0.00 |
|  | Decentration [7] |  |
| X = 0.00 | Y = 3.39 | Z = 3.06 |
| α = 96.28 | β = 0.00 | γ = 0.00 |
|  | Decentration [8] |  |
| X = 0.00 | Y = 7.96 | Z = 2.56 |
| α = −102.16 | β = 0.00 | γ = 0.00 |
|  | Decentration [9] |  |
| X = 0.00 | Y = 5.40 | Z = 1.04 |
| α = 29.86 | β = 0.00 | γ = 0.00 |
|  | Decentration [10] |  |
| X = 0.00 | Y = 5.42 | Z = 4.62 |
| α = 179.24 | β = 0.00 | γ = 0.00 |

Sixth Embodiment

Figure 12:
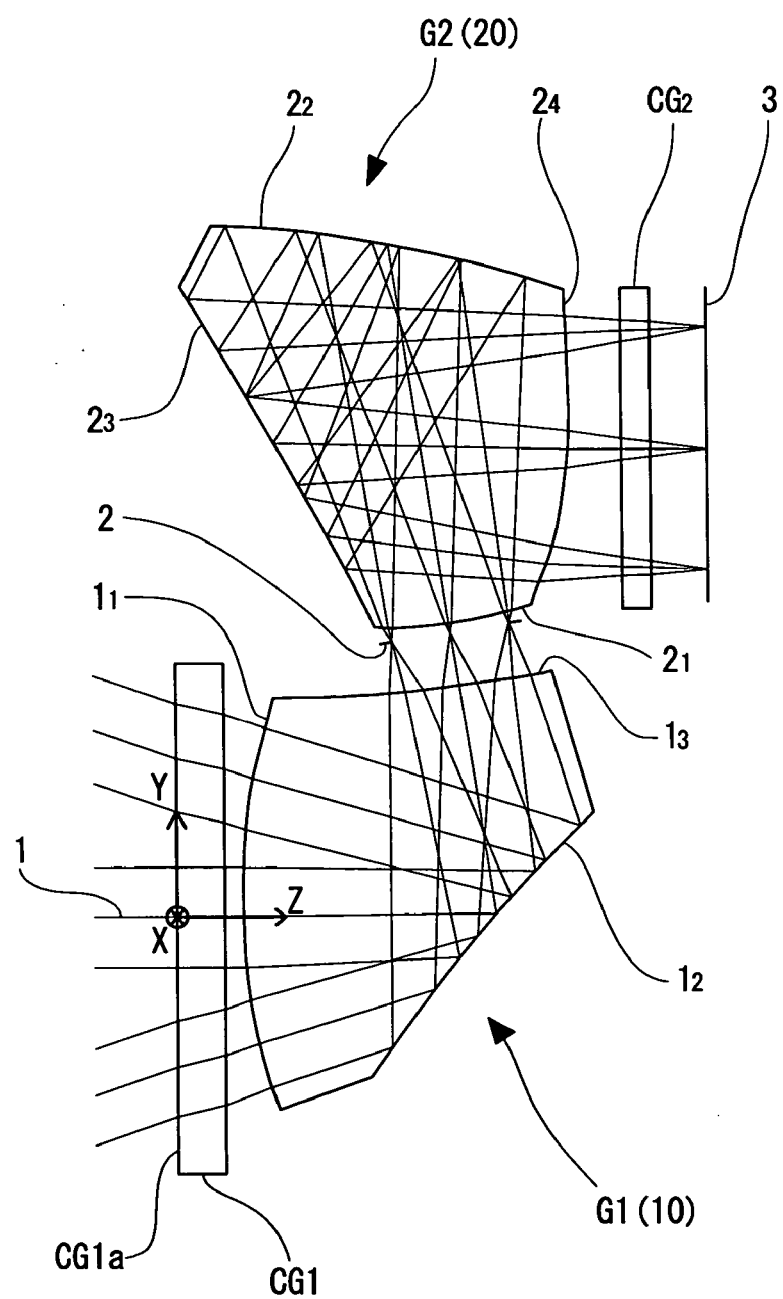
FIG. 12 is a sectional view showing schematically the image pickup optical system, developed along the optical axis, of a sixth embodiment in the present invention.

FIG. 12 shows the image pickup optical system, developed along the optical axis, of the sixth embodiment in the present invention. FIGS. 13A-13L show transverse aberration characteristics, in focusing at an infinite object point, of the optical system in the sixth embodiment. FIGS. 14A-14L show transverse aberration characteristics, in focusing at a near point of 100 m, of the optical system in the sixth embodiment.

The fundamental arrangement of the image pickup optical system in the sixth embodiment is essentially the same as in the fourth embodiment.

Other features of the arrangement, function, and effect of the sixth embodiment are almost the same as in the first embodiment.

Subsequently, numerical data of optical members constituting the image pickup optical system of the sixth embodiment are shown below.

Numerical Data 6
Total horizontal angle of view: 52.1°
Total vertical angle of view: 40.3°
Focal length: 3.68 mm
F-number (x): 2.37
F-number (y): 3.29

| Face number | Radius of curvature | Face spacing | Decentration | Refractive index | Abbe's number |
|---|---|---|---|---|---|
| Object surface | ∞ | ∞ |  |  |  |
| 1 | ∞ | 0.00 | Decentration (1) | 1.4950 | 65.0 |
| 2 | ∞ | 0.00 | Decentration (2) |  |  |
| 3 | FFS [1] | 0.00 | Decentration (3) | 1.6069 | 27.0 |
| 4 | FFS [2] | 0.00 | Decentration (4) | 1.6069 | 27.0 |
| 5 | FFS [3] | 0.00 | Decentration (5) |  |  |
| 6 | Stop surface | 0.00 | Decentration (6) |  |  |
| 7 | FFS [4] | 0.00 | Decentration (7) | 1.5256 | 56.4 |
| 8 | FFS [5] | 0.00 | Decentration (8) | 1.5256 | 56.4 |
| 9 | FFS [6] | 0.00 | Decentration (9) | 1.5256 | 56.4 |
| 10 | FFS [7] | 0.00 | Decentration (10) |  |  |
| 11 | ∞ | D11 |  | 1.5163 | 64.1 |
| 12 | ∞ | 0.30 |  |  |  |
| Image plane | ∞ | 0.63 |  |  |  |

-continued

| D11 | |
|---|---|
| Focusing at infinite object point: | 0.59 |
| Focusing at a near point of 100 m: | 0.73 |

FFS [1]

| | | |
|---|---|---|
| $C_4 = 2.8452 \times 10^{-2}$ | $C_6 = 6.3876 \times 10^{-2}$ | $C_8 = -1.5409 \times 10^{-3}$ |
| $C_{10} = -1.1435 \times 10^{-3}$ | $C_{11} = 8.1583 \times 10^{-4}$ | $C_{13} = 1.7977 \times 10^{-3}$ |
| $C_{15} = 6.9015 \times 10^{-4}$ | $C_{17} = -1.2030 \times 10^{-5}$ | $C_{19} = 2.1071 \times 10^{-5}$ |
| $C_{21} = -8.3312 \times 10^{-5}$ | $C_{22} = 2.3649 \times 10^{-6}$ | $C_{24} = 5.1016 \times 10^{-5}$ |
| $C_{26} = 1.3461 \times 10^{-5}$ | $C_{28} = 3.1585 \times 10^{-5}$ | |

FFS [2]

| | | |
|---|---|---|
| $C_4 = -4.5912 \times 10^{-3}$ | $C_6 = 2.7647 \times 10^{-2}$ | $C_8 = -2.0474 \times 10^{-3}$ |
| $C_{10} = 2.0441 \times 10^{-3}$ | $C_{11} = 1.7105 \times 10^{-4}$ | $C_{13} = -2.8799 \times 10^{-3}$ |
| $C_{15} = 2.6943 \times 10^{-4}$ | $C_{17} = 1.6673 \times 10^{-5}$ | $C_{19} = 5.1080 \times 10^{-5}$ |
| $C_{21} = 2.6826 \times 10^{-5}$ | $C_{22} = -7.5896 \times 10^{-6}$ | $C_{24} = -5.3566 \times 10^{-6}$ |
| $C_{26} = 9.6594 \times 10^{-6}$ | $C_{28} = 4.0288 \times 10^{-7}$ | |

FFS [3]

| | | |
|---|---|---|
| $C_3 = 2.2629 \times 10^{-2}$ | $C_4 = 5.5597 \times 10^{-2}$ | $C_6 = 2.5883 \times 10^{-2}$ |
| $C_8 = -9.0217 \times 10^{-3}$ | $C_{10} = 4.4606 \times 10^{-3}$ | $C_{11} = 3.4339 \times 10^{-3}$ |
| $C_{13} = 3.4994 \times 10^{-2}$ | $C_{15} = -5.1538 \times 10^{-4}$ | $C_{17} = 6.3294 \times 10^{-4}$ |
| $C_{19} = -1.1336 \times 10^{-4}$ | $C_{21} = -4.3875 \times 10^{-4}$ | $C_{22} = -6.5960 \times 10^{-4}$ |
| $C_{24} = 8.0231 \times 10^{-3}$ | $C_{26} = 7.3529 \times 10^{-4}$ | $C_{28} = 8.6580 \times 10^{-4}$ |

FFS [4]

| | | |
|---|---|---|
| $C_3 = 2.4608 \times 10^{-2}$ | $C_4 = -1.3156 \times 10^{-1}$ | $C_6 = 9.1771 \times 10^{-2}$ |
| $C_8 = 9.7903 \times 10^{-3}$ | $C_{10} = 7.8880 \times 10^{-4}$ | $C_{11} = -2.6020 \times 10^{-3}$ |
| $C_{13} = 2.8903 \times 10^{-2}$ | $C_{15} = -1.0784 \times 10^{-3}$ | $C_{17} = 3.4681 \times 10^{-4}$ |
| $C_{19} = 1.9445 \times 10^{-5}$ | $C_{21} = -3.3203 \times 10^{-4}$ | $C_{22} = 9.1541 \times 10^{-4}$ |
| $C_{24} = 1.0214 \times 10^{-2}$ | $C_{26} = -1.0105 \times 10^{-3}$ | $C_{28} = 3.6727 \times 10^{-4}$ |

FFS [5]

| | | |
|---|---|---|
| $C_4 = 3.8391 \times 10^{-2}$ | $C_6 = 3.6846 \times 10^{-2}$ | $C_8 = 1.7190 \times 10^{-3}$ |
| $C_{10} = 3.7180 \times 10^{-4}$ | $C_{11} = 4.7524 \times 10^{-5}$ | $C_{13} = 4.1252 \times 10^{-4}$ |
| $C_{15} = 4.8775 \times 10^{-5}$ | $C_{17} = -1.3338 \times 10^{-5}$ | $C_{19} = 6.5792 \times 10^{-5}$ |
| $C_{21} = 2.0712 \times 10^{-6}$ | $C_{22} = 2.4172 \times 10^{-6}$ | $C_{24} = 1.2574 \times 10^{-5}$ |
| $C_{26} = -2.6090 \times 10^{-5}$ | $C_{28} = -1.8861 \times 10^{-5}$ | |

FFS [6]

| | | |
|---|---|---|
| $C_4 = 2.6652 \times 10^{-2}$ | $C_6 = -5.5454 \times 10^{-3}$ | $C_8 = -3.4592 \times 10^{-4}$ |
| $C_{10} = 1.3102 \times 10^{-3}$ | $C_{11} = 1.2425 \times 10^{-4}$ | $C_{13} = -4.2794 \times 10^{-4}$ |
| $C_{15} = -4.6729 \times 10^{-4}$ | $C_{17} = -6.8130 \times 10^{-5}$ | $C_{19} = 1.0827 \times 10^{-4}$ |
| $C_{21} = 1.2884 \times 10^{-4}$ | $C_{22} = -5.1502 \times 10^{-6}$ | $C_{24} = -2.1154 \times 10^{-5}$ |
| $C_{26} = 2.7494 \times 10^{-6}$ | $C_{28} = 1.3324 \times 10^{-6}$ | |

FFS [7]

| | | |
|---|---|---|
| $C_3 = 7.5310 \times 10^{-2}$ | $C_4 = -3.4530 \times 10^{-2}$ | $C_6 = 7.7000 \times 10^{-2}$ |
| $C_8 = 1.2294 \times 10^{-3}$ | $C_{10} = 6.6512 \times 10^{-3}$ | $C_{11} = -3.3680 \times 10^{-3}$ |
| $C_{13} = -2.3508 \times 10^{-3}$ | $C_{15} = -1.6870 \times 10^{-3}$ | $C_{17} = -5.6278 \times 10^{-4}$ |
| $C_{19} = 7.6597 \times 10^{-4}$ | $C_{21} = 1.5079 \times 10^{-3}$ | $C_{22} = -4.9944 \times 10^{-5}$ |
| $C_{24} = 7.4393 \times 10^{-4}$ | $C_{26} = 2.0508 \times 10^{-4}$ | $C_{28} = -2.7327 \times 10^{-4}$ |

Decentration [1]

| | | |
|---|---|---|
| $X = 0.00$ | $Y = 0.00$ | $Z = 0.00$ |
| $\alpha = 0.00$ | $\beta = 0.00$ | $\gamma = 0.00$ |

Decentration [2]

| | | |
|---|---|---|
| $X = 0.00$ | $Y = 0.00$ | $Z = 0.50$ |
| $\alpha = 0.00$ | $\beta = 0.00$ | $\gamma = 0.00$ |

Decentration [3]

| | | |
|---|---|---|
| $X = 0.00$ | $Y = 0.00$ | $Z = 0.70$ |
| $\alpha = 1.26$ | $\beta = 0.00$ | $\gamma = 0.00$ |

Decentration [4]

| | | |
|---|---|---|
| $X = 0.00$ | $Y = 0.02$ | $Z = 3.48$ |
| $\alpha = -40.48$ | $\beta = 0.00$ | $\gamma = 0.00$ |

Decentration [5]

| | | |
|---|---|---|
| $X = 0.00$ | $Y = 2.62$ | $Z = 3.09$ |
| $\alpha = 99.05$ | $\beta = 0.00$ | $\gamma = 0.00$ |

Decentration [6]

| | | |
|---|---|---|
| $X = 0.00$ | $Y = 3.23$ | $Z = 3.00$ |
| $\alpha = 99.05$ | $\beta = 0.00$ | $\gamma = 0.00$ |

-continued

|  | Decentration [7] |  |
|---|---|---|
| X = 0.00 | Y = 3.33 | Z = 2.98 |
| α = 99.05 | β = 0.00 | γ = 0.00 |
|  | Decentration [8] |  |
| X = 0.00 | Y = 7.58 | Z = 2.34 |
| α = −100.67 | β = 0.00 | γ = 0.00 |
|  | Decentration [9] |  |
| X = 0.00 | Y = 5.37 | Z = 1.07 |
| α = 29.31 | β = 0.00 | γ = 0.00 |
|  | Decentration [10] |  |
| X = 0.00 | Y = 5.29 | Z = 4.29 |
| α = −180.00 | β = 0.00 | γ = 0.00 |

Seventh Embodiment

Figure 15:
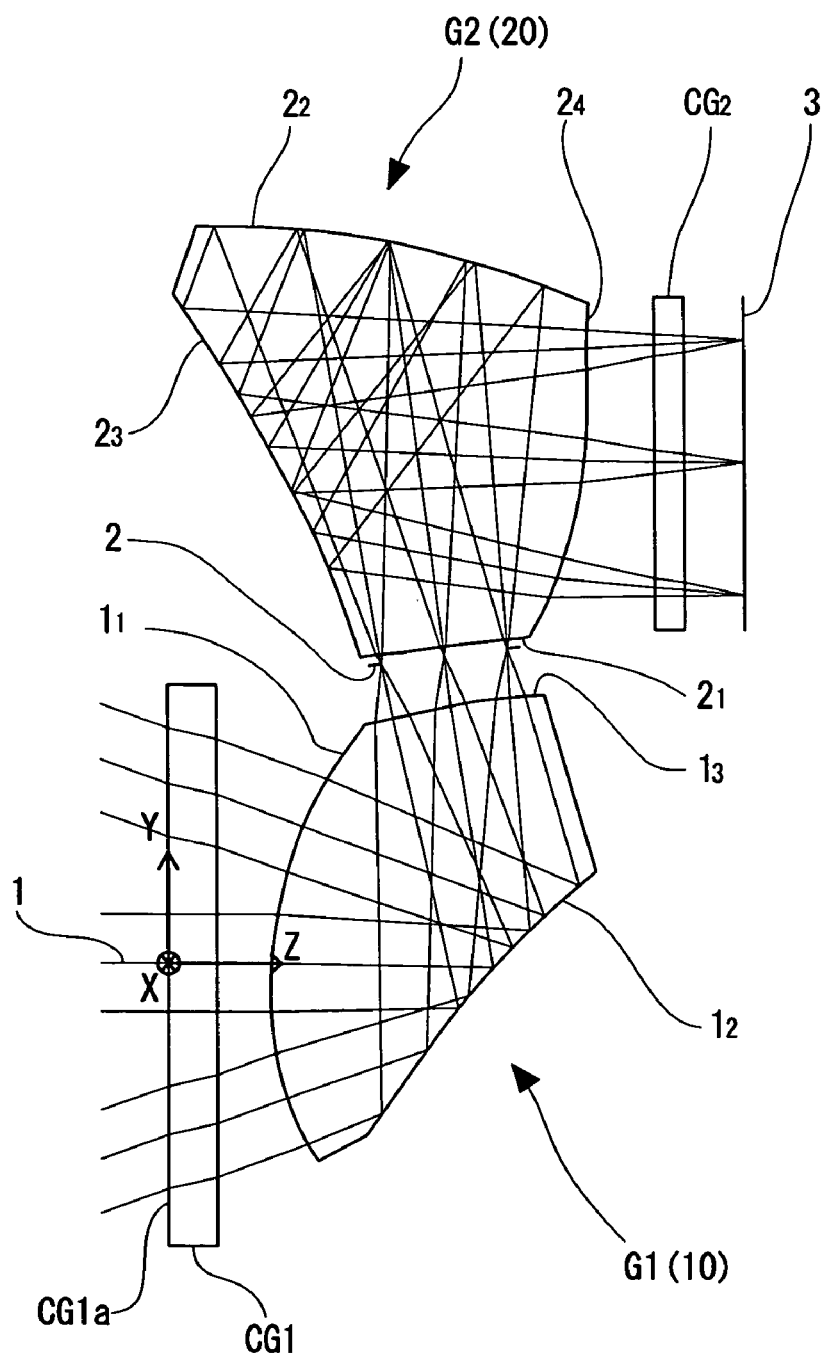
FIG. 15 is a sectional view showing schematically the image pickup optical system, developed along the optical axis, of a seventh embodiment in the present invention.

FIG. 15 shows the image pickup optical system, developed along the optical axis, of the seventh embodiment in the present invention. FIGS. 16A-16L show transverse aberration characteristics, in focusing at an infinite object point, of the optical system in the seventh embodiment.

The fundamental arrangement of the image pickup optical system in the seventh embodiment is essentially the same as in the fourth embodiment.

Other features of the arrangement, function, and effect of the seventh embodiment are almost the same as in the first embodiment.

Subsequently, numerical data of optical members constituting the image pickup optical system of the seventh embodiment are shown below.

Numerical Data 7

Total horizontal angle of view: 53.1°
Total vertical angle of view: 41.1°
Focal length: 3.60 mm
F-number (x): 2.22
F-number (y): 3.46

| Face number | Radius of curvature | Face spacing | Decentration | Refractive index | Abbe's number |
|---|---|---|---|---|---|
| Object surface | ∞ | ∞ |  |  |  |
| 1 | ∞ | 0.00 | Decentration (1) | 1.4950 | 65.0 |
| 2 | ∞ | 0.00 | Decentration (2) |  |  |
| 3 | FFS [1] | 0.00 | Decentration (3) | 1.5256 | 56.4 |
| 4 | FFS [2] | 0.00 | Decentration (4) | 1.5256 | 56.4 |
| 5 | FFS [3] | 0.00 | Decentration (5) |  |  |
| 6 | Stop surface | 0.00 | Decentration (6) |  |  |
| 7 | FFS [4] | 0.00 | Decentration (7) | 1.5256 | 56.4 |
| 8 | FFS [5] | 0.00 | Decentration (8) | 1.5256 | 56.4 |
| 9 | FFS [6] | 0.00 | Decentration (9) | 1.5256 | 56.4 |
| 10 | FFS [7] | 0.00 | Decentration (10) |  |  |
| 11 | ∞ | 0.74 |  | 1.5163 | 64.1 |
| 12 | ∞ | 0.30 |  |  |  |
| Image plane | ∞ | 0.63 |  |  |  |

FFS [1]

| | | |
|---|---|---|
| $C4 = 3.5525 \times 10^{-2}$ | $C6 = 1.0890 \times 10^{-1}$ | $C8 = -8.2348 \times 10^{-3}$ |
| $C10 = -5.2575 \times 10^{-3}$ | $C11 = 5.7431 \times 10^{-4}$ | $C13 = 2.7485 \times 10^{-3}$ |
| $C15 = 3.2990 \times 10^{-3}$ | $C17 = 1.4423 \times 10^{-4}$ | $C19 = -7.6780 \times 10^{-6}$ |
| $C21 = -2.7267 \times 10^{-4}$ | $C22 = -1.4656 \times 10^{-5}$ | $C24 = 9.7607 \times 10^{-5}$ |
| $C26 = 1.8646 \times 10^{-4}$ | $C28 = 1.6207 \times 10^{-4}$ | |

FFS [2]

| | | |
|---|---|---|
| $C4 = -4.5713 \times 10^{-3}$ | $C6 = 4.7296 \times 10^{-2}$ | $C8 = -4.3230 \times 10^{-3}$ |
| $C10 = 3.6394 \times 10^{-3}$ | $C11 = 1.0776 \times 10^{-4}$ | $C13 = -2.9743 \times 10^{-4}$ |
| $C15 = 5.7996 \times 10^{-4}$ | $C17 = 2.2027 \times 10^{-4}$ | $C19 = 4.8971 \times 10^{-4}$ |
| $C21 = 3.3132 \times 10^{-4}$ | $C22 = 7.3014 \times 10^{-6}$ | $C24 = 3.6397 \times 10^{-5}$ |
| $C26 = 9.9059 \times 10^{-5}$ | $C28 = 4.6268 \times 10^{-5}$ | |

FFS [3]

| | | |
|---|---|---|
| $C3 = -7.9977 \times 10^{-2}$ | $C4 = 5.4975 \times 10^{-2}$ | $C6 = -6.0112 \times 10^{-2}$ |
| $C8 = -9.3320 \times 10^{-3}$ | $C10 = 3.1164 \times 10^{-2}$ | $C11 = -1.6822 \times 10^{-2}$ |
| $C13 = 3.2799 \times 10^{-2}$ | $C15 = 1.0891 \times 10^{-2}$ | $C17 = 7.6218 \times 10^{-3}$ |
| $C19 = 1.1995 \times 10^{-2}$ | $C21 = 3.0746 \times 10^{-3}$ | $C22 = -5.3778 \times 10^{-3}$ |
| $C24 = 4.2974 \times 10^{-3}$ | $C26 = 1.0294 \times 10^{-3}$ | $C28 = 9.8460 \times 10^{-4}$ |

-continued

FFS [4]

| | | |
|---|---|---|
| C3 = −1.2988 × 10⁻² | C4 = −1.8658 × 10⁻¹ | C6 = −7.9727 × 10⁻³ |
| C8 = 4.9383 × 10⁻³ | C10 = 2.4960 × 10⁻² | C11 = −2.8140 × 10⁻² |
| C13 = 2.6177 × 10⁻² | C15 = 5.1729 × 10⁻³ | C17 = 6.7773 × 10⁻³ |
| C19 = 9.3135 × 10⁻³ | C21 = 7.7204 × 10⁻⁴ | C22 = −5.2524 × 10⁻³ |
| C24 = 1.3153 × 10⁻² | C26 = 1.2061 × 10⁻⁴ | C28 = 2.9099 × 10⁻⁴ |

FFS [5]

| | | |
|---|---|---|
| C4 = 3.9523 × 10⁻² | C6 = 5.1276 × 10⁻² | C8 = −5.6435 × 10⁻⁴ |
| C10 = −1.9871 × 10⁻⁴ | C11 = 2.2448 × 10⁻⁴ | C13 = 2.6222 × 10⁻⁴ |
| C15 = 4.3363 × 10⁻⁴ | C17 = 2.5369 × 10⁻⁵ | C19 = −3.6892 × 10⁻⁵ |
| C21 = −2.6132 × 10⁻⁵ | C22 = −2.9414 × 10⁻⁷ | C24 = 1.7132 × 10⁻⁵ |
| C26 = 1.9853 × 10⁻⁵ | C28 = 1.6338 × 10⁻⁶ | |

FFS [6]

| | | |
|---|---|---|
| C4 = 2.9229 × 10⁻² | C6 = −2.5012 × 10⁻² | C8 = −4.9101 × 10⁻³ |
| C10 = 2.4086 × 10⁻³ | C11 = −1.6647 × 10⁻⁵ | C13 = 5.4257 × 10⁻⁴ |
| C15 = −1.3336 × 10⁻³ | C17 = 2.1102 × 10⁻⁵ | C19 = −2.1662 × 10⁻⁴ |
| C21 = 2.6510 × 10⁻⁴ | C22 = −1.7210 × 10⁻⁶ | C24 = −2.6491 × 10⁻⁵ |
| C26 = 1.3763 × 10⁻⁵ | C28 = −2.2093 × 10⁻⁵ | |

FFS [7]

| | | |
|---|---|---|
| C4 = −8.4920 × 10⁻² | C6 = 8.4762 × 10⁻² | C8 = −2.0467 × 10⁻² |
| C10 = 1.4547 × 10⁻² | C11 = −6.3987 × 10⁻³ | C13 = −1.3070 × 10⁻⁴ |
| C15 = −3.8037 × 10⁻³ | C17 = 9.0804 × 10⁻⁴ | C19 = 2.3274 × 10⁻³ |
| C21 = 1.5751 × 10⁻³ | C22 = −2.1927 × 10⁻⁴ | C24 = −2.3522 × 10⁻⁴ |
| C26 = −5.6994 × 10⁻⁴ | C28 = −3.9091 × 10⁻⁴ | |

Decentration [1]

| | | |
|---|---|---|
| X = 0.00 | Y = 0.00 | Z = 0.00 |
| α = 0.00 | β = 0.00 | γ = 0.00 |

Decentration [2]

| | | |
|---|---|---|
| X = 0.00 | Y = 0.00 | Z = 0.50 |
| α = 0.00 | β = 0.00 | γ = 0.00 |

Decentration [3]

| | | |
|---|---|---|
| X = 0.00 | Y = 0.00 | Z = 1.05 |
| α = −3.37 | β = 0.00 | γ = 0.00 |

Decentration [4]

| | | |
|---|---|---|
| X = 0.00 | Y = −0.05 | Z = 3.39 |
| α = −41.19 | β = 0.00 | γ = 0.00 |

Decentration [5]

| | | |
|---|---|---|
| X = 0.00 | Y = 2.81 | Z = 2.95 |
| α = 97.19 | β = 0.00 | γ = 0.00 |

Decentration [6]

| | | |
|---|---|---|
| X = 0.00 | Y = 3.36 | Z = 2.88 |
| α = 97.19 | β = 0.00 | γ = 0.00 |

Decentration [7]

| | | |
|---|---|---|
| X = 0.00 | Y = 3.46 | Z = 2.87 |
| α = 97.19 | β = 0.00 | γ = 0.00 |

Decentration [8]

| | | |
|---|---|---|
| X = 0.00 | Y = 7.79 | Z = 2.30 |
| α = −101.22 | β = 0.00 | γ = 0.00 |

Decentration [9]

| | | |
|---|---|---|
| X = 0.00 | Y = 5.59 | Z = 1.04 |
| α = 28.77 | β = 0.00 | γ = 0.00 |

Decentration [10]

| | | |
|---|---|---|
| X = 0.00 | Y = 5.44 | Z = 4.34 |
| α = 174.56 | β = 0.00 | γ = 0.00 |

Tables 1 and 2 show the values of principal parameters in the first to third embodiments and the fourth to seventh embodiments, respectively.

TABLE 1

| | Diameter of entrance pupil | | | Focal length of entire system | |
|---|---|---|---|---|---|
| | X direction | Y direction | Diameter of aperture stop | X direction | Y direction |
| 1st embodiment | 1.99 | 1.48 | 1.54 | 4.98 | 4.94 |
| 2nd embodiment | 1.875 | 1.50 | 1.44 | 4.92 | 4.93 |
| 3rd embodiment | 1.874 | 1.38 | 1.80 | 5.27 | 5.40 |

| | Fno | | Focal length of front unit | | Condition (1) | Condition (2) |
|---|---|---|---|---|---|---|
| | X direction | Y direction | X direction | Y direction | FNY/FNX | fly/flx |
| 1st embodiment | 2.50 | 3.34 | 588.24 | −10.82 | 1.33 | −0.02 |
| 2nd embodiment | 2.62 | 3.29 | 22.78 | 12.35 | 1.25 | 0.54 |
| 3rd embodiment | 2.81 | 3.91 | 99.01 | −12.09 | 1.39 | −0.12 |

TABLE 2

| | 4th embodiment | 5th embodiment | 6th embodiment | 7th embodiment |
|---|---|---|---|---|
| P | 2.2 | 2.8 | 2.2 | 2.8 |
| P · Fnoy | 7.36 | 9.33 | 7.23 | 9.69 |
| Dx | 3.6 | 3.6 | 3.6 | 3.6 |
| Dy | 2.7 | 2.7 | 2.7 | 2.7 |
| Dx/Bx | 0.61 | 0.89 | 0.66 | 0.63 |
| Dy/By | 0.27 | 0.32 | 0.28 | 0.27 |
| h1/(h2 · Fnox) | 0.39 | 0.36 | 0.38 | 0.38 |
| φx/Φx | 0.54 | 0.53 | 0.60 | 0.64 |
| φy/Φy | −0.25 | 0.09 | −0.12 | −0.55 |
| θx | 6.49 | 4.12 | −0.75 | −4.72 |
| θx − θy | 12.08 | 6.86 | 1.96 | 0.84 |

Each of the first and second embodiments has decentered prisms before and behind the stop, one on each side, but a plurality of decentered prisms may be arranged on one or both sides. Alternatively, as in the third embodiment, a mirror other than the decentered prism may be placed. As the decentered prisms arranged on both sides of the stop in the present invention, various known decentered prisms of more than two internal reflections can be used, not to speak of the decentered prisms of one or two internal reflections, for example, shown in FIGS. 1 and 4. These examples are cited below. Although in any case a description is given of a decentered prism P in which an object located at a considerable distance away is imaged on an image plane 136 through a pupil 131 in forward ray tracing, it may also be used as the decentered prism P in which, by reversing the optical path, a ray is incident from the side of the image plane 136 and is imaged on the side of the pupil 131.

Figure 17:
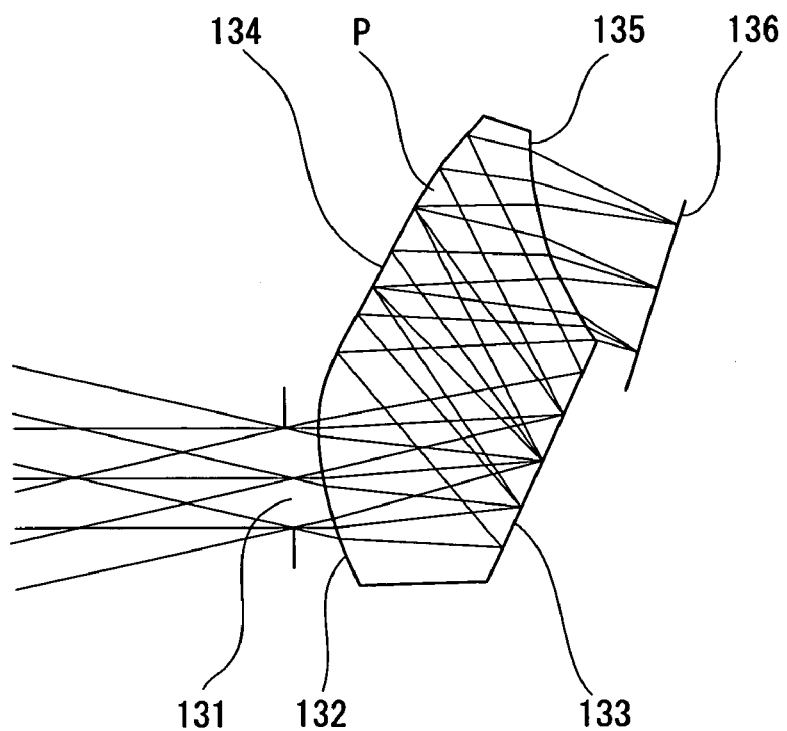
FIG. 17 is a view showing one modified example of a decentered prism which can be used in the image pickup optical system of the present invention.

In the case of FIG. 17, the decentered prism P includes a first surface 132, a second surface 133, a third surface 134, and a fourth surface 135. Light passing through the entrance pupil 131 is refracted by the first surface 132 to enter the decentered prism P. The light incident on the decentered prism P is internally reflected by the second surface 133 and is further internally reflected by the third surface 134 so that the optical path of the shape of the letter "Z" is formed. This light is then incident on the fourth surface 135 and is refracted there to form an image on the image plane 136.

Figure 18:
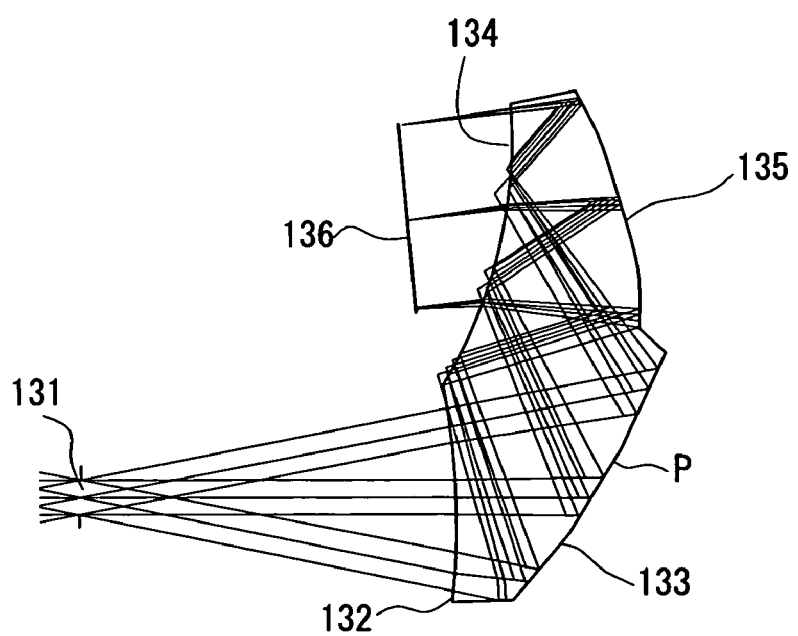
FIG. 18 is a view showing another modified example of the decentered prism.

In FIG. 18, the decentered prism P includes the first surface 132, the second surface 133, the third surface 134, and the fourth surface 135. Light passing through the entrance pupil 131 is refracted by the first surface 132 to enter the decentered prism P. The light incident on the decentered prism P is internally reflected by the second surface 133, is incident on the third surface 134 to undergo total reflection, and is incident on the fourth surface 135 to undergo internal reflection. This light is then incident again on the third surface 134 and is refracted there so that the image is formed on the image plane 136.

Figure 19:
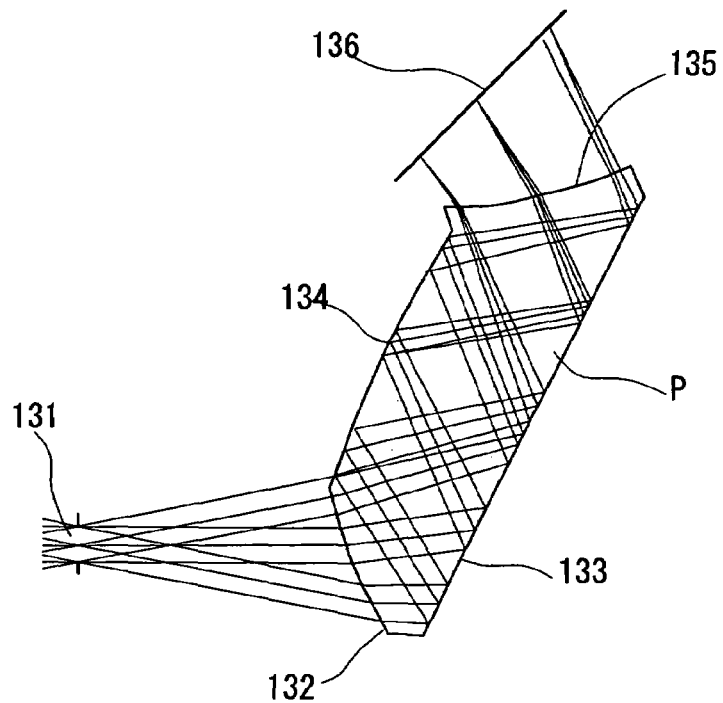
FIG. 19 is a view showing another modified example of the decentered prism.

In FIG. 19, the decentered prism P includes the first surface 132, the second surface 133, the third surface 134, and the fourth surface 135. Light passing through the entrance pupil 131 is refracted by the first surface 132 to enter the decentered prism P. The light incident on the decentered prism P is internally reflected by the second surface 133, is incident on the third surface 134 to undergo internal reflection, and is incident again on the second surface 133 to undergo internal reflection. This light is then incident on the fourth surface 135 and is refracted there so that the image is formed on the image plane 136.

Figure 20:
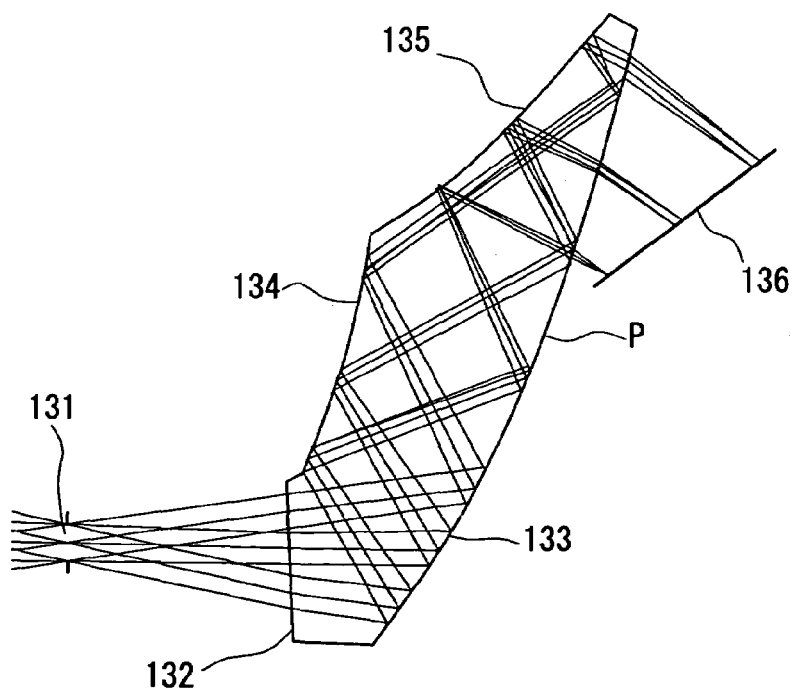
FIG. 20 is a view showing another modified example of the decentered prism.

In FIG. 20, the decentered prism P includes the first surface 132, the second surface 133, the third surface 134, and the fourth surface 135. Light passing through the entrance pupil 131 is refracted by the first surface 132 to enter the decentered prism P. The light incident on the decentered prism P is internally reflected by the second surface 133 and is incident on the third surface 134 to undergo internal reflection. Subsequently, the light is incident again on the second surface 133 to undergo internal reflection and is incident on the fourth surface 135 to undergo internal reflection. This light is then incident again on the second surface 133 and is refracted there so that the image is formed on the image plane 136.

Figure 21:
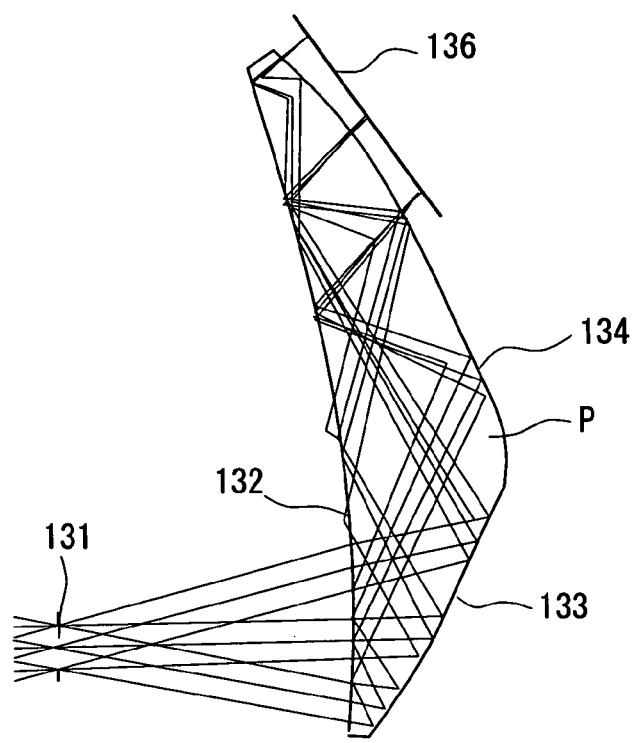
FIG. 21 is a view showing another modified example of the decentered prism.

In FIG. 21, the decentered prism P includes the first surface 132, the second surface 133, and the third surface 134. Light passing through the entrance pupil 131 is refracted by the first surface 132 to enter the decentered prism P. The light incident on the decentered prism P is internally reflected by the second surface 133 and is incident again on the first surface 132 to undergo total reflection. Subsequently, the light is internally reflected by the third surface 134 and is incident three times on the first surface 132 to undergo total reflection. This light is then incident again on the third surface 134 and is refracted there so that the image is formed on the image plane 136.

Figure 22:
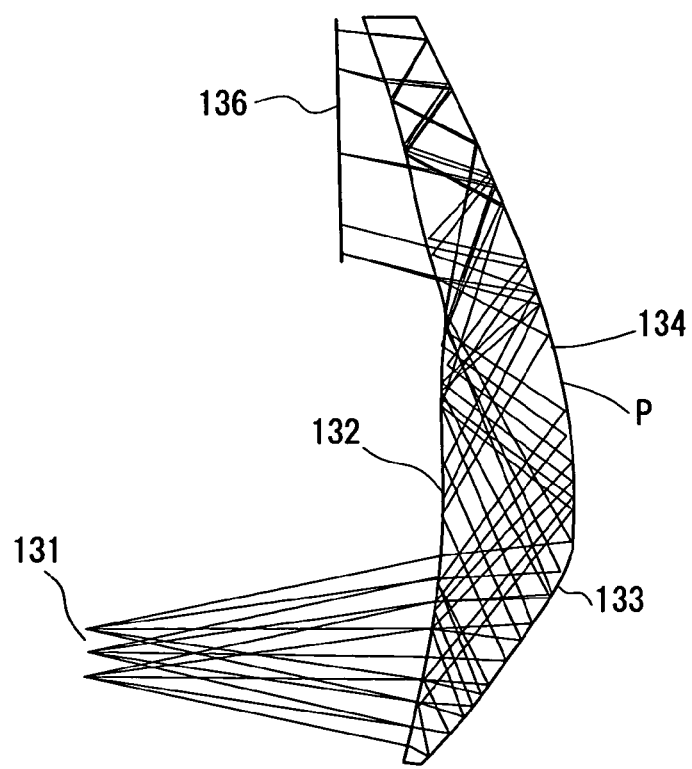
FIG. 22 is a view showing another modified example of the decentered prism.
Figure 23:
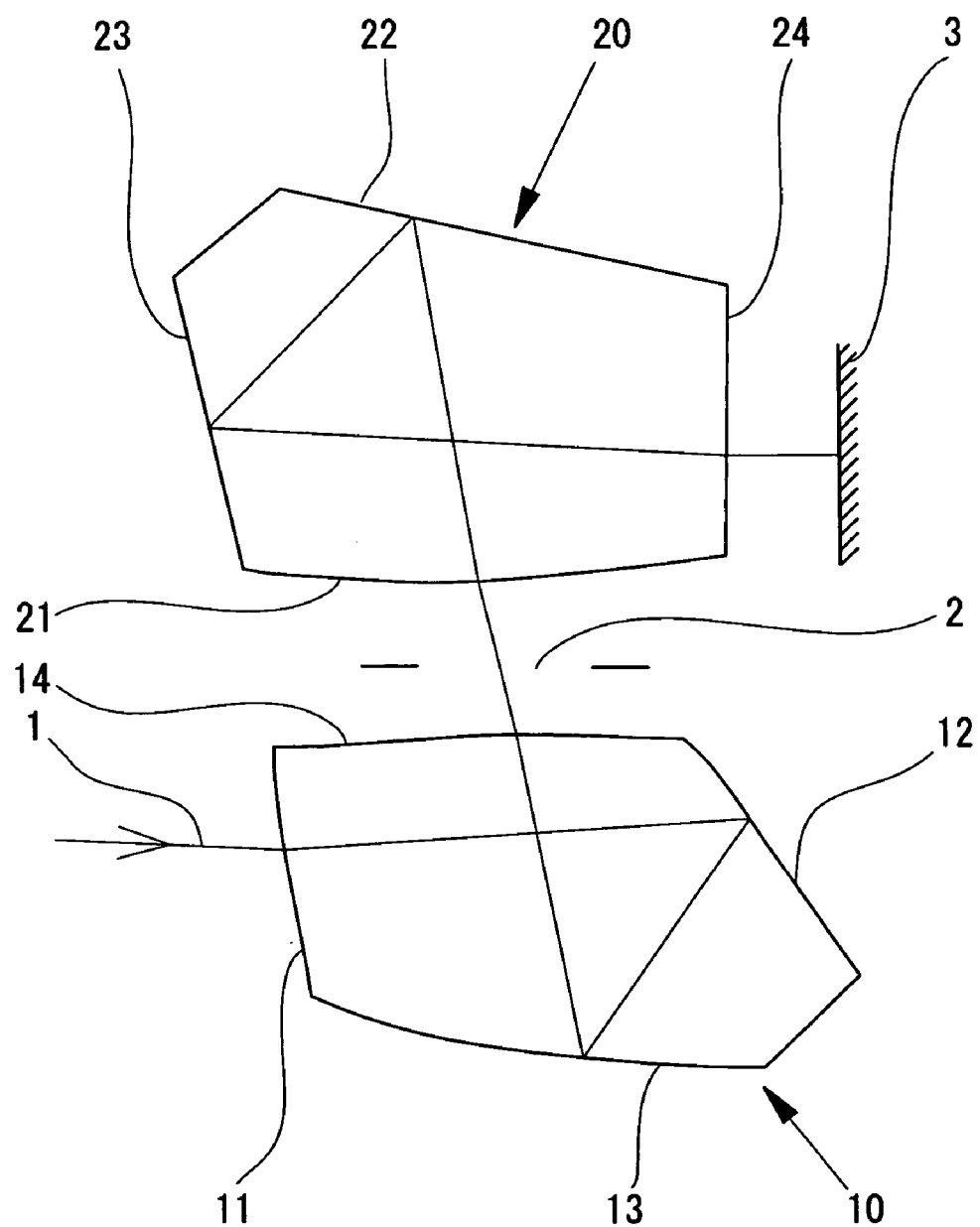
FIG. 23 is a view showing one example of the image pickup optical system of the present invention, including the combination of prisms that is different from those of the first to third embodiments.

In FIG. 22, the decentered prism P includes the first surface 132, the second surface 133, and the third surface 134. Light passing through the entrance pupil 131 is refracted by the first surface 132 to enter the decentered prism P. The light incident on the decentered prism P is internally reflected by the second surface 133 and is incident again on the first surface 132 to undergo total reflection. Subsequently, the light is internally reflected by the third surface 134 and is incident three times on the first surface 132 to undergo total reflection. This light is then incident again on the third surface 134 to undergo internal reflection and is incident four times on the first surface 132 to undergo refraction so that the image is formed on the image plane 136.

Figure 24:
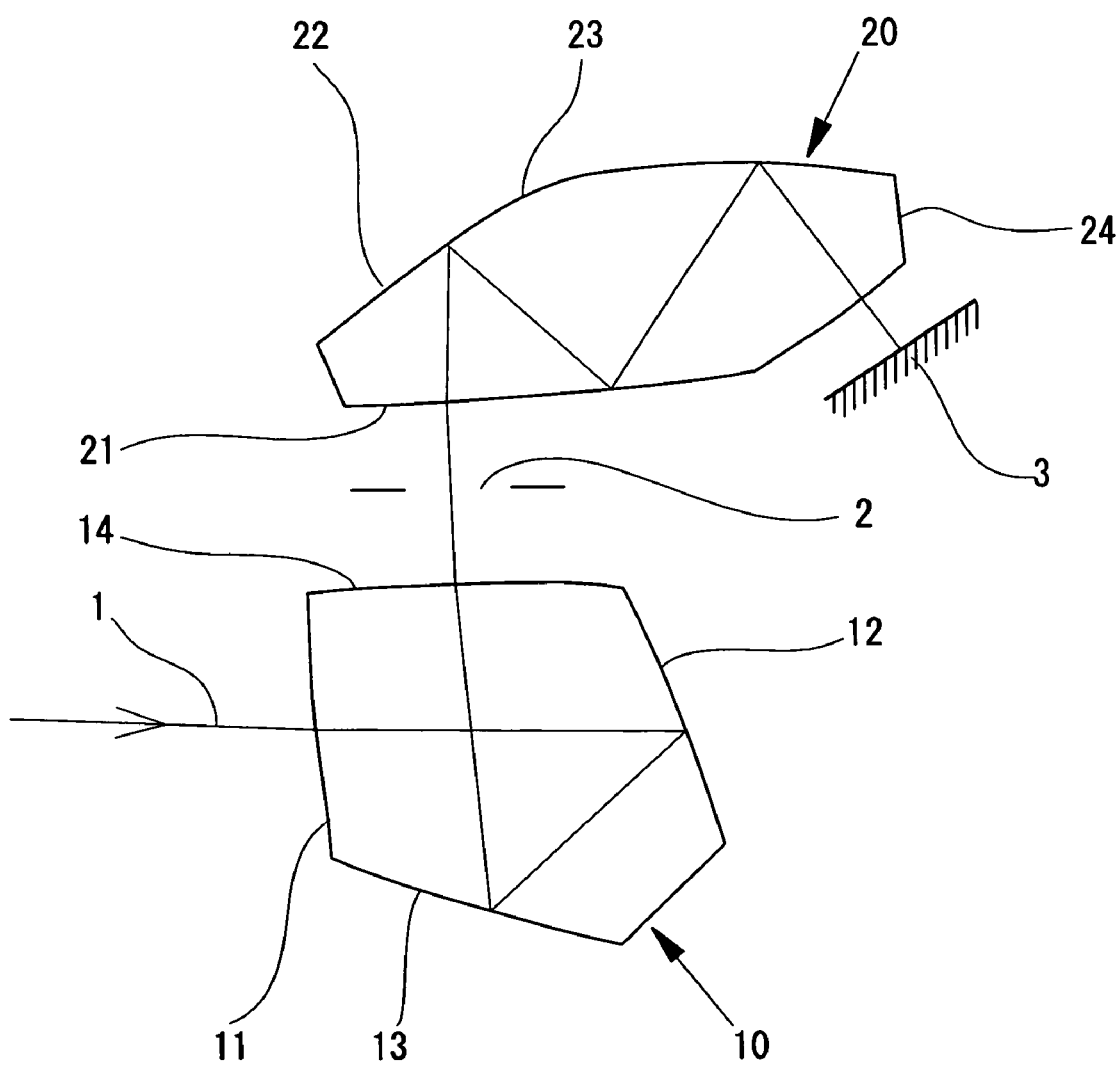
FIG. 24 is a view showing another example of the image pickup optical system of the present invention, including the combination of prisms that is different from those of the first to third embodiments.
Figure 25:
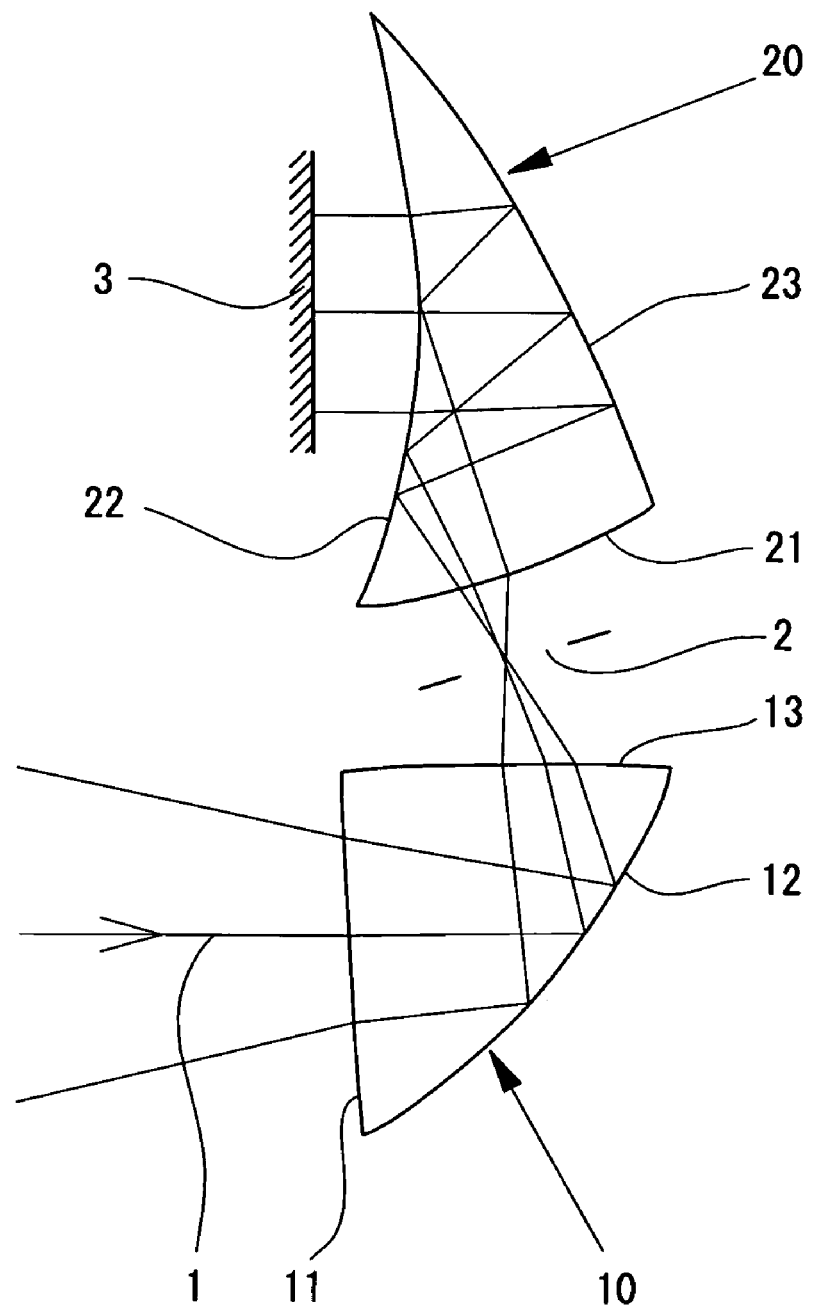
FIG. 25 is a view showing another example of the image pickup optical system of the present invention, including the combination of prisms that is different from those of the first to third embodiments.
Figure 26:
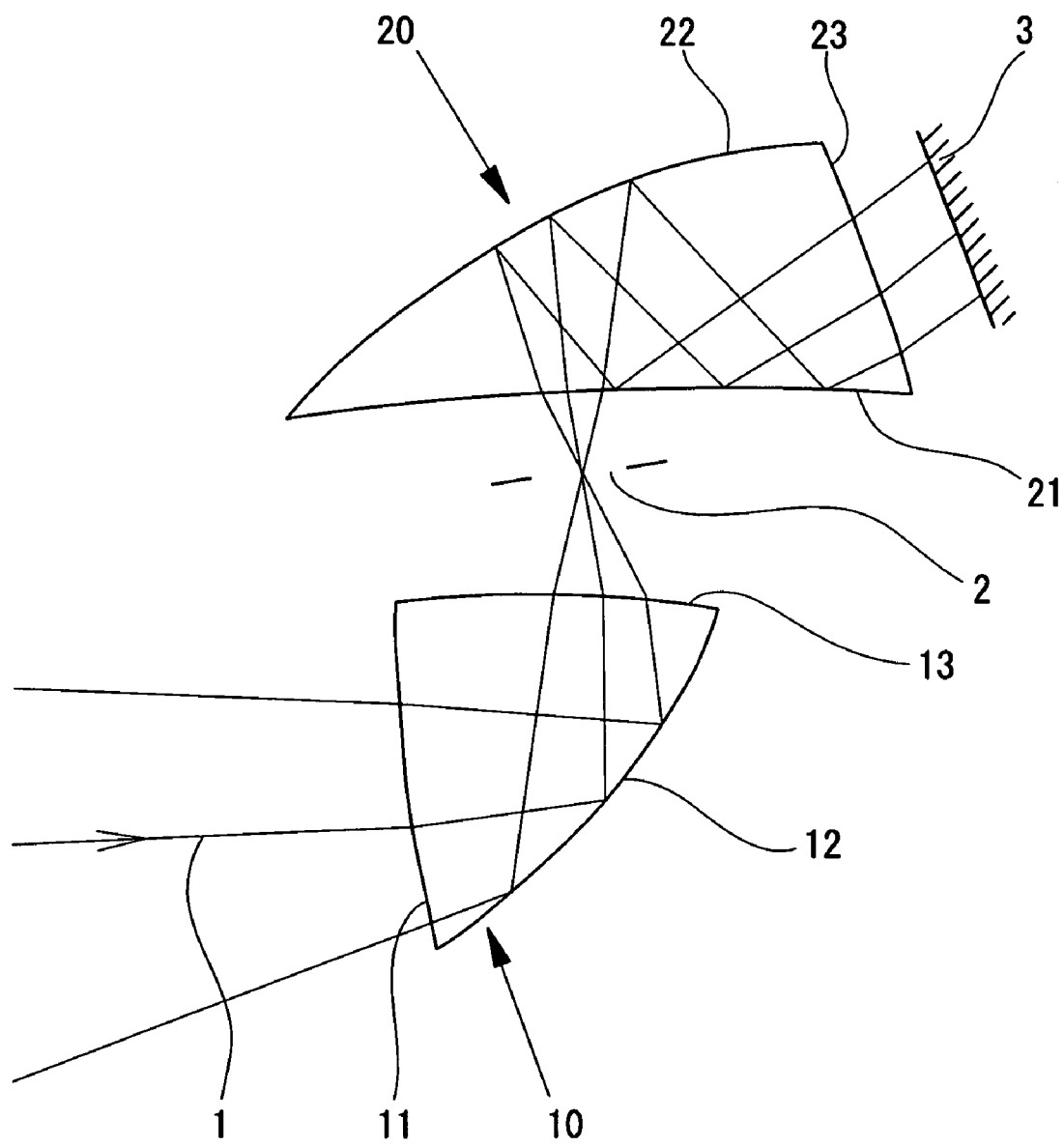
FIG. 26 is a view showing another example of the image pickup optical system of the present invention, including the combination of prisms that is different from those of the first to third embodiments.
Figure 27:
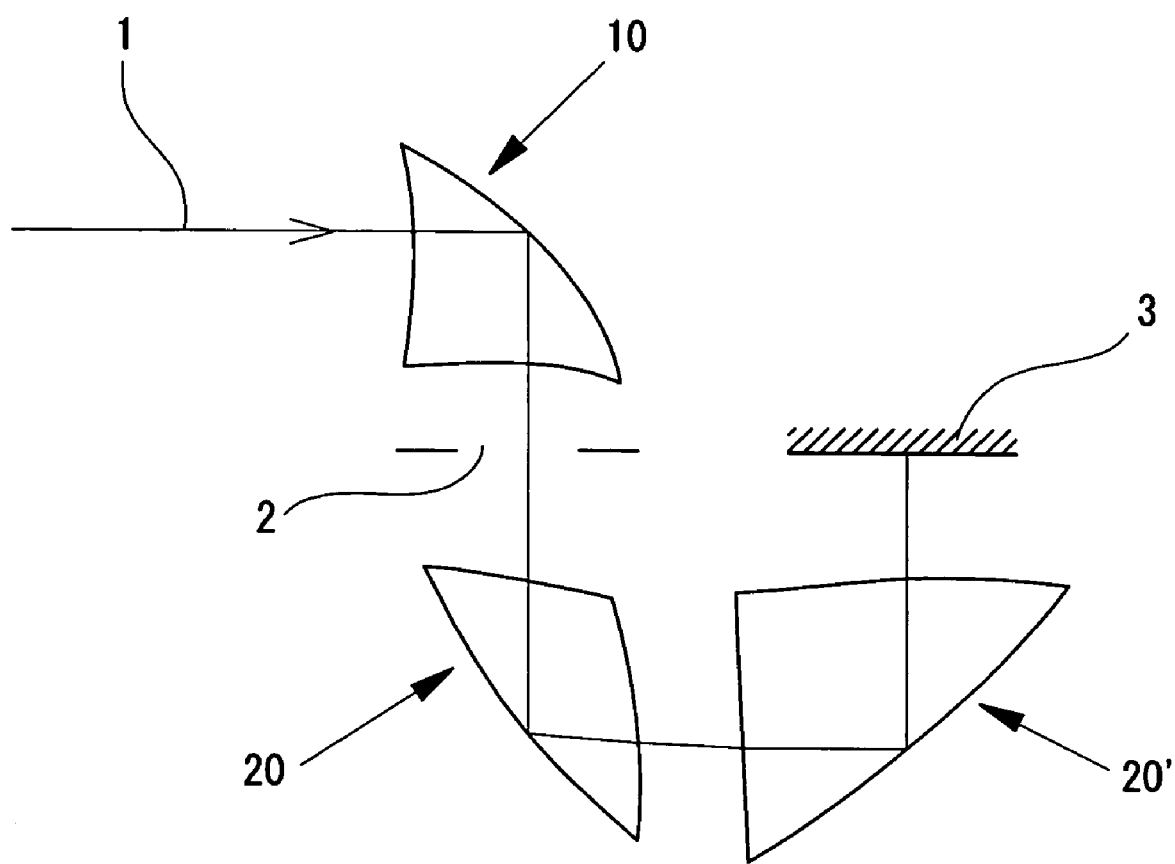
FIG. 27 is a view showing another example of the image pickup optical system of the present invention, including the combination of prisms that is different from those of the first to third embodiments.

The prism, like a second prism 20 of FIG. 24 to be described later, may be designed to have first to fourth surfaces 21-24 so that light is reflected three times in the prism. Further, the prism, like the second prism 20 of FIG. 25 to be described later, may be designed to have the first to third surfaces 21-23 so that light is twice reflected in the prism in which the second surface 22 is used as a totally reflecting surface as well as the exit surface. Still further, the prism, like the second prism of FIG. 26 to be described later, may also be designed to have the first to third surfaces 21-23 so that light is twice reflected in the prism in which the first surface 21 is used as the entrance surface as well as the totally reflecting surface. Such a prism can be used as the decentered prism located before or behind the stop 2.

In the image pickup optical system of the present invention, prism combinations different from the cases of the first to third embodiments are shown in FIGS. 23-27. However, the numerical data are omitted.

The optical system of the present invention described above can be used in a photographing apparatus in which an image of an object is formed and is received by an imaging element, such as a CCD or a silver halide film, so that photographing is performed, notably a camera. Further, the optical system can be used in an observation apparatus in which the object image is observed through an eyepiece, notably as an objective optical system of the finder of the camera. Still further, the optical system can also be used as an image pickup optical system for an optical apparatus using a small-sized image sensor as in an endoscope.

Figure 28:
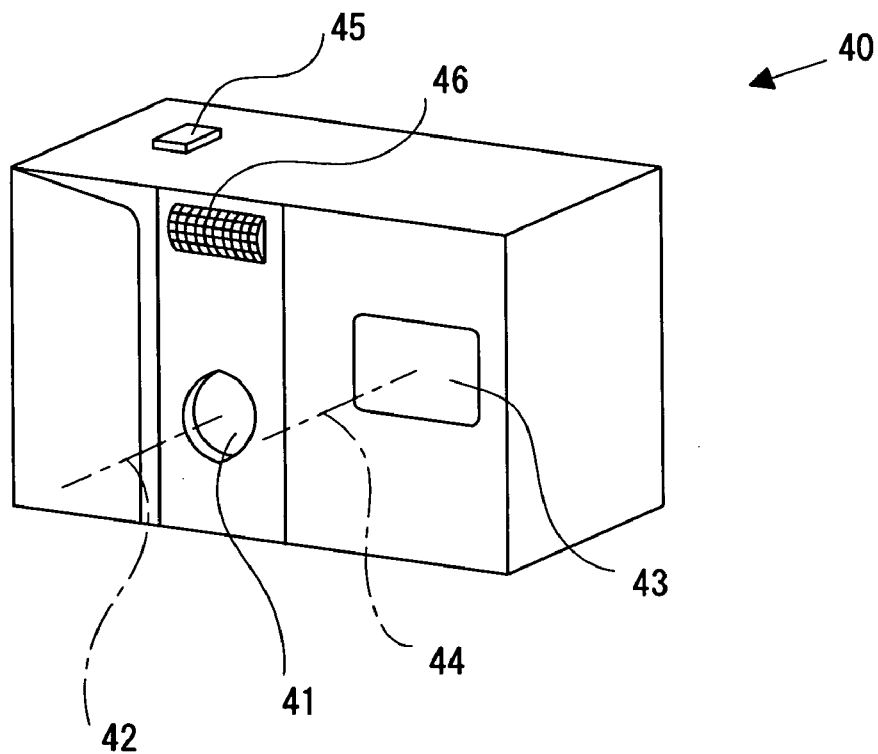
FIG. 28 is a perspective front view showing the appearance of an electronic camera to which the optical system of the present invention is applied.
Figure 29:
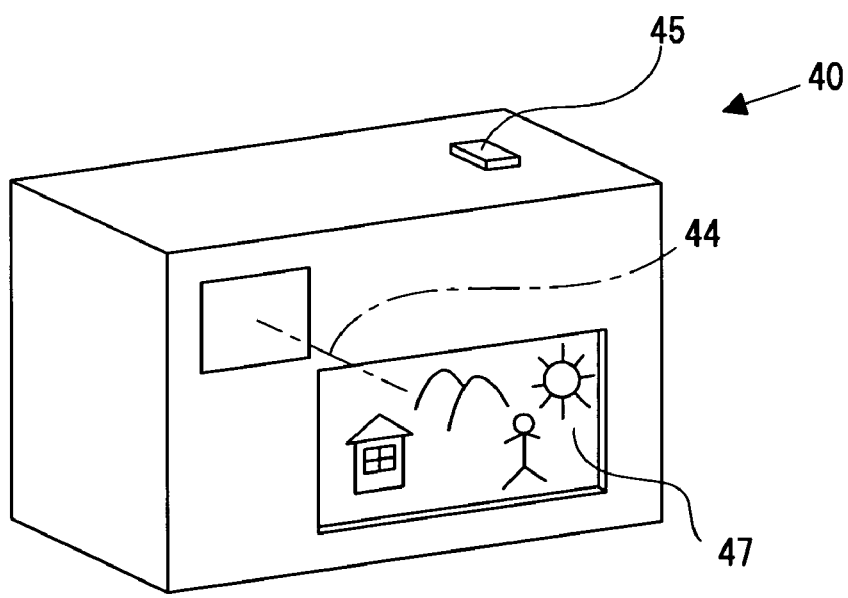
FIG. 29 is a perspective rear view showing the electronic camera of FIG. 28.
Figure 30:
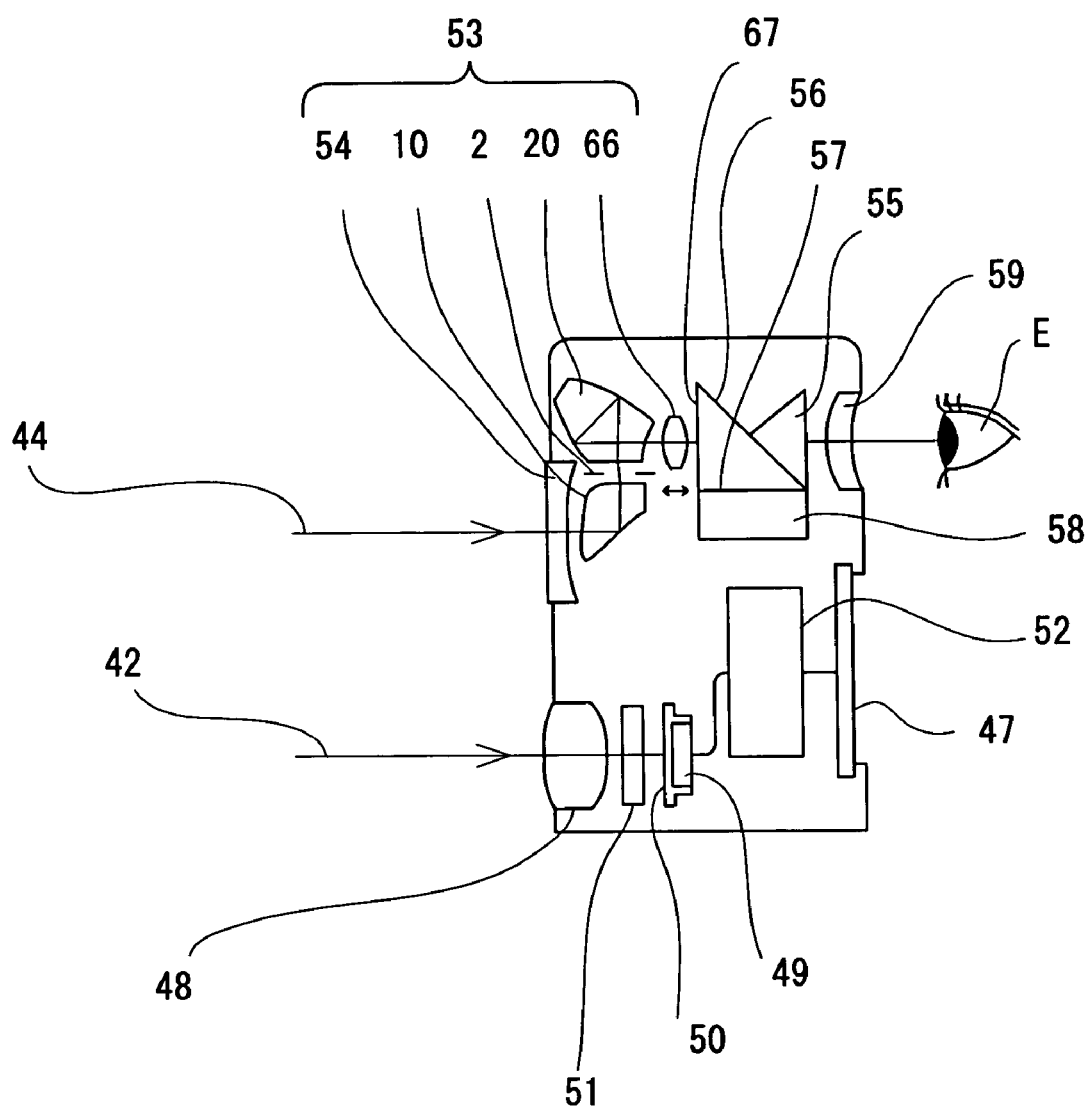
FIG. 30 is a sectional view showing the optical arrangement of the electronic camera of FIG. 28.

FIGS. 28-30 show the optical system of the present invention incorporated in the objective optical system of the finder of an electronic camera.

An electronic camera 40, in this example, includes a photographing optical system 41 having a photographing optical path 42, a finder optical system 43 having a finder optical path 44, a shutter button 45, a flash lamp 46, and a liquid crystal display monitor 47. In this construction, a user pushes the shutter button 45 located on the upper portion of the camera 40, photographing is performed through a photographing objective optical system 48 in association with the shutter button 45.

An object image formed by the photographing objective optical system 48 is placed on an imaging surface 50 of a CCD 49 through filter 51 such as a low-pass filter or an infrared cutoff filter. The object image received by the CCD 49 is displayed as an electronic image through a processing means 52 on the liquid crystal display monitor 47 provided on the back surface of the camera. In the processing means 52, a memory is provided and a photographed electronic image can be recorded. Also, the memory may be provided to be independent of the processing means 52. Alternatively, it may be constructed so that the image is electronically recorded and written by a floppy (trademark) disk. A silver halide film camera using a silver halide film, instead of the CCD 49, may be employed.

A finder objective optical system 53 is located on the finder optical path 44. The finder objective optical system 53 includes a cover lens 54, the first prism 10, the aperture stop 2, the second prism 20, and a focus lens 66. Here, the optical system of the present invention is used in an optical system ranging from the cover lens 54 or the first prism 10 to the second prism 20.

The cover lens 54 used as a cover member has negative power to enlarge the angle of view.

An object image is formed by the finder objective optical system 53. The object image is provided on a field frame 57 of a Porro prism 55. Here, the Porro prism 55 functions as an image erecting member. Behind the second prism 20 is located the focus lens 66, which can be shifted and adjusted in position along the optical axis and is used for focus adjustment of the finder objective optical system 53. The object image formed on an imaging surface 67 by the finder objective optical system 53 is brought onto a field frame 57 of a Porro prism 55 which is an image erecting member. The field frame 57 separates a first reflecting surface 56 of the Porro prism 55 from a second reflecting surface 58 and is interposed between them. Behind the Porro prism 55, an eyepiece optical system 59 introducing an erect image into an observer's eye E is located.

In the camera 40 designed as mentioned above, the finder objective optical system 53 can be constructed with a small number of optical members, and high performance and a cost reduction can be achieved. At the same time, the optical path itself of the objective optical system 53 can be bent. Therefore, the number of degrees of layout freedom in the camera is increased, which becomes advantageous for design.

Although in FIG. 30 the arrangement of the photographing objective optical system 48 is not described, a refraction-type coaxial optical system can be used as the photographing objective optical system 48. Alternatively, the optical system of any type, including the two prisms 10 and 20 according to the present invention can, of course, be used.

Figure 31:
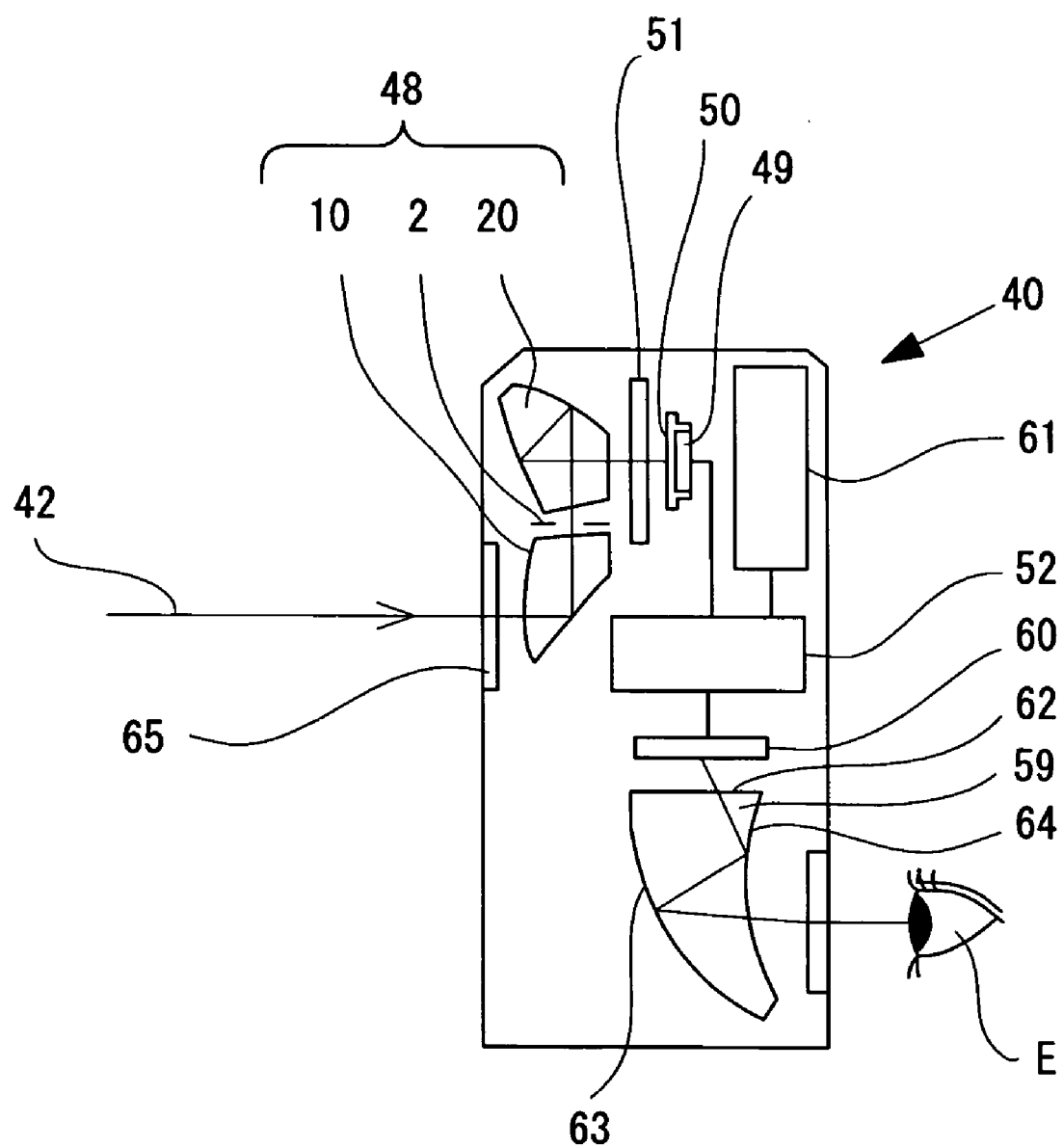
FIG. 31 is a conceptual view showing another electronic camera to which the optical system of the present invention is applied.

FIG. 31 shows the electronic camera 40 in which the optical system of the present invention is incorporated in the objective optical system 48 of a photographic section. In this case, the optical system of the present invention including the first prism 10, the aperture stop 2, and the second prism 20 is used in the photographing objective optical system 48 located on the photographing optical path 42.

An object image formed by the photographing objective optical system 48 is brought onto the imaging surface 50 of the CCD 49 through the filter 51 such as the low-pass filter or the infrared cutoff filter. The object image received by the CCD 49 is displayed as an electronic image on a liquid crystal display element (LCD) 60 through the processing means 52. The processing means 52 also makes the control of a recording means 61. The recording means 61 is used to record the object image captured by the CCD 49 as electronic information. The image displayed on the LCD 60 is introduced into the observer's eye E through the eyepiece optical system 59.

The eyepiece optical system 59 is constructed with a decentered prism and, in this example, includes three surfaces: an entrance surface 62, a reflecting surface 63, and a combined surface 64 of reflection and refraction. At least one of the two surfaces 63 and 64 having reflecting functions, preferably both, provide power to a light beam and each of them is configured as a face-symmetrical free-formed surface which is only one symmetrical surface correcting decentered aberration. This only one symmetrical surface is placed on nearly the same plane as only one symmetrical surface of the face-symmetrical free-formed surface of each of the prisms 10 and 20 of the photographing objective optical system 48. Also, the photographing objective optical system may include other lenses (positive and negative lenses), as its components, on the object side of the prisms 10 and 20, between them, or on the image side of them.

In the camera 40 constructed as mentioned above, the photographing objective optical system 48 can be constructed with a small number of optical members, and high performance and a cost reduction can be achieved. At the same time, the entire optical system can be arranged on the same plane. Therefore, a slim design of thickness in the plane of the arrangement and in a perpendicular direction can be achieved.

In this example, a plane-parallel plate is used as a cover member 65 of the photographing objective optical system 48, but a lens with power may be used as in the preceding example.

Here, without providing the cover member, a surface located at the most object-side position of the optical system of the present invention can also be used as the cover member. In this example, the most object-side surface corresponds to the entrance surface of the prism 10. However, this entrance surface is decentered with respect to the optical axis, and thus when the above surface is placed at the front surface of the camera, an observer has the illusion that the center of the photographic area of the camera 40 is shifted from him, looking from the object side (it is common that the observer feels that photographing is performed in a direction perpendicular to the entrance surface as in an ordinary camera). This causes a feeling of disorder. Thus, in the case where the most object-side surface of the optical system is decentered as in this example, it is desirable to provide the cover member 65 (or the cover lens 54) because the feeing of disorder is not brought about, looking from the object side, and photographing can be performed with the same feeling as in the existing camera.

Figure 32A:
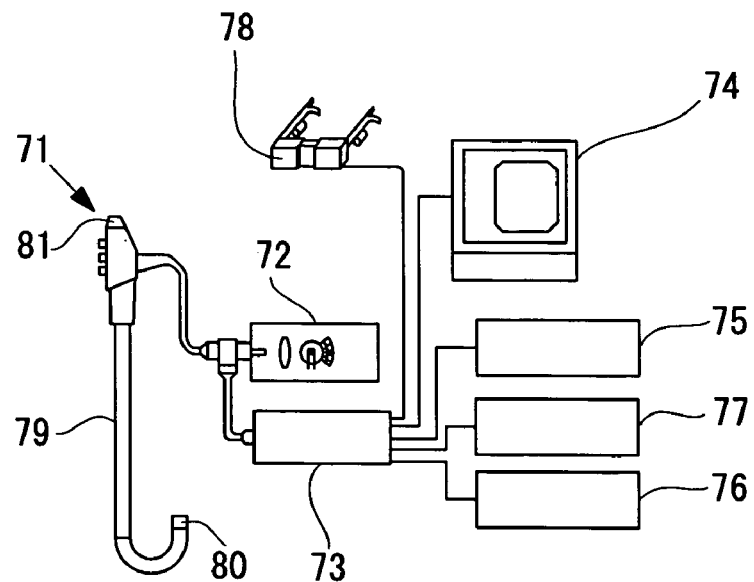
FIGS. 32A and 32B are conceptual views showing an electronic endoscope to which the optical system of the present invention is applied.
Figure 32B:
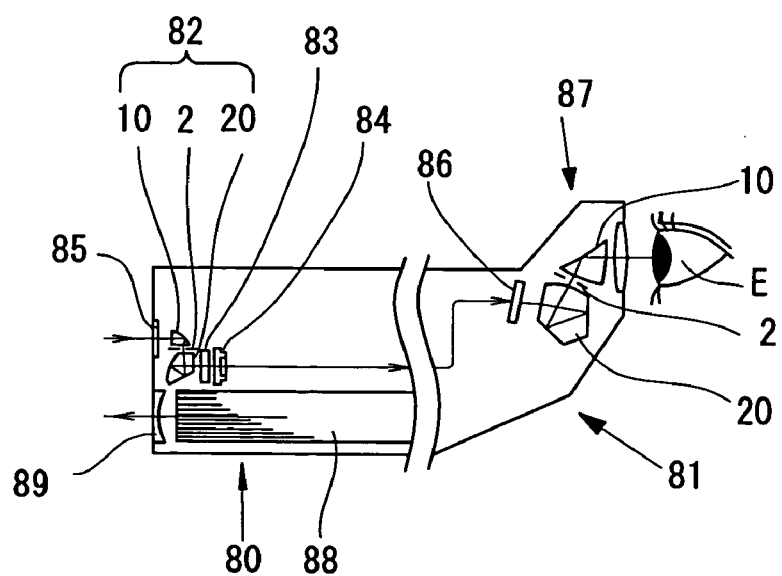

FIGS. 32A and 32B show an electronic endoscope in which the optical system of the present invention is incorporated in an objective optical system 82 of the observation system of the endoscope. In FIG. 32B, the optical system of the present invention is also incorporated in an eyepiece optical system 87 of the observation system of the endoscope.

In this case, the objective optical system 82 of the observation system uses the optical system of the present invention that includes the first prism 10, the aperture stop 2, and the second prism 20. On the other hand, the eyepiece optical system 87 also uses the optical system of the present invention that includes the first prism 10, the aperture stop 2, and the second prism 20. This electronic endoscope, as illustrated in FIG. 32A, has an electronic endoscope 71, a light source device 72 supplied with illumination light, a video processor 73, a monitor 74, a VTR deck 75, a video desk 76, a video printer 77, and a head mounted image display device (HMD) 78.

Here, the video processor 73 is used to process a signal relative to the electronic endoscope 71. The monitor 74 is used to display an image signal output from the video processor 73. The VTR deck 75 and the video desk 76 are connected to the video processor 73 and are provided to record the image signal. The video printer 77 is provided to print out the image signal as an image.

A distal end 80 of an insertion section 79 of the electronic endoscope 71 and an eyepiece section 81 are constructed as shown in FIG. 32B. A light beam emitted from the light source device 72 passes through a light guide fiber bundle 88 and illuminates a part to be observed through an objective optical system 89 for illumination. Light from the part to be observed is formed as an object image through the cover member 85 by the objective optical system 82 for observation. This object image is brought onto the imaging surface of a CCD 84 through a filter 83 such as a low-pass filter or an infrared cutoff filter. The object image is further converted into an image signal by the CCD 84, and the image signal is displayed directly on the monitor 74 by the video processor 73 shown in FIG. 32A.

The image signal is recorded in the VTR deck 75 and the vedio disk 76. Alternatively, the signal is printed out as an image from the video printer 77. The image signal is displayed on the image display element of the HMD 78 so that it is observed by the wearer of the HMD 78. At the same time, the image signal converted by the CCD 84 is displayed as an electronic image on a liquid crystal display element (LCD) 86 of the eyepiece section 81. This displayed image is introduced into the observer's eye E through the eyepiece optical system 87 using the optical system of the present invention.

The endoscope designed as mentioned above is constructed with a small number of optical members so that high performance and a cost reduction can be achieved. In addition, since the objective optical system 82 is arranged along the major axis of the endoscope, the above effect can be secured without frustrating a sleek design of the endoscope.

Figure 33:
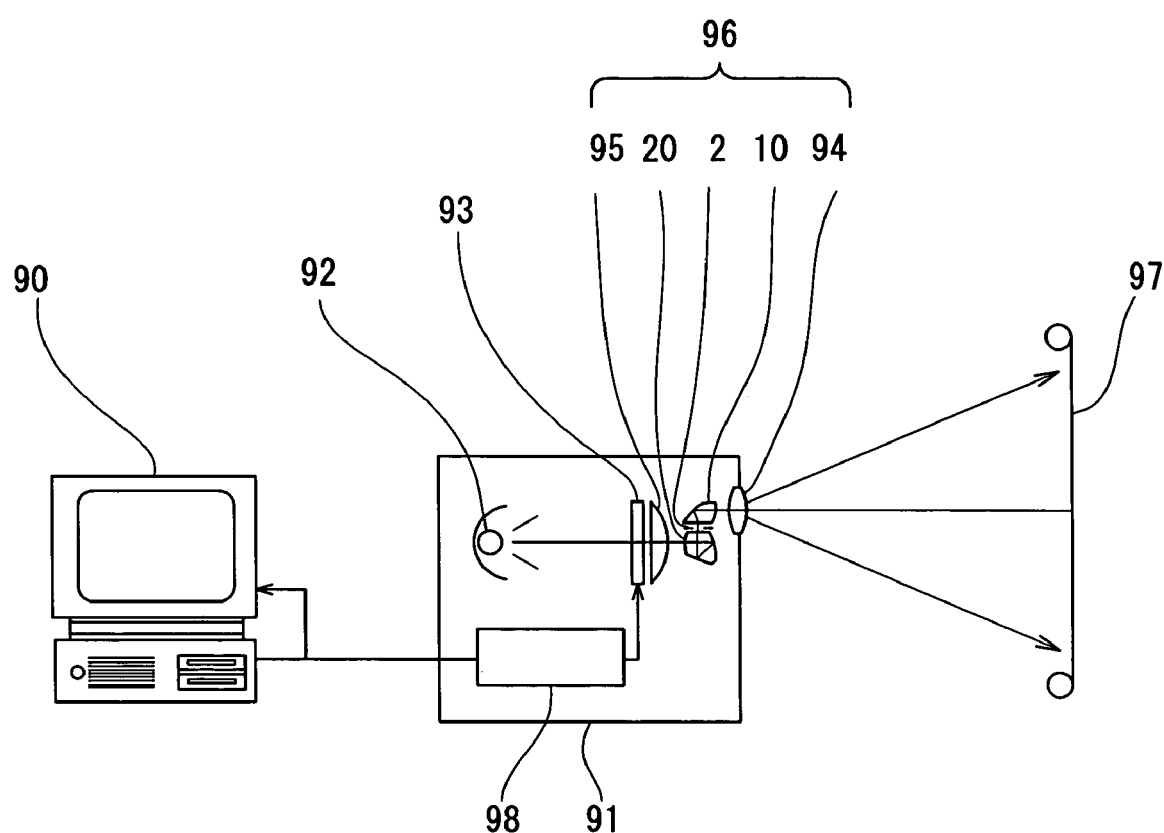
FIG. 33 is a conceptual view showing a projection optical system of a presentation system using the optical system according to the present invention.

The optical system can also be used as a projection optical system by reversing the optical path. FIG. 33 shows a presentation system combining a personal computer 90 with a liquid crystal projector 91. In FIG. 33, the optical system of the present invention is used in a projection optical system 96 of the liquid crystal projector 91. In this case, the optical system of the present invention including the first prism 10, the aperture stop 2, and the second prism 20 is used in the projection optical system 96.

In FIG. 33, image and manuscript data furnished by the personal computer 90 are separated from a monitor output and are output to a process control section 98 of the liquid crystal projector 91. In the process control section 98 of the liquid crystal projector 91, input data are processed and are output to a liquid crystal panel (LCP) 93. On the liquid crystal panel 93, an image corresponding to input image data is displayed. Light from a light source 92, after the determination of its amount of transmission according to the tone of the image displayed on the liquid crystal panel 93, is projected on a screen 97 through the projection optical system 96 which includes a field lens 95 placed immediately before the liquid crystal panel 93; the first prism 10, the aperture stop 2, and the second prism 20, constituting the optical system of the present invention; and a cover lens 94 with positive power.

The projector designed as mentioned above can be constructed with a small number of optical members so that high performance and a cost reduction can be achieved and a compact design is possible.

Figure 34:
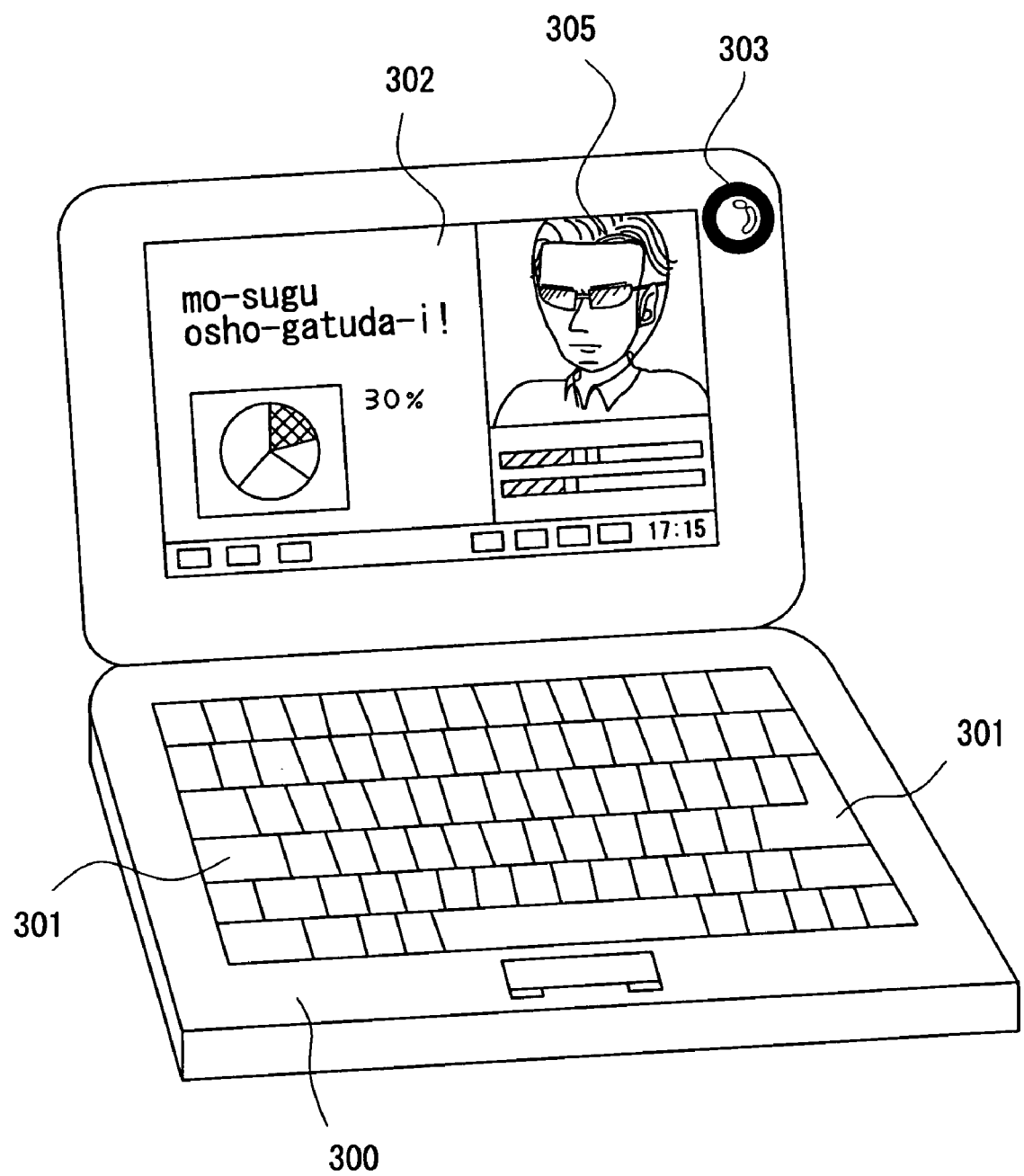
FIG. 34 is a perspective front view showing a personal computer whose cover is opened, in which the optical system of the present invention is incorporated as an objective optical system.
Figure 35:
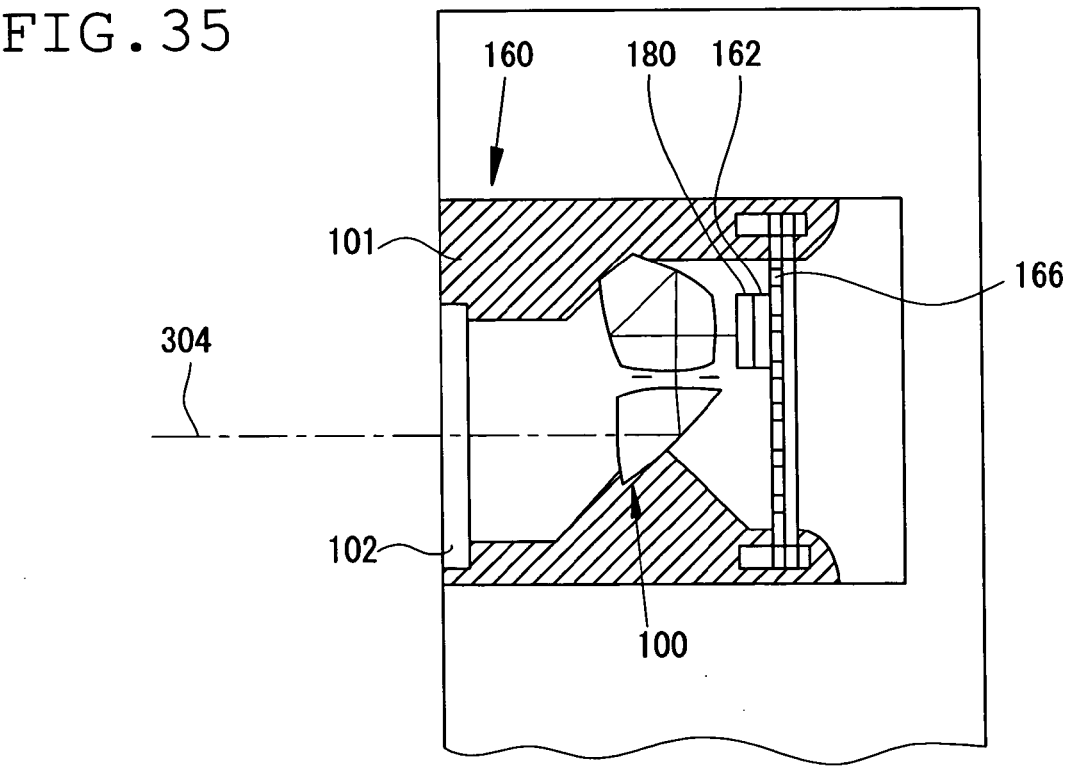
FIG. 35 is a sectional view showing the photographing optical system of the personal computer.
Figure 36:
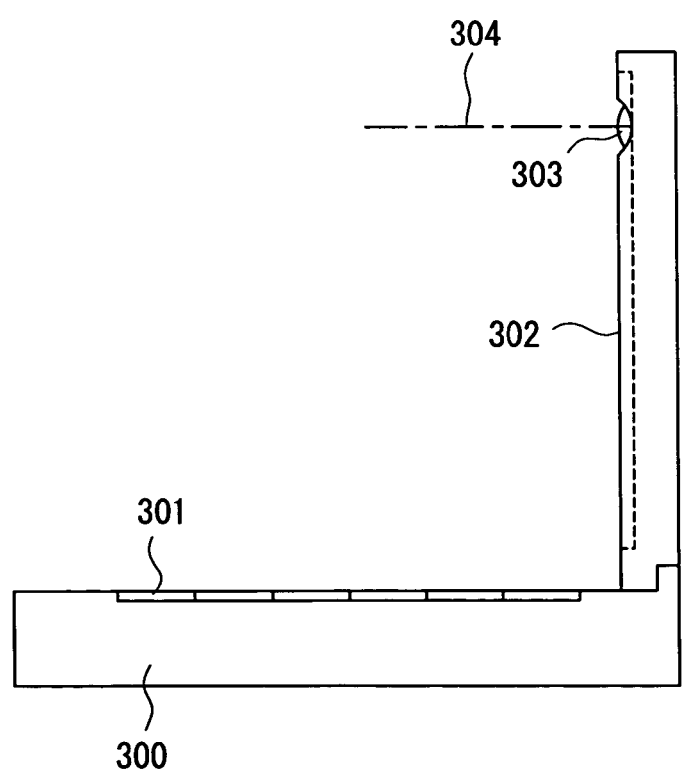
FIG. 36 is a side view showing the personal computer of FIG. 34.

Subsequently, FIGS. 34-36 show a personal computer that is an example of information processing apparatus, incorporating the optical system of the present invention.

As shown in FIGS. 34-36, a personal computer 300 has a keyboard 301; an information processing means or recording means; a monitor 302; and a photographing optical system 303.

Here, the keyboard 301 is provided to input information from the exterior by an operator. The information processing means or the recording means is omitted from the figures. The monitor 302 is to display information for the operator. The monitor 302 may be a transmission-type liquid crystal display element illuminated with backlight, not shown, from the back face, a reflection-type liquid crystal display element reflecting light from the front for display, or a CRT display. The photographing optical system 303 is provided to photograph the operator himself or surrounding images. In these figures, the photographing optical system 303 is housed in the monitor 302 upper-right, but the position of the optical system 303 is not limited to this place. It may be located at any place, such as the periphery of the monitor 302 or of the keyboard 301.

The photographing optical system 303 has an objective optical system 100 including the optical system of the present invention and an imaging element chip 162 receiving an image on a photographing optical path 304. These are housed in the personal computer 300.

Here, an IR cutoff filter 180 is additionally cemented to the imaging element chip 162. That is, the imaging element chip 162 and the IR cutoff filter 180 are integrally constructed as an imaging unit 160. The imaging unit 160 is fitted into the rear end of a lens frame 101 of the objective optical system 100 and can be mounted in a single operation. Therefore, the alignment of the objective optical system 100 and the chip 162 and the adjustment of face-to-face spacing are not required. As a result, assembly is simplified. At the top of the lens frame 101, a cover glass 102 for protecting the objective optical system 100 is placed.

An object image received by the imaging element chip 162 is input into the processing means of the personal computer 300 through a terminal 166 and is displayed as an electronic image on the monitor 302. In FIG. 34, a photographed image 305 of the operator is shown as an example. It becomes possible to transmit the image 305 to the exterior through the processing means. The image 305 can thus be transmitted to his communication mate lying at a remote place through the internet or the telephone. Whereby, it can also be displayed on the personal computer of the communication mate.

FIGS. 37A-37C show another example of the information processing apparatus, that is, a telephone, notably a mobile phone that is handy to carry, housing the optical system of the present invention.

A mobile phone 400, as shown in FIGS. 37A-37C, includes a microphone section 401, a speaker section 402, input dials 403, a monitor 404, a photographing optical system 405, an antenna 406, and a processing means (not shown).

Here, the microphone section 401 is used to input an operator's voice as information. The speaker section 402 transmits the voice of a communication mate. The input dials 403 are used for the purpose that an operator inputs information. The monitor 404 is to display information, such as photographed images of the operator himself and the communication mate, and telephone numbers. The monitor 404 is a liquid crystal display element. The antenna 406 is used to transmit and receive communication waves. The processing means processes image information, communication information, and input signals. Also, in the figures, the positions of individual components are not limited to those shown.

The photographing optical system 405 has the objective optical system 100 and the imaging element chip 162 receiving the image. Here, the optical system of the present invention is used in the objective optical system 100, which is located on a photographing optical path 407. These are incorporated in the mobile phone 400.

Here, the IR cutoff filter 180 is additionally cemented to the imaging element chip 162. That is, the imaging element chip 162 and the IR cutoff filter 180 are integrally constructed as the imaging unit 160. The imaging unit 160 is fitted into the rear end of the lens frame 101 of the objective optical system 100 and can be mounted in a single operation. Therefore, the alignment of the objective optical system 100 and the chip 162 and the adjustment of face-to-face spacing are not required. As a result, assembly is simplified. At the top of the lens frame 101, the cover glass 102 for protecting the objective optical system 100 is placed.

An object image received by the imaging element chip 162 is input into the processing means, not shown, through the terminal 166 and is displayed as the electronic image on either the monitor 404 or the monitor of the communication mate, or both. Also, the processing means includes a signal processing function that when the image is transmitted to the communication mate, the information of the object image received by the chip 162 is converted into a transmittable signal.

What is claimed is:

1. An image pickup optical system comprising, in order from an object side:
   a front unit having at least one reflecting surface with power that is rotationally asymmetrical;
   an aperture stop; and
   a rear unit having at least one reflecting surface with power that is rotationally asymmetrical,
   wherein F-numbers in two directions perpendicular to each other on a plane perpendicular to an optical axis are different, to satisfy the following condition:

$$1.1 < FNY/FNX < 2.0$$

where FNY is the F-number in a decentering direction and FNX is the F-number in a direction perpendicular to the decentering direction.

2. An image pickup optical system according to claim 1, wherein the aperture stop is circular.

3. An image pickup optical system comprising:
   a prism having at least one reflecting surface with power that is rotationally asymmetrical; and
   an image sensor,
   satisfying the following condition:

$$1.2 \, \mu m < P < 3.6 \, \mu m$$

where P is a pixel pitch of the image sensor.

4. An image pickup optical system comprising:
   a prism having at least one reflecting surface with power that is rotationally asymmetrical; and
   an image sensor,
   satisfying the following conditions:

$$1.0 \, mm < Dx < 4.0 \, mm$$

$$1.3 \, mm < Dy < 5.3 \, mm$$

where Dx is a length in an x direction of an effective pixel area of the image sensor and Dy is a length in a y direction, which is a decentering direction, of the effective pixel area of the image sensor.

5. An image pickup optical system comprising, in order from an object side:
   a first prism having at least one reflecting surface with power that is rotationally asymmetrical;
   an aperture stop;
   a second prism having at least one reflecting surface with power that is rotationally asymmetrical; and
   an image sensor,
   a length from the image sensor to a front unit or a rear unit satisfying the following condition:

$$0.19 < h1/(h2 \cdot Fnox) < 0.52$$

where h1 is a length of a part from a plane including the image sensor from an optical plane of the first prism farthest from the plane, h2 is a length of a part from the plane including the image sensor to an optical plane of the second prism farthest from the plane, and Fnox is a minimum F-number in an entire optical system.

6. An image pickup optical system comprising, in order from an object side:
   a first prism having at least one reflecting surface with power that is rotationally asymmetrical;
   an aperture stop;
   a second prism having at least one reflecting surface with power that is rotationally asymmetrical; and
   an image sensor, a power of a whole of the second prism being positive and a power of a reflecting surface nearest the image sensor satisfying the following conditions:

$$0.02 < \phi x/\Phi x < 1.95$$

$$-1.62 < \phi y/\Phi y < 0.30$$

where φx is a power in an x direction of the reflecting surface nearest the image sensor in the second prism, φy is a power in a y direction, which is a decentering direction, of the reflecting surface nearest the image sensor in the second prism, Φx is a power in the x direction of an entire optical system, and Φy is a power in the y direction, which is the de-centering direction, of the entire optical system.

7. An image pickup optical system comprising, in order from an object side:
a first prism having at least one reflecting surface with power that is rotationally asymmetrical;
an aperture stop;
a second prism having at least one reflecting surface with power that is rotationally asymmetrical; and
an image sensor,
an angle of incidence of a chief ray on the image sensor satisfying the following conditions:

$$-10.0° < \theta x < 11.0°$$

$$0.5° < \theta x - \theta y < 23.0°$$

where θx is the angle of incidence of the chief ray on the image sensor in an x direction, which is a direction of a short side of the image sensor, and θy is the angle of incidence of the chief ray on the image sensor in a y direction.

8. An image pickup optical system comprising, in order from an object side:
a front unit having an entrance surface, at least one reflecting surface with power that is rotationally asymmetrical, and an exit surface;
an aperture stop; and
a rear unit having an entrance surface, at least one reflecting surface with power that is rotationally asymmetrical, and an exit surface,
decentration taking place in one of two directions perpendicular to each other on a plane perpendicular to an optical axis, and an F-number in a direction perpendicular to this decentering direction in which the decentration takes place being made smaller than an F-number in the decentering direction, to satisfy the following condition:

$$1.1 < FNY/FNX < 2.0$$

where FNY is the F-number in the decentering direction and FNX is the F-number in the direction perpendicular to the decentering direction.

9. An image pickup optical system comprising, in order from an object side:
a front unit having at least one reflecting surface with power that is rotationally asymmetrical;
an aperture stop; and
rear unit having at least one reflecting surface with power that is rotationally asymmetrical,
wherein F-numbers in two directions perpendicular to each other on a plane perpendicular to an optical axis are different, and
the following condition is satisfied:

$$-0.5 < fly/flx < 0.7$$

where flx is a focal length of the front unit and fly is a focal length of the rear unit.

10. An image pickup optical system comprising:
a prism having at least one reflecting surface with power that is rotationally asymmetrical; and
an image sensor,
satisfying the following condition:

$$1.6 \,\mu m < P < 3.3 \,\mu m$$

where P is a pixel pitch of the image sensor.

11. An image pickup optical system comprising:
a prism having at least one reflecting surface with power that is rotationally asymmetrical; and
an image sensor,
satisfying the following condition:

$$4 \,\mu m < P \cdot Fnoy < 25 \,\mu m$$

where P is an average pixel-to-pixel spacing of the image sensor and Fnoy is a maximum F-number in an entire optical system.

12. An image pickup optical system comprising:
a prism having at least one reflecting surface with power that is rotationally asymmetrical; and
an image sensor,
satisfying the following conditions:

$$1.5 \,mm < Dx < 3.7 \,mm$$

$$2.0 \,mm < Dy < 4.9 \,mm$$

where Dx is a length in an x direction of an effective pixel area of the image sensor and Dy is a length in a y direction, which is a decentering direction, of the effective pixel area of the image sensor.

13. An image pickup optical system comprising:
a prism unit having at least one reflecting surface with power that is rotationally asymmetrical; and
an image sensor,
satisfying the following conditions:

$$0.35 < Dx/Bx < 0.95$$

$$0.12 < Dy/By < 0.50$$

where Dx is a length in an x direction of an effective pixel area of the image sensor, Dy is a length in a y direction, which is a decentering direction, of the effective pixel area of the image sensor, Bx is a maximum outside diameter in the x direction of the prism unit, and By is a maximum outside diameter in the y direction of the prism unit.

14. An image pickup optical system comprising, in order from an object side:
a first prism having at least one reflecting surface with power that is rotationally asymmetrical;
an aperture stop;
a second prism having at least one reflecting surface with power that is rotationally asymmetrical; and
an image sensor,
a length from the image sensor to a front unit or a rear unit satisfying the following condition:

$$0.26 < h1/(h2 \cdot Fnox) < 0.46$$

where h1 is a length of a part from a plane including the image sensor from an optical plane of the first prism farthest from the plane, h2 is a length of a part from the plane including the image sensor to an optical plane of the second prism farthest from the plane, and Fnox is a minimum F-number in an entire optical system.

15. An image pickup optical system comprising, in order from an object side:
- a first prism having at least one reflecting surface with power that is rotationally asymmetrical;
- an aperture stop;
- a second prism having at least one reflecting surface with power that is rotationally asymmetrical; and
- an image sensor,
- a power of a whole of the second prism being positive and a power of a reflecting surface nearest the image sensor satisfying the following conditions:

$$0.22 < \phi x/\Phi x < 1.30$$

$$-1.10 < \phi y/\Phi y < 0.20$$

where $\phi x$ is a power in an x direction of the reflecting surface nearest the image sensor in the second prism, $\phi y$ is a power in a y direction, which is a decentering direction, of the reflecting surface nearest the image sensor in the second prism, $\Phi x$ is a power in the x direction of an entire optical system, and $\Phi y$ is a power in the y direction, which is the decentering direction, of the entire optical system.

16. An image pickup optical system comprising, in order from an object side:
- a first prism having at least one reflecting surface with power that is rotationally asymmetrical;
- an aperture stop;
- a second prism having at least one reflecting surface with power that is rotationally asymmetrical; and
- an image sensor,
- an angle of incidence of a chief ray on the image sensor satisfying the following conditions:

$$-8.0° < \theta x < 9.0°$$

$$0.6° < \theta x - \theta y < 18.0°$$

where $\theta x$ is the angle of incidence of the chief ray on the image sensor in an x direction, which is a direction of a short side of the image sensor, and $\theta y$ is the angle of incidence of the chief ray on the image sensor in a y direction.

17. An image pickup optical system comprising, in ordre from an object side:
- a front unit having an entrance surface, at least one reflecting surface with power that is rotationally asymmetrical, and an exit surface;
- an aperture stop; and
- a rear unit having an entrance surface, at least one reflecting surface with power that is rotationally asymmetrical, and an exit surface,
- wherein decentration takes place in one of two directions perpendicular to each other on a plane perpendicular to an optical axis,
- an F-number in a direction perpendicular to this decentering direction in which the decentration takes place is made smaller than an F-number in the decentering direction, and
- the following condition is satisfied:

$$-0.5 < fly/flx < 0.7$$

where flx is a flocal length of the front unit and fly is a focal length of the rear unit.

* * * * *

UNITED STATES PATENT AND TRADEMARK OFFICE
CERTIFICATE OF CORRECTION

PATENT NO. : 7,515,194 B2  Page 1 of 1
APPLICATION NO. : 10/902302
DATED : April 7, 2009
INVENTOR(S) : Tetsuo Nagata et al.

It is certified that error appears in the above-identified patent and that said Letters Patent is hereby corrected as shown below:

Column 50, line 10, change "An image pickup optical system comprising, in ordre" to -- An image pickup optical system comprising, in order --;

Column 50, line 29, change "where flx is a flocal length of..." to -- where flx is a focal length of... --.

Signed and Sealed this

Twenty-eighth Day of July, 2009

JOHN DOLL
*Acting Director of the United States Patent and Trademark Office*